United States Patent [19]

Poole

[11] Patent Number: 4,553,185

[45] Date of Patent: Nov. 12, 1985

[54] METHOD AND APPARATUS FOR RECORDING AND REPRODUCING TELEVISION OR OTHER BROAD BAND SIGNALS WITH AN ALTERED TIME BASE EFFECT

[75] Inventor: Burnet M. Poole, Los Altos, Calif.

[73] Assignee: Ampex Corporation, Redwood City, Calif.

[21] Appl. No.: 713,901

[22] Filed: Mar. 18, 1968

[51] Int. Cl.[4] ............................................ H04N 5/781
[52] U.S. Cl. .................................. 360/10.1; 360/35.1
[58] Field of Search ..................... 340/174.1 C; 178/6, 178/6 A, 6 BW, 6 R; 179/100.2 T; 360/10, 10.1, 35.1

[56] References Cited

U.S. PATENT DOCUMENTS

| | | | |
|---|---|---|---|
| 2,737,646 | 3/1956 | Muffly | 178/6.6 |
| 2,800,642 | 7/1957 | May | 340/174.1 |
| 3,007,144 | 10/1961 | Hagopian | 340/174.1 |
| 3,145,386 | 8/1964 | Wadey et al. | 340/174.1 |
| 3,170,031 | 2/1965 | Okamura | 178/6.6 |
| 3,294,902 | 12/1966 | Maxey | 178/6.6 |
| 3,359,365 | 12/1967 | Kihara | 178/6 |
| 3,375,331 | 3/1968 | Okazaki et al. | 178/6.6 |
| 3,397,283 | 8/1968 | Stosberg et al. | 178/6.6 |

FOREIGN PATENT DOCUMENTS

| | | | |
|---|---|---|---|
| 38-17909 | 9/1963 | Japan . | |
| 812468 | 4/1959 | United Kingdom | 360/10 |

Primary Examiner—Raymond F. Cardillo, Jr.
Attorney, Agent, or Firm—John F. Flannery; Ralph L. Mossino; Joel D. Talcott

[57] ABSTRACT

A method and apparatus is provided for recording and reproducing television or other broad band signals with an altered time base effect so as to provide, for example, in the case of television signals, slow motion, faster than normal motion, stop motion or reverse motion. To provide slow motion replay of television signals, successive fields of the signal are recorded separately on a plurality of magnetic mediums, and at predetermined head-to-medium writing speeds, and are played back at substantially the same head-to-medium writing speeds. On playback, each field is repeated a number of times depending upon the time base effect desired. Reverse motion is provided by reversing the order of replay of the fields.

21 Claims, 38 Drawing Figures

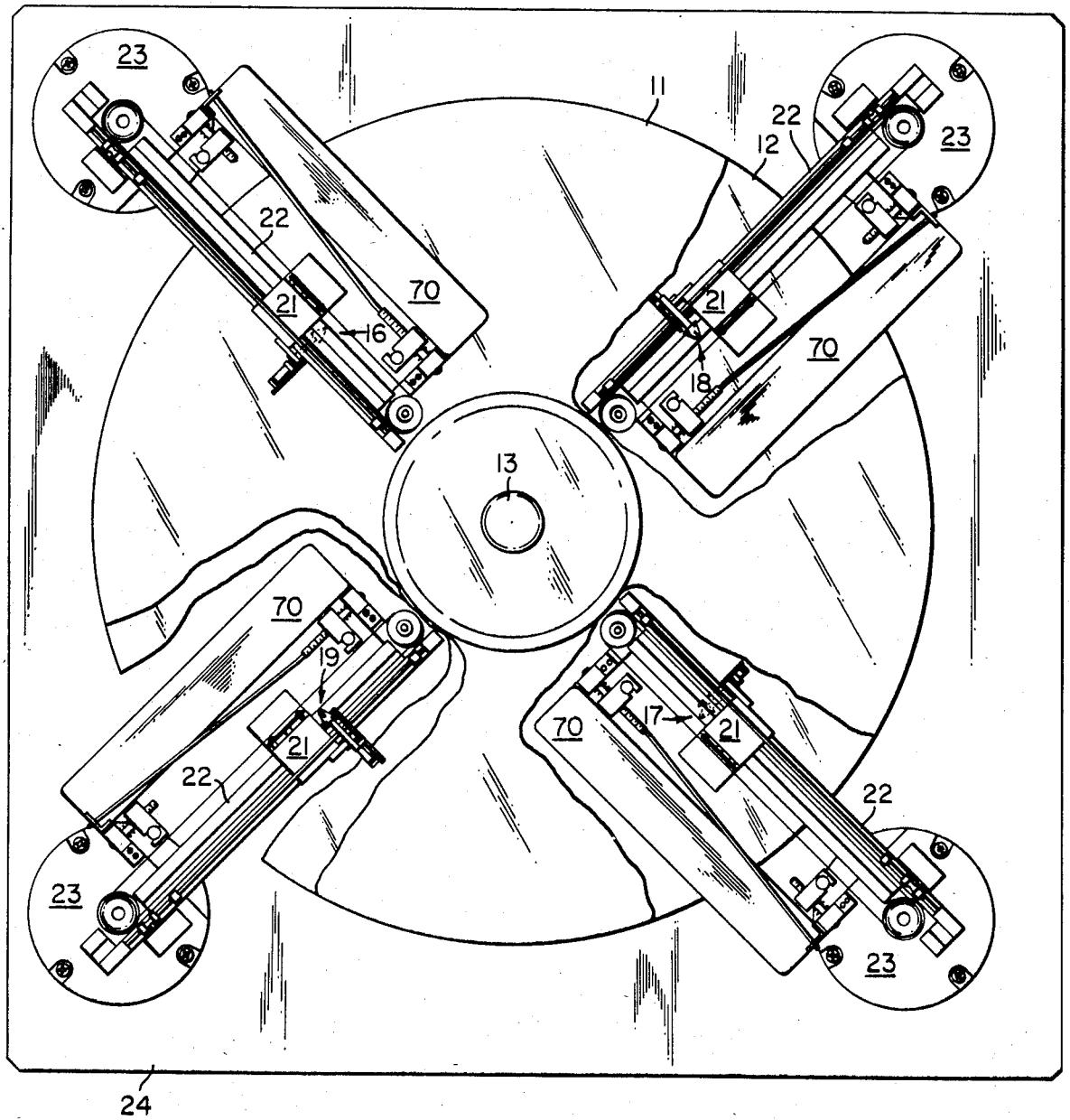
FIG_2

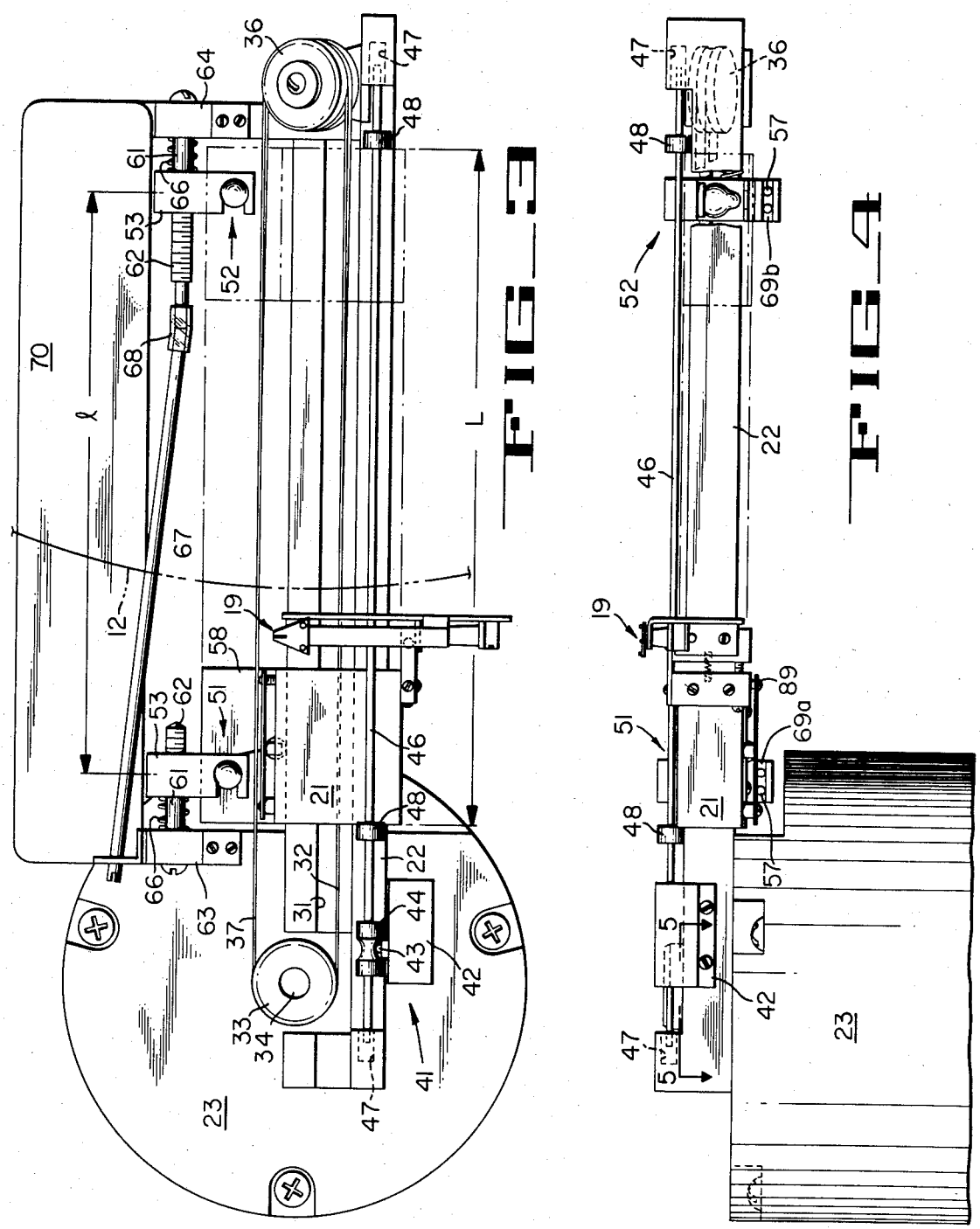

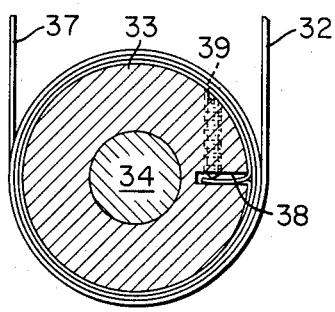
FIG_5
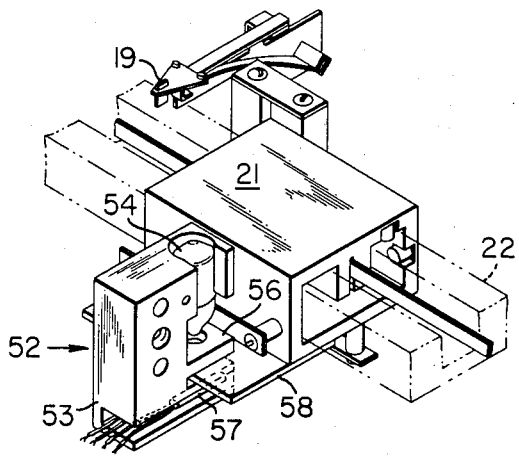
FIG_6
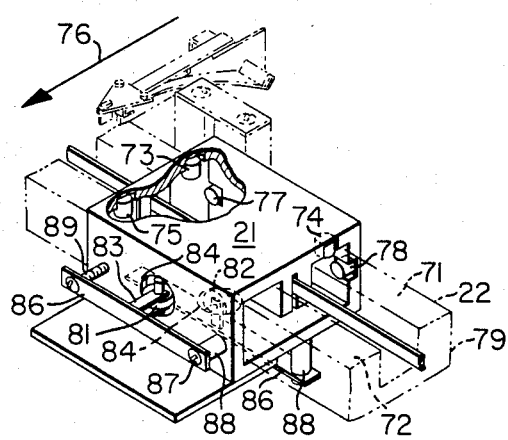
FIG_7
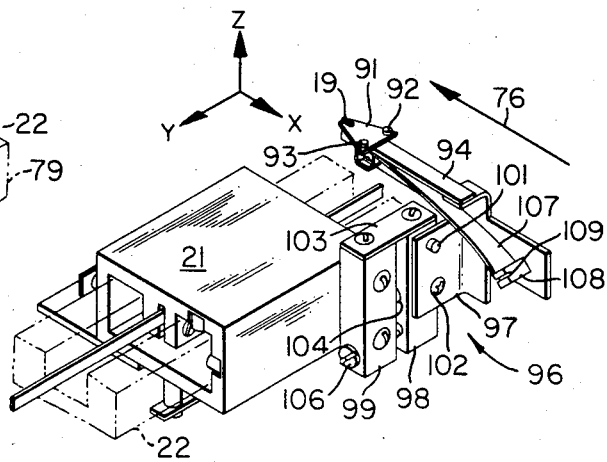
FIG_8
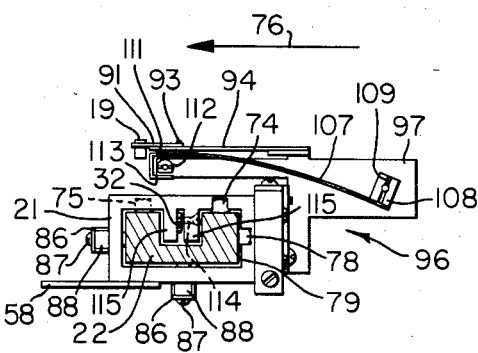
FIG_9

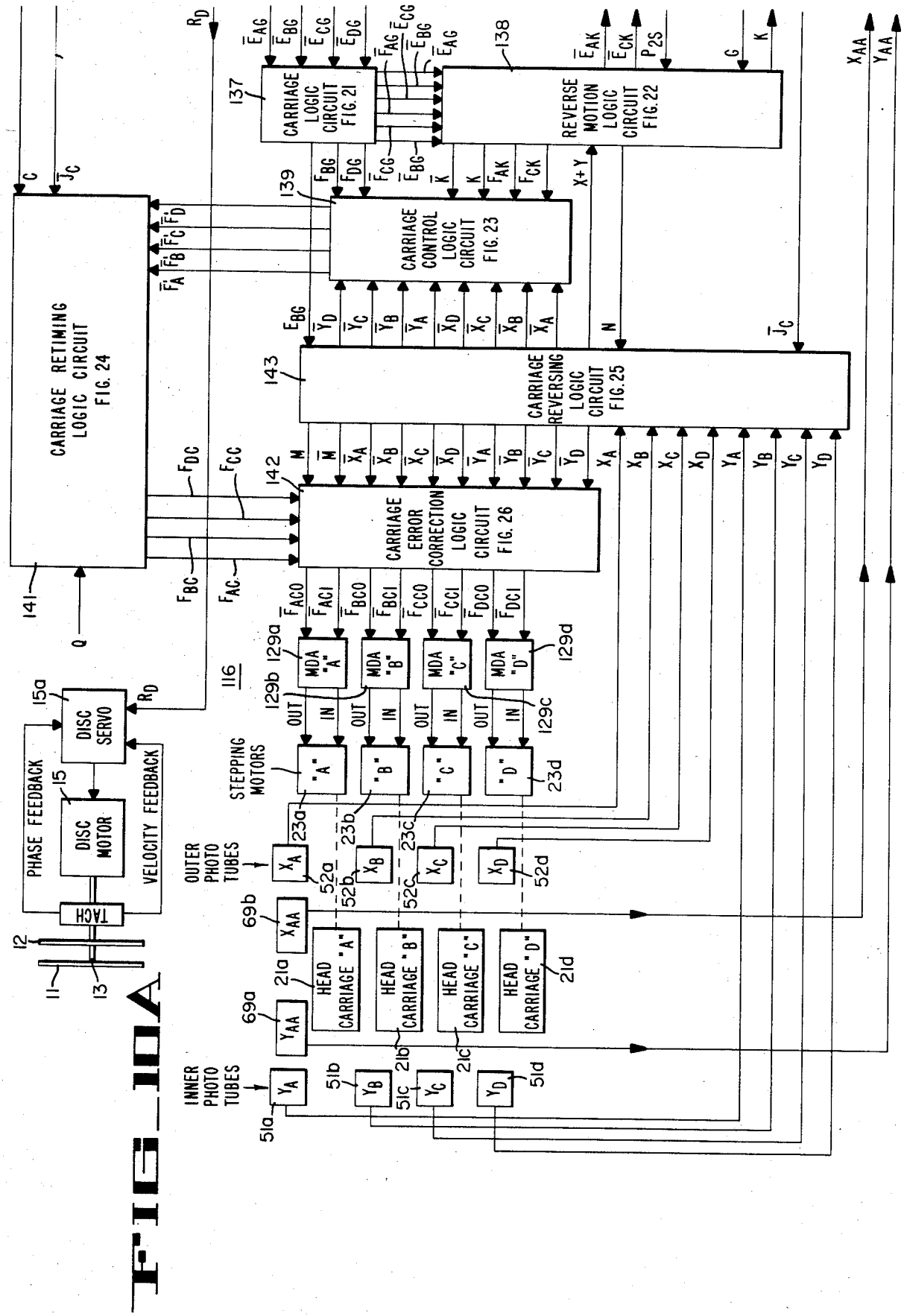

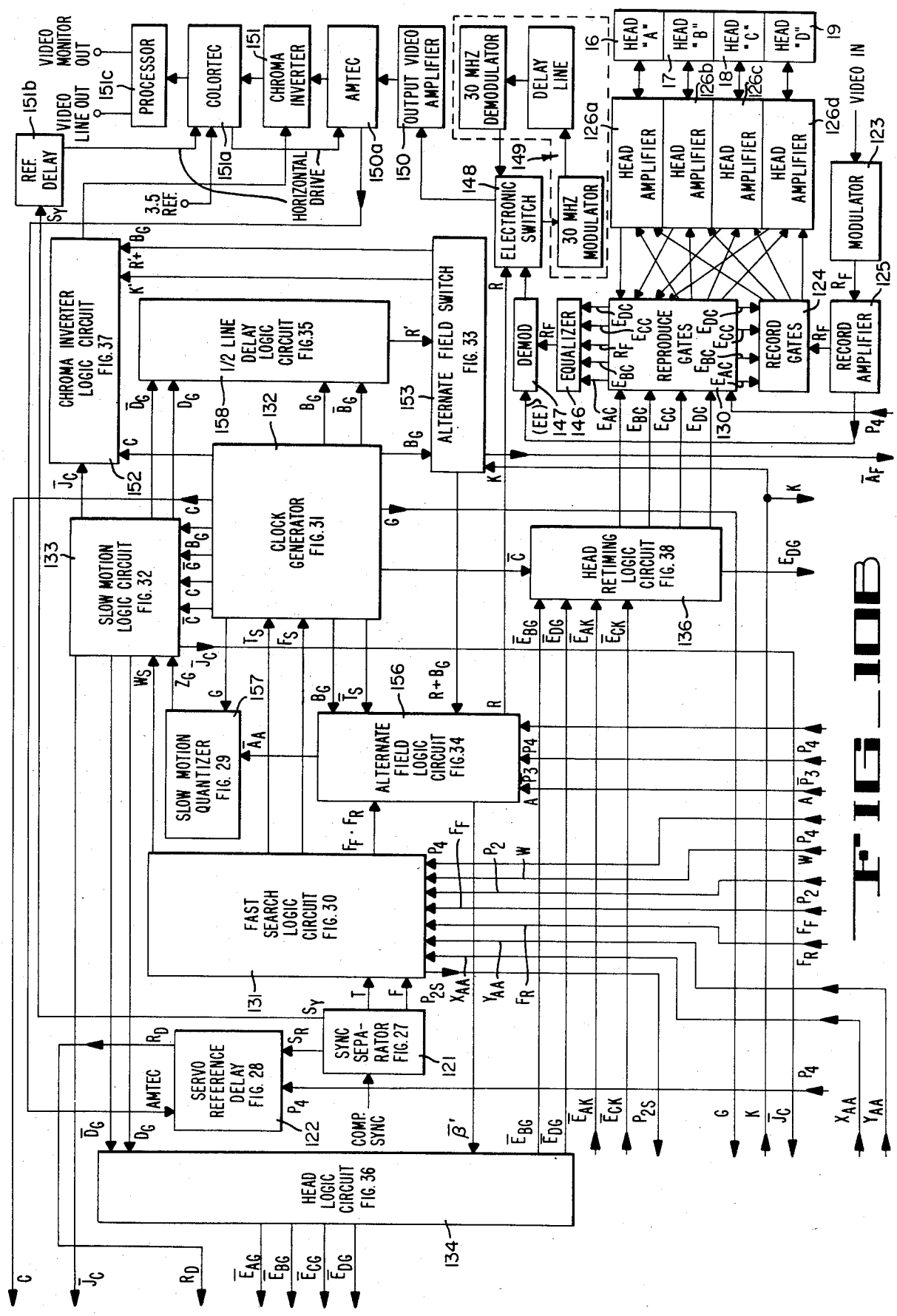

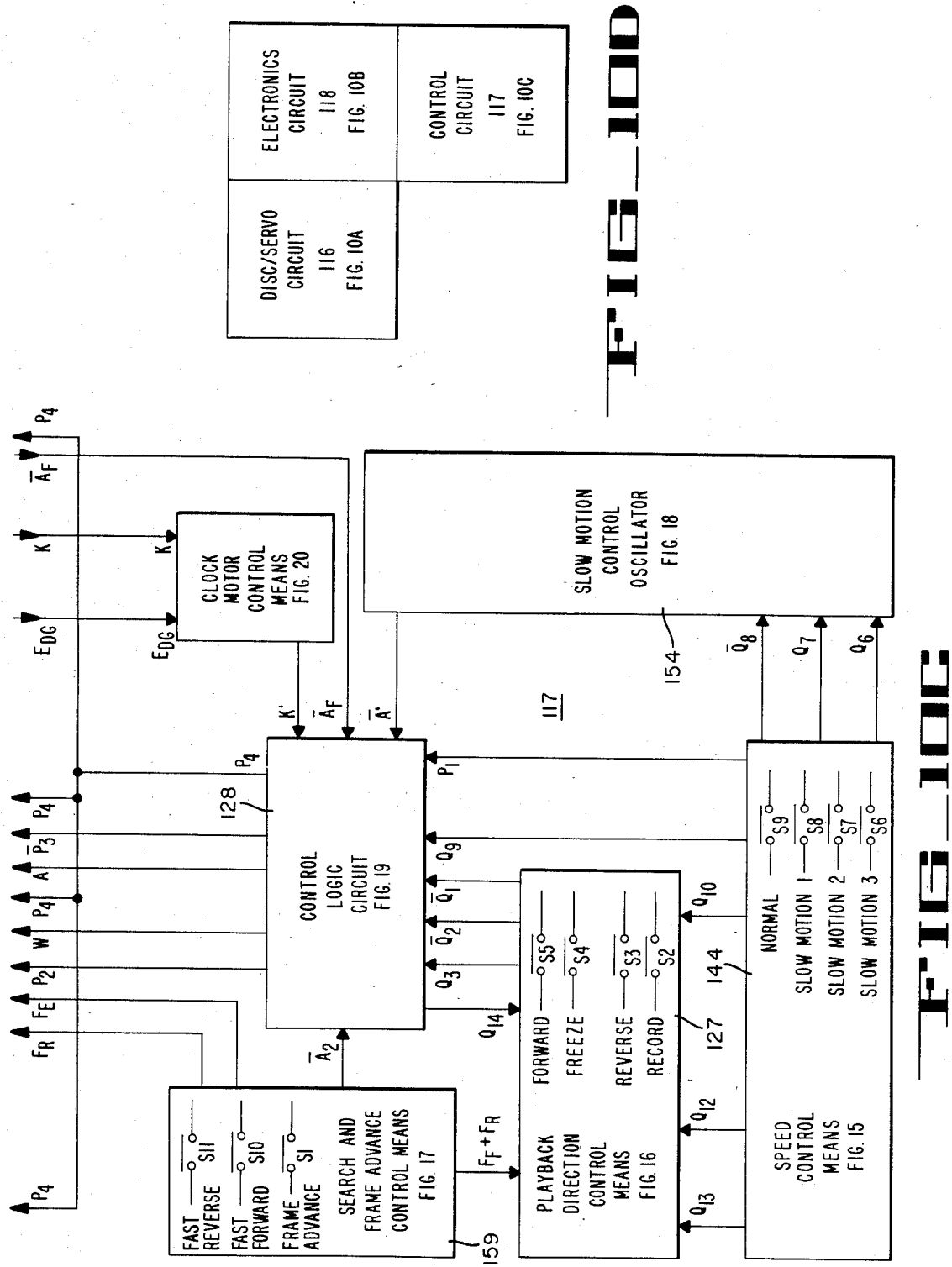

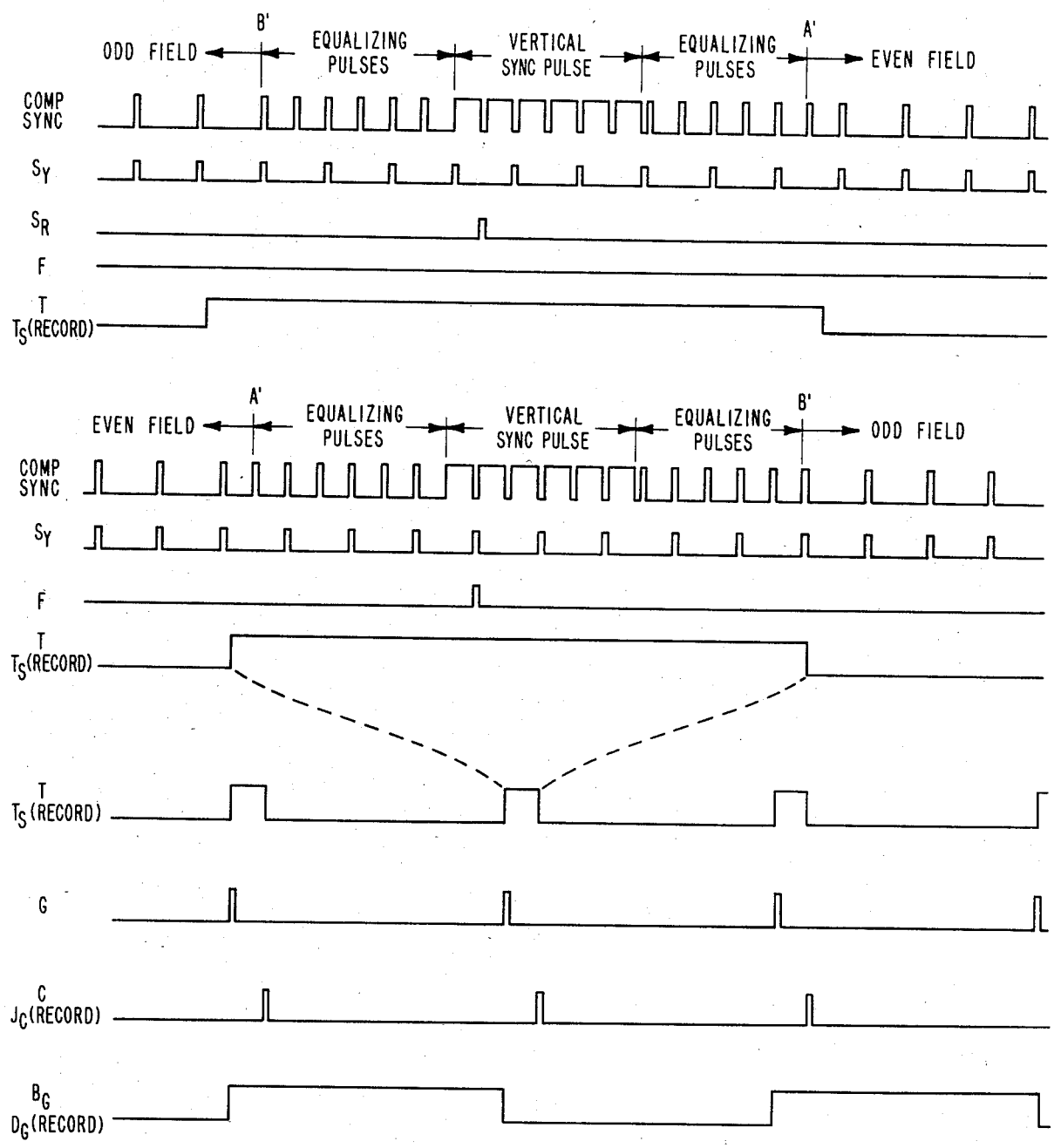
FIG_12A

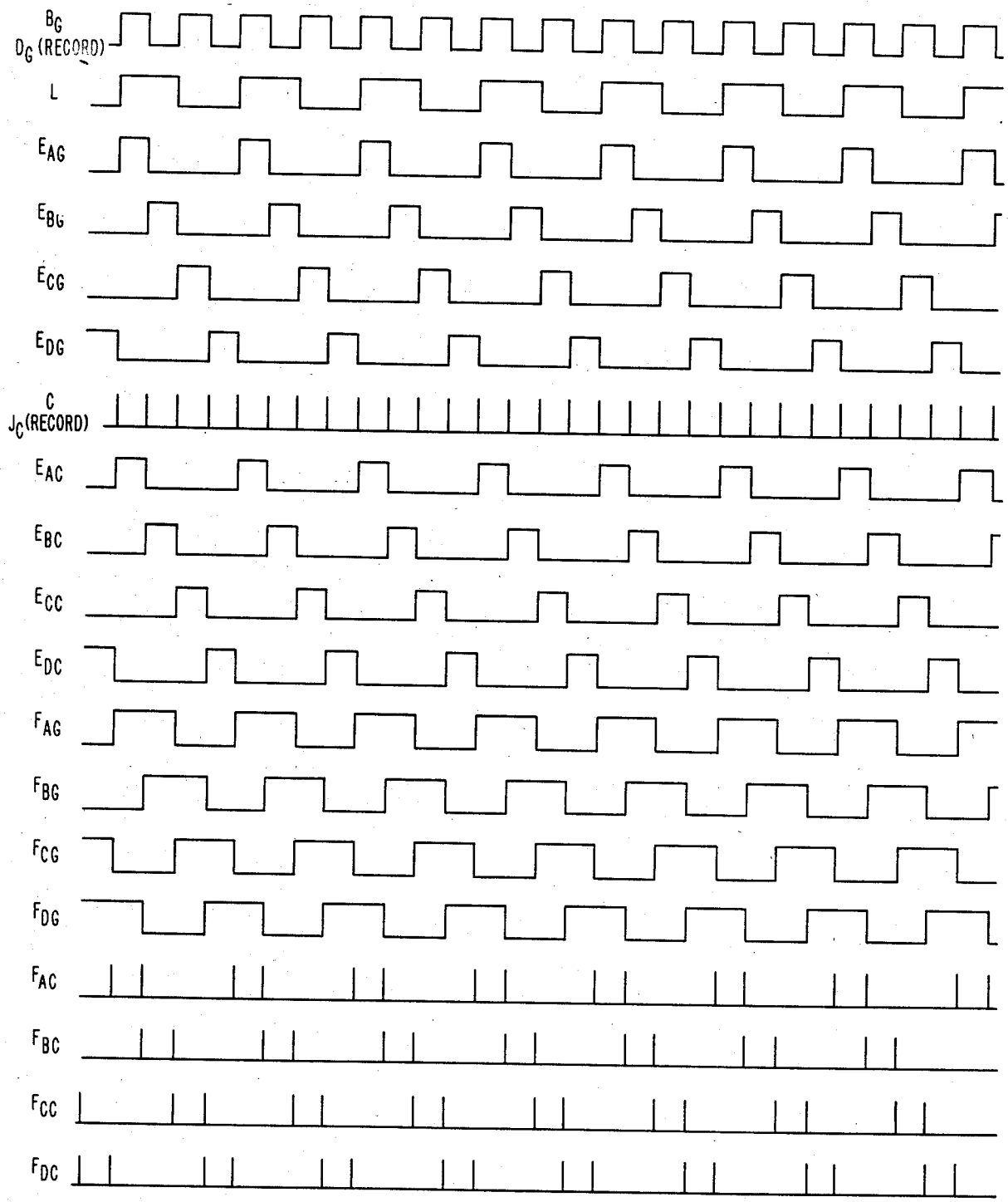
FIG_12B

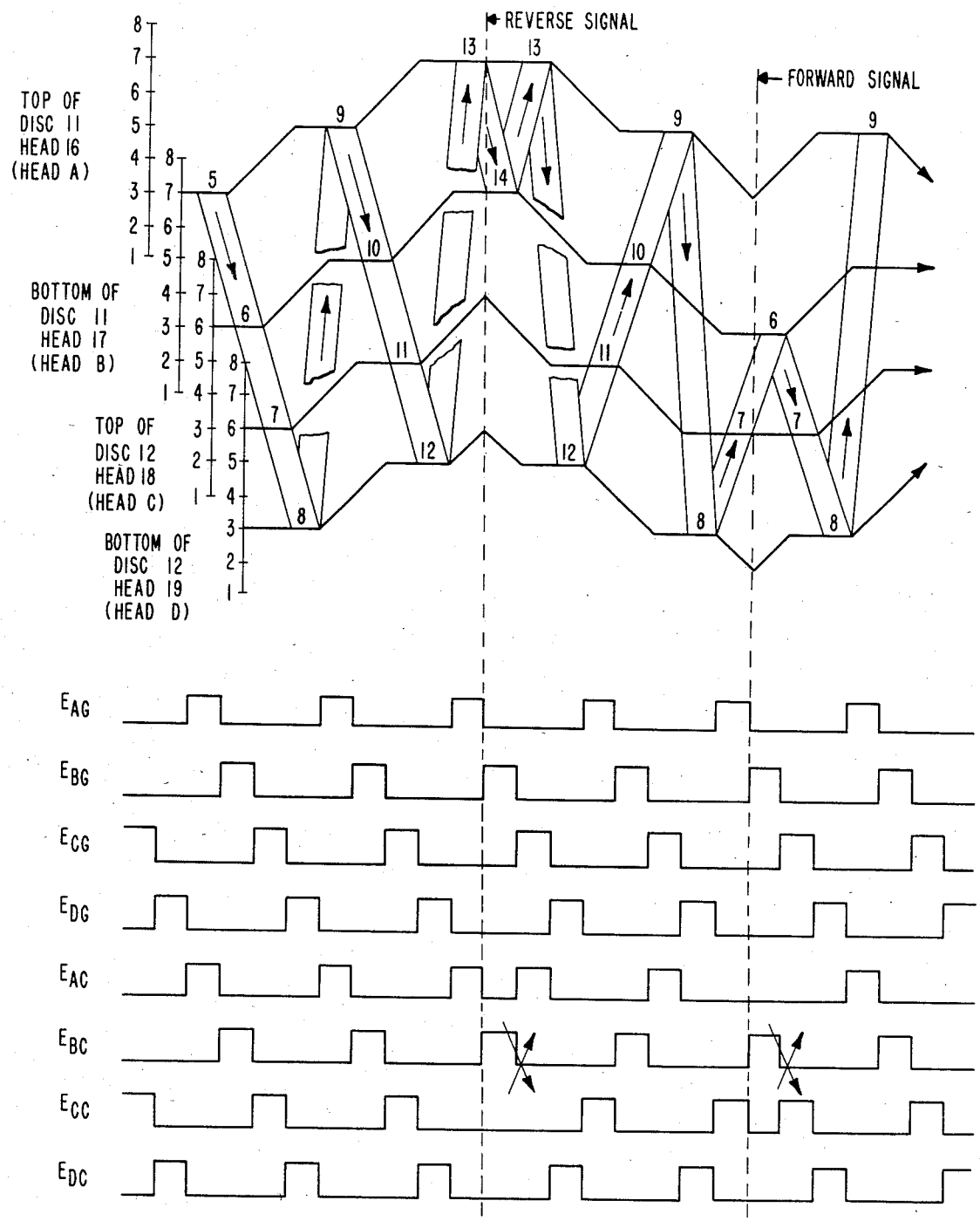
FIG_13

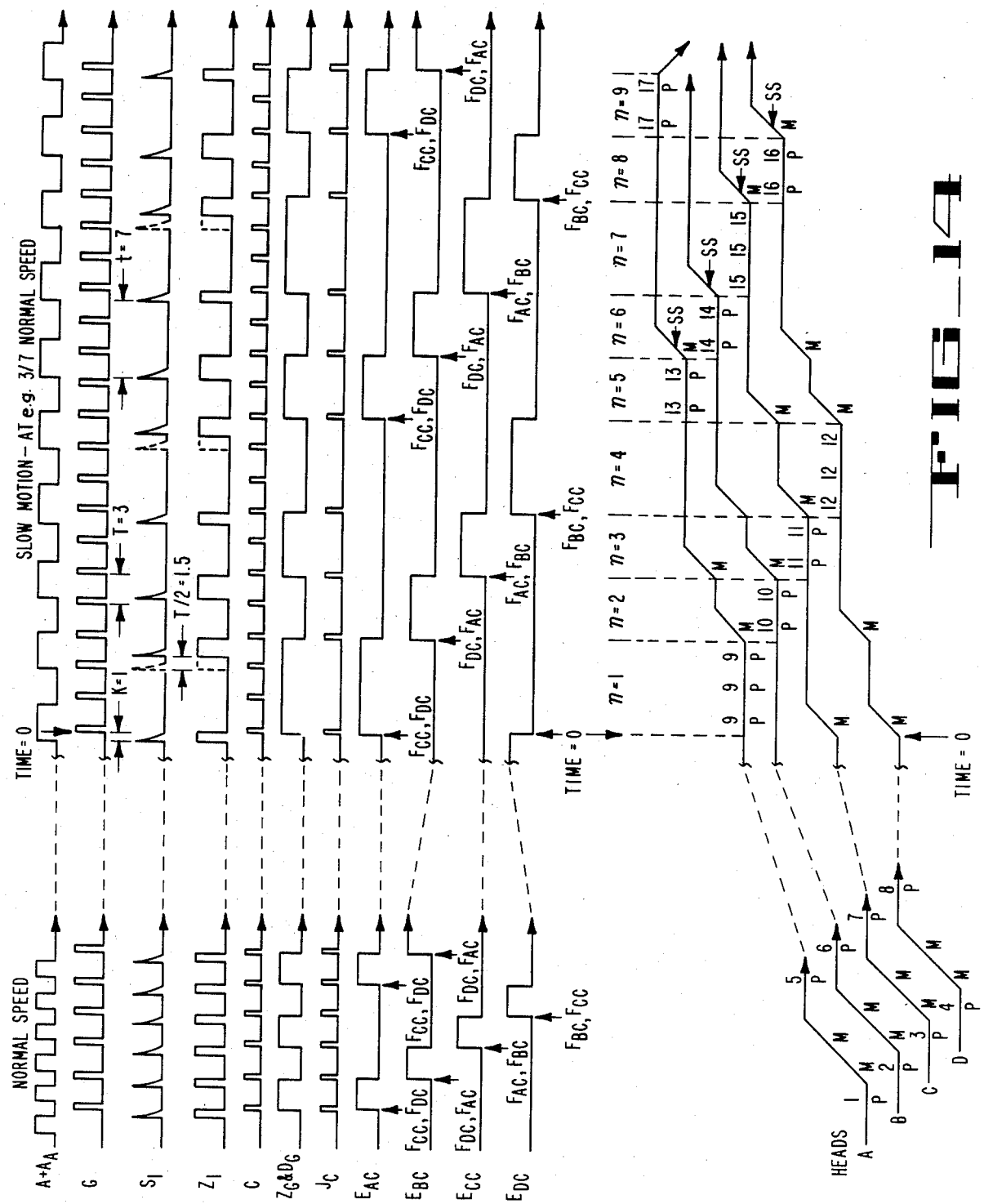
FIG_14

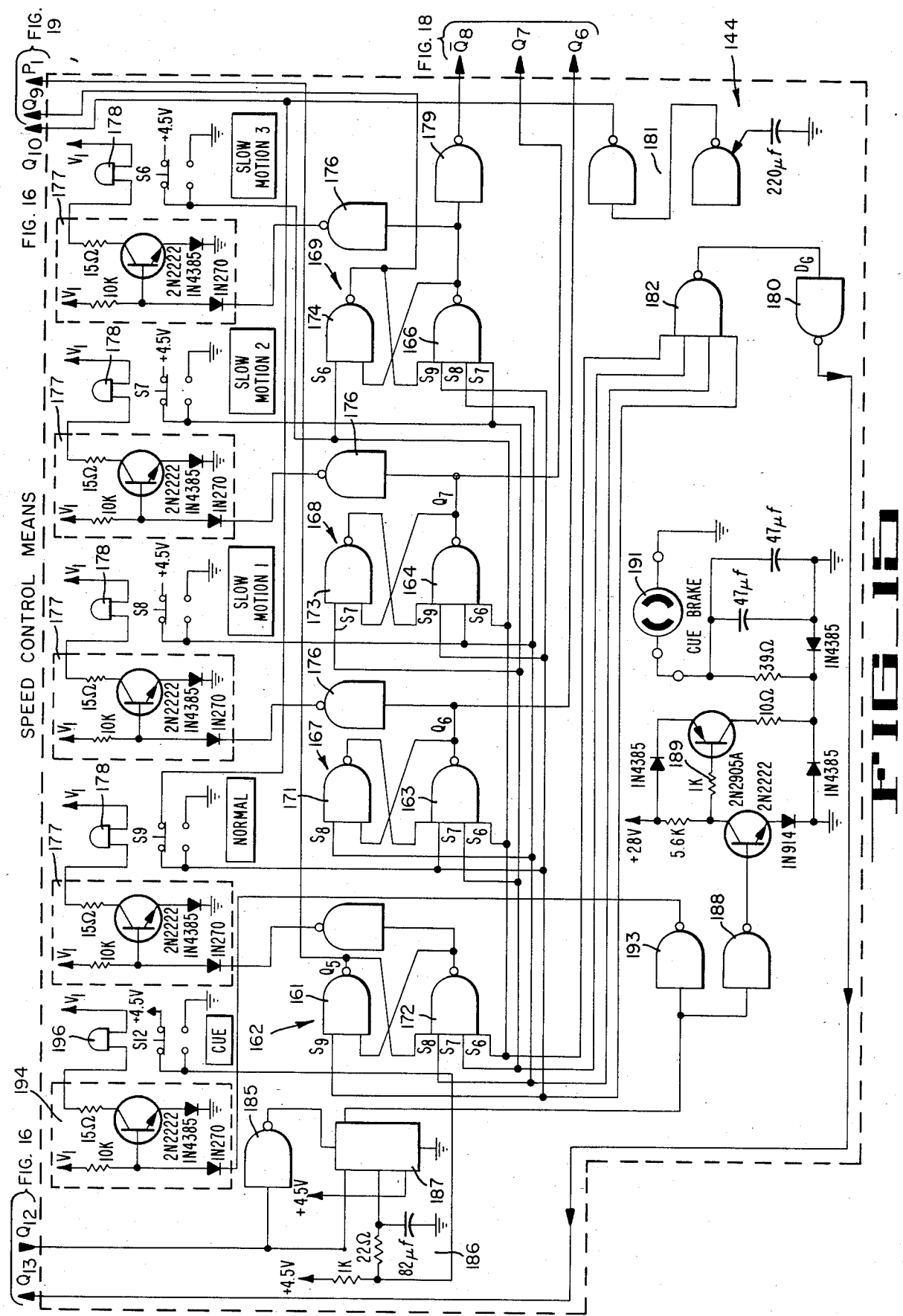

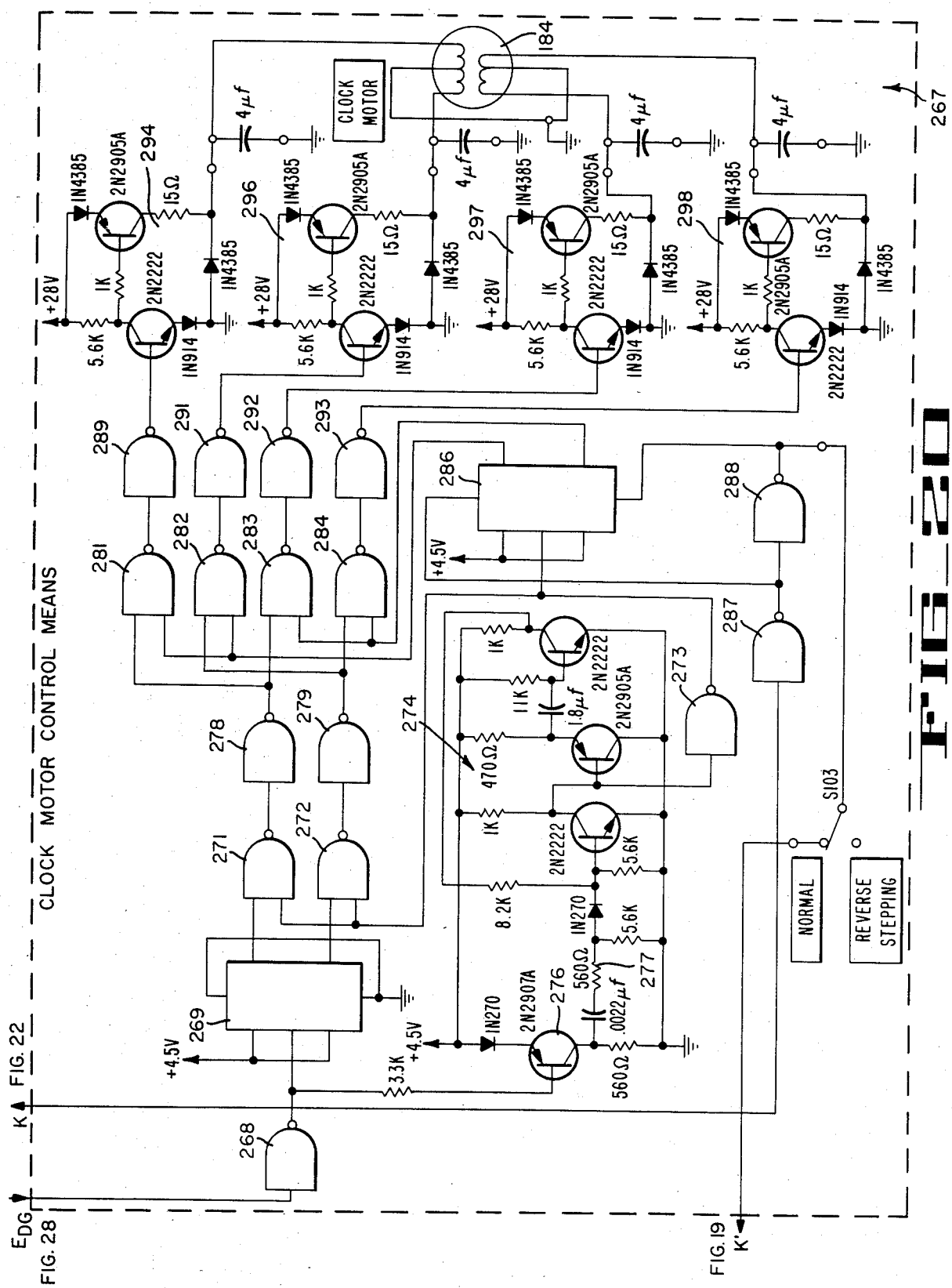

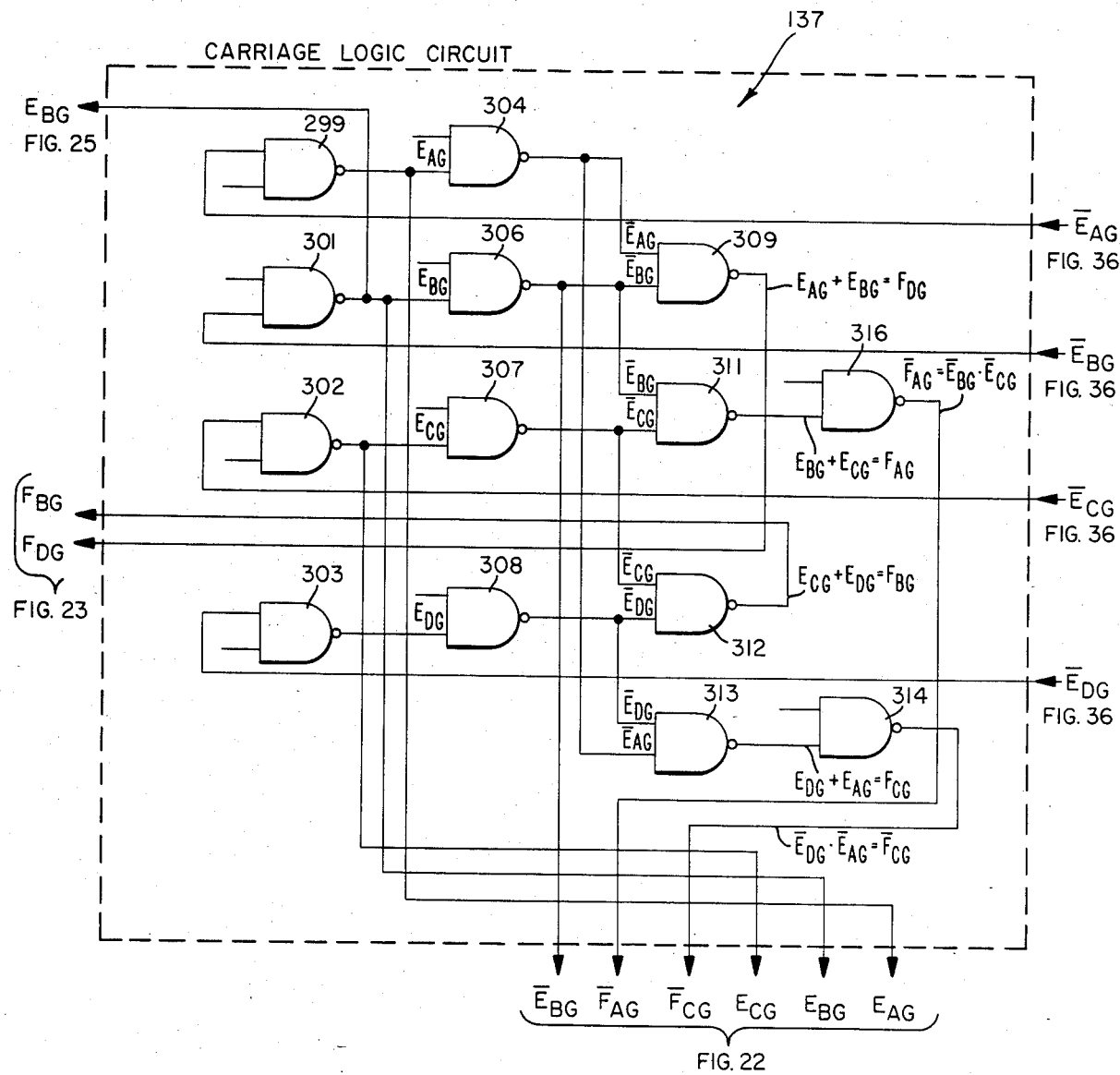
FIG_21

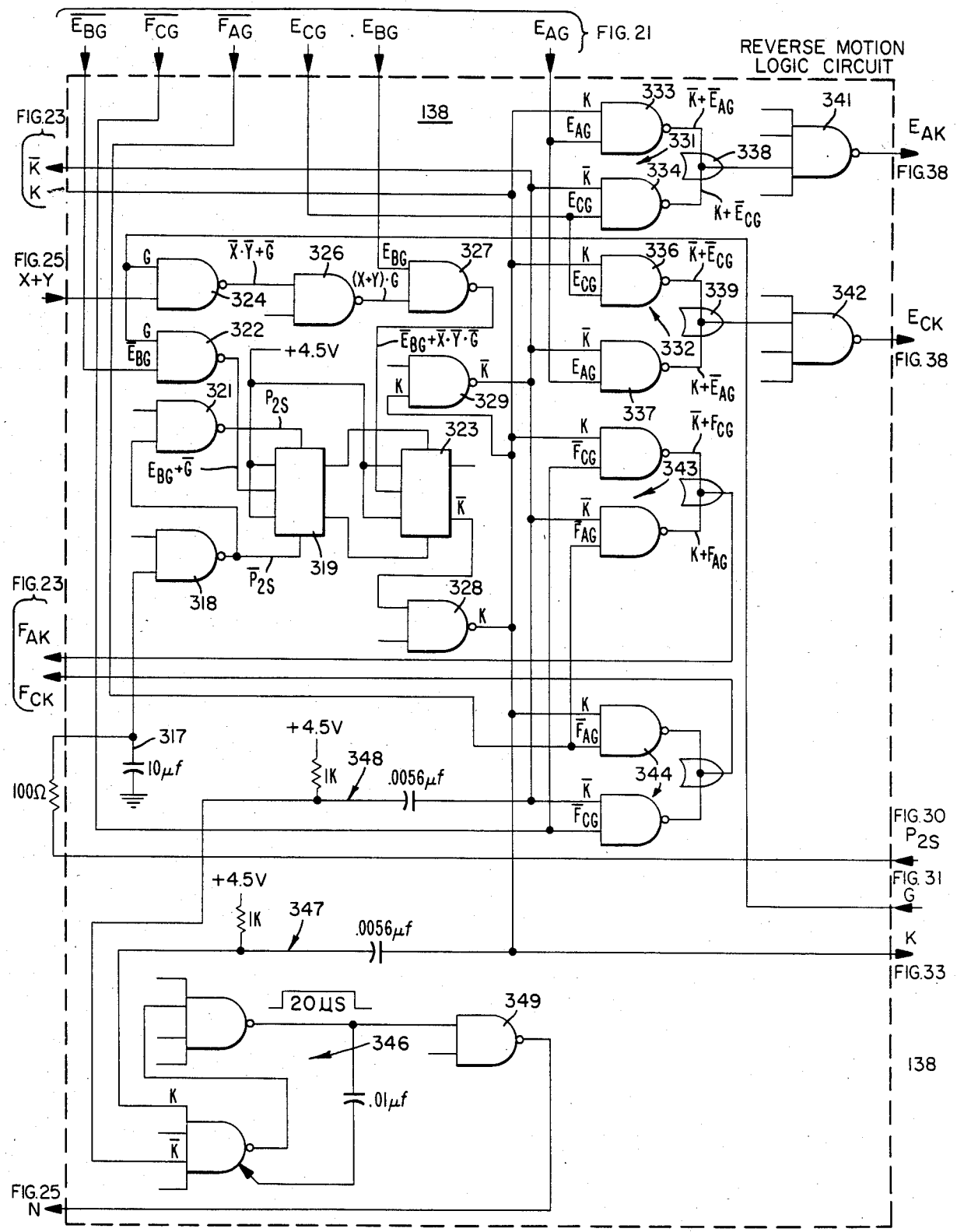
FIG_22

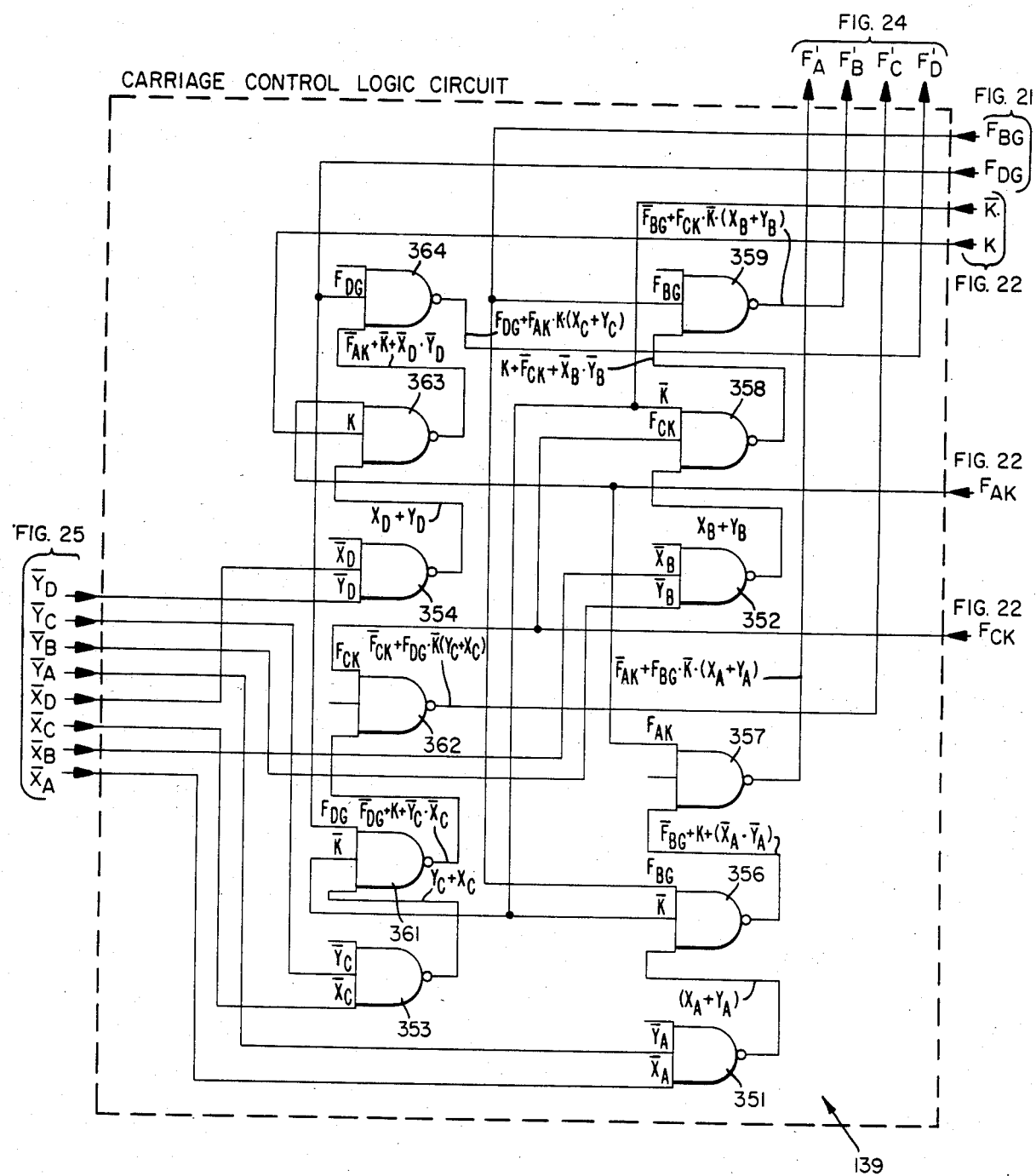
FIG_23

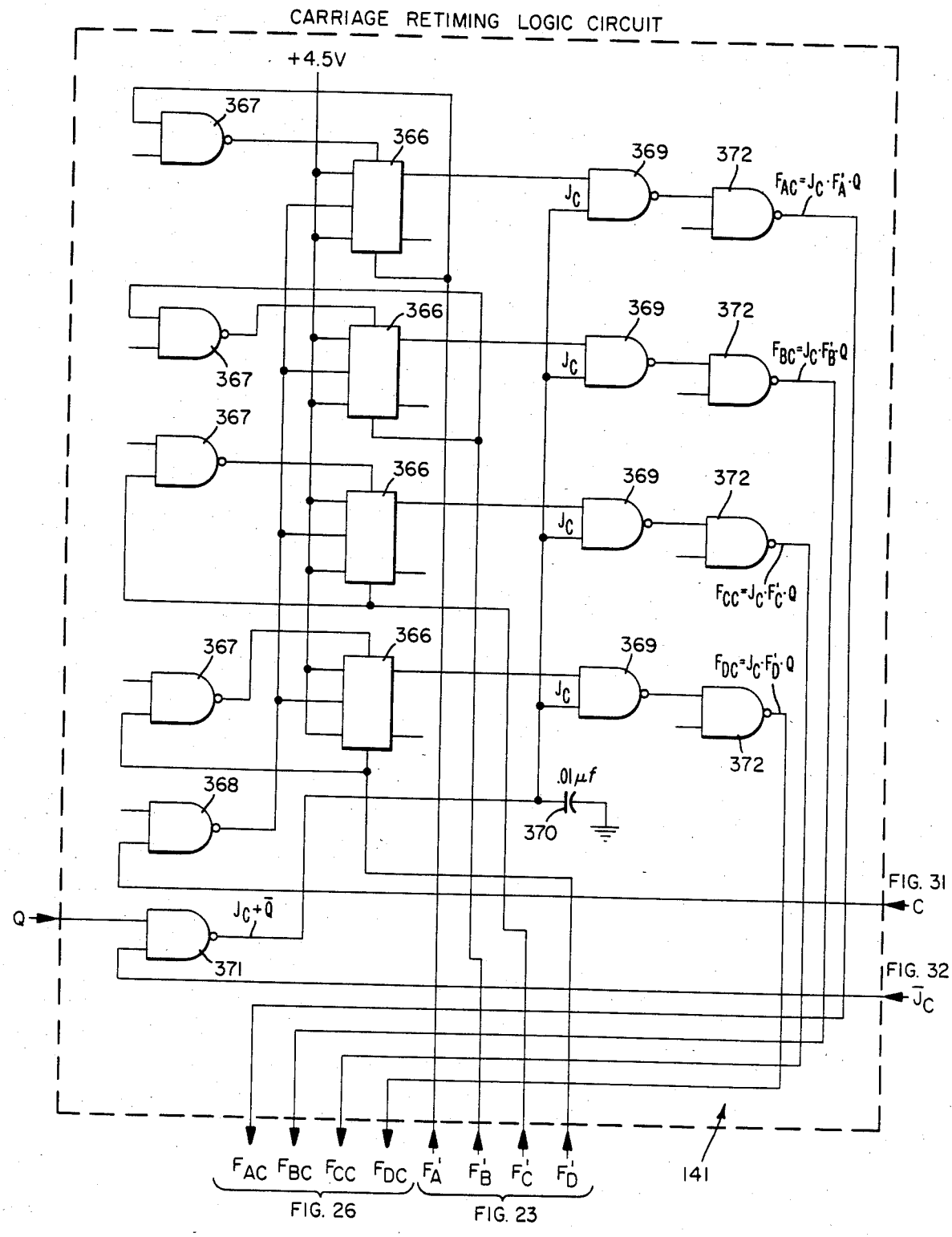
FIG_24

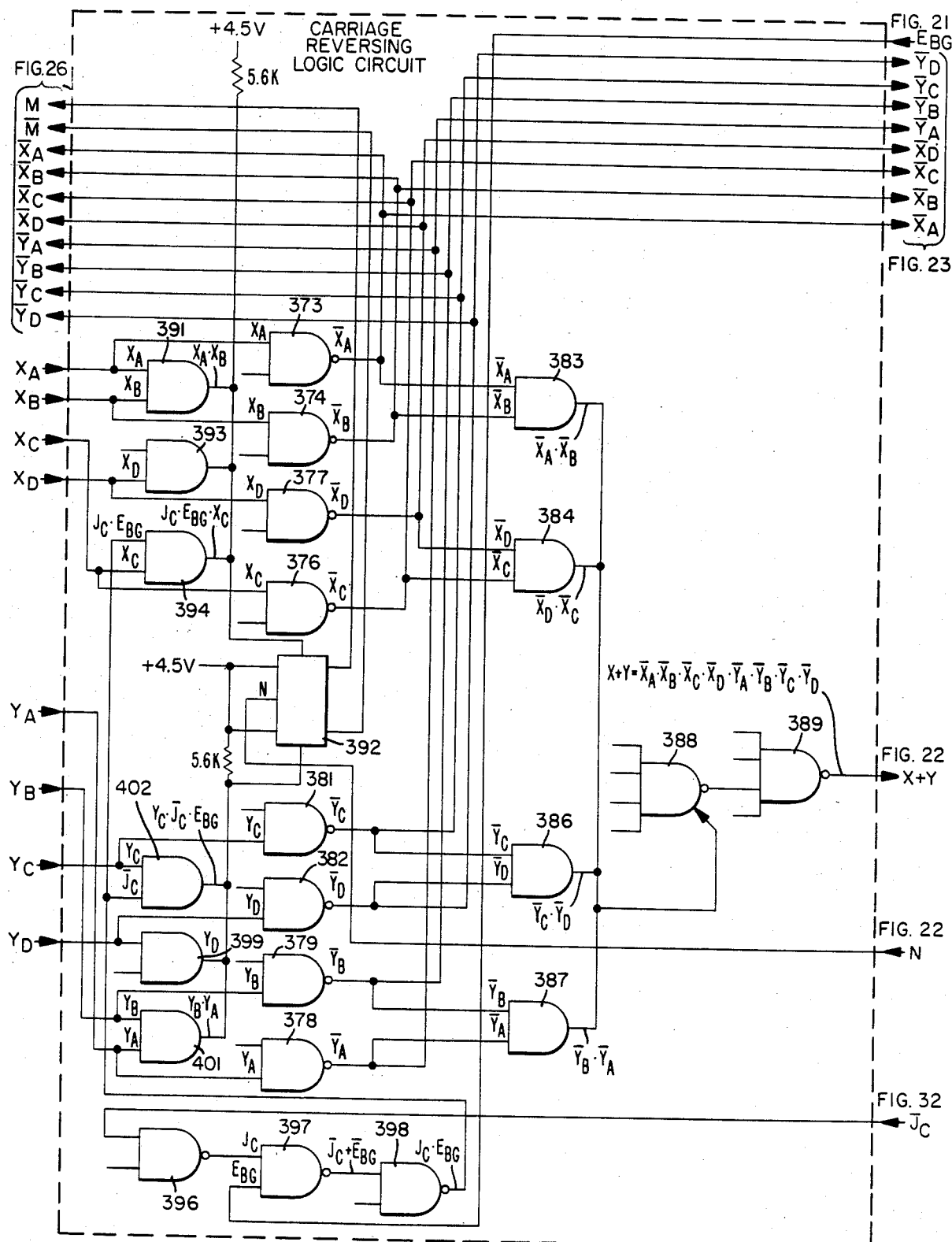
FIG_26

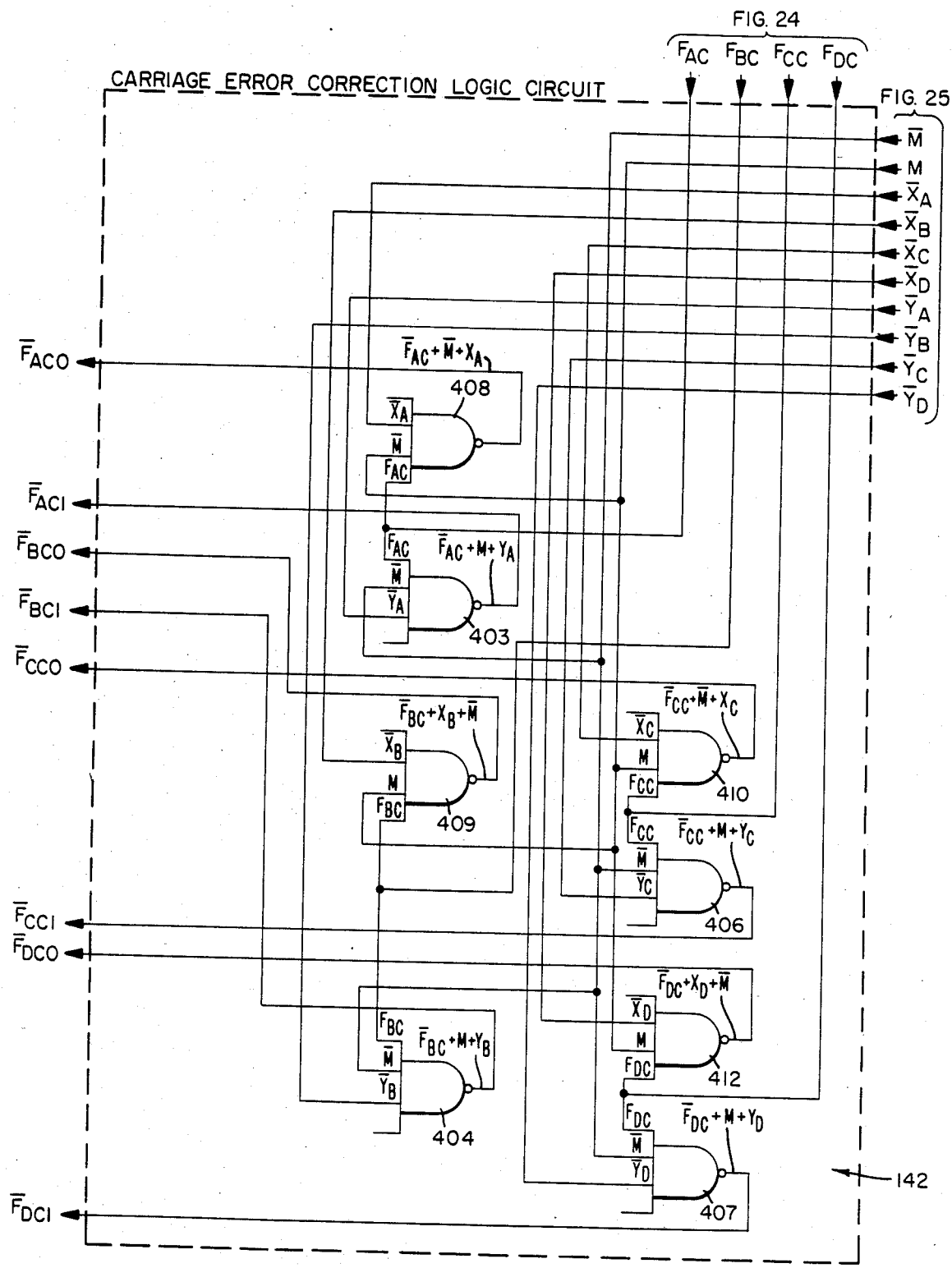
FIG_26

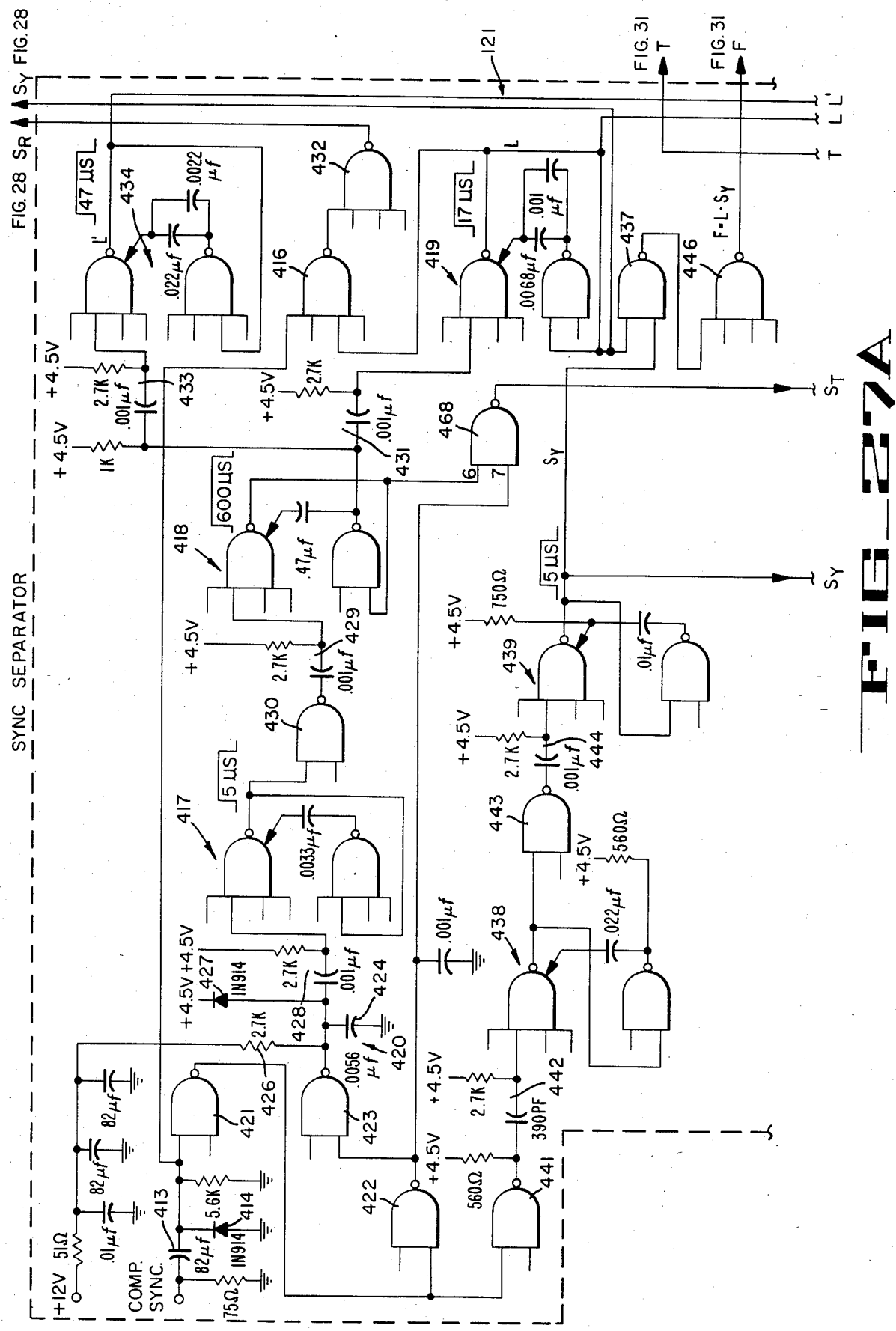

FIG 20

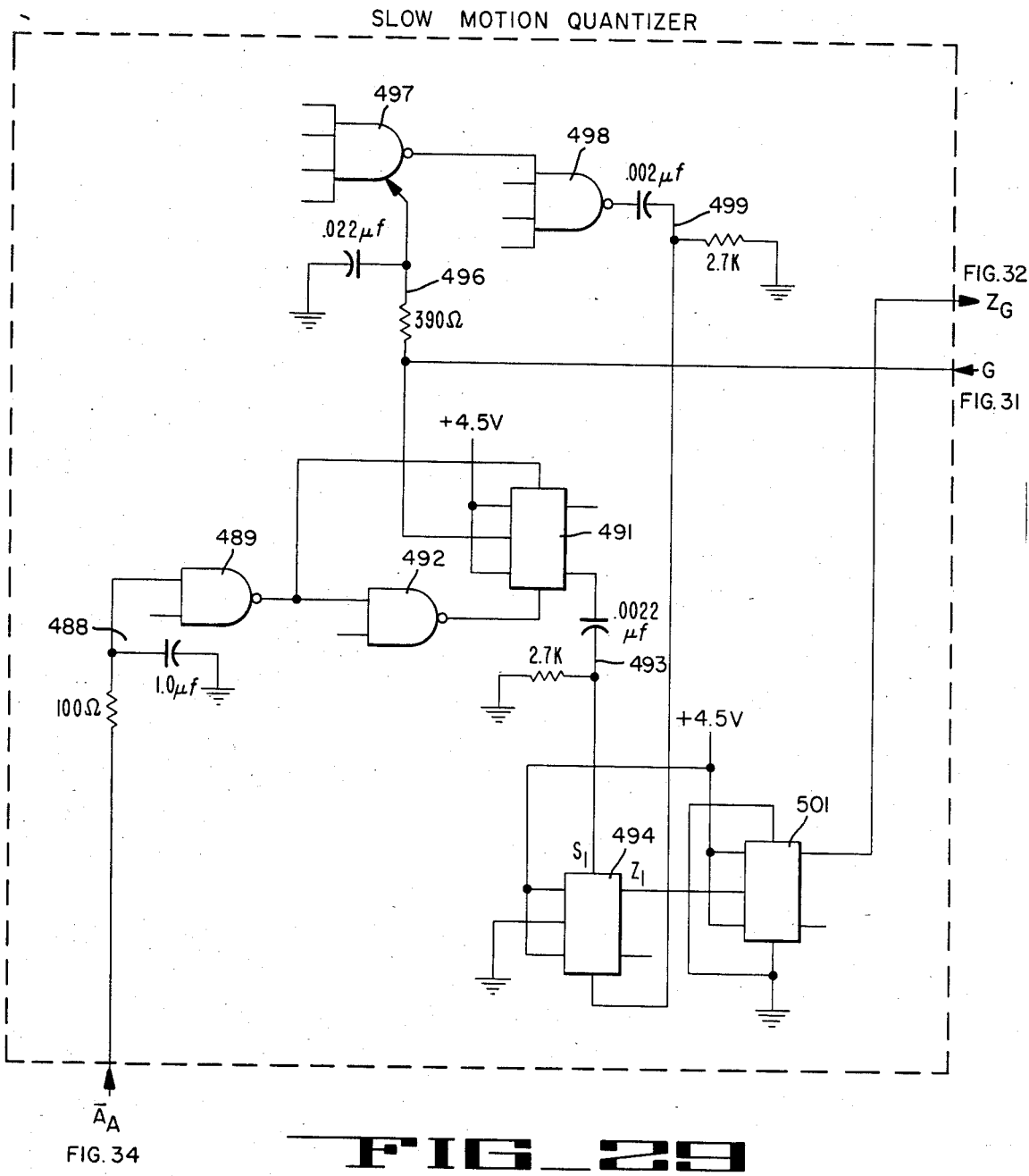

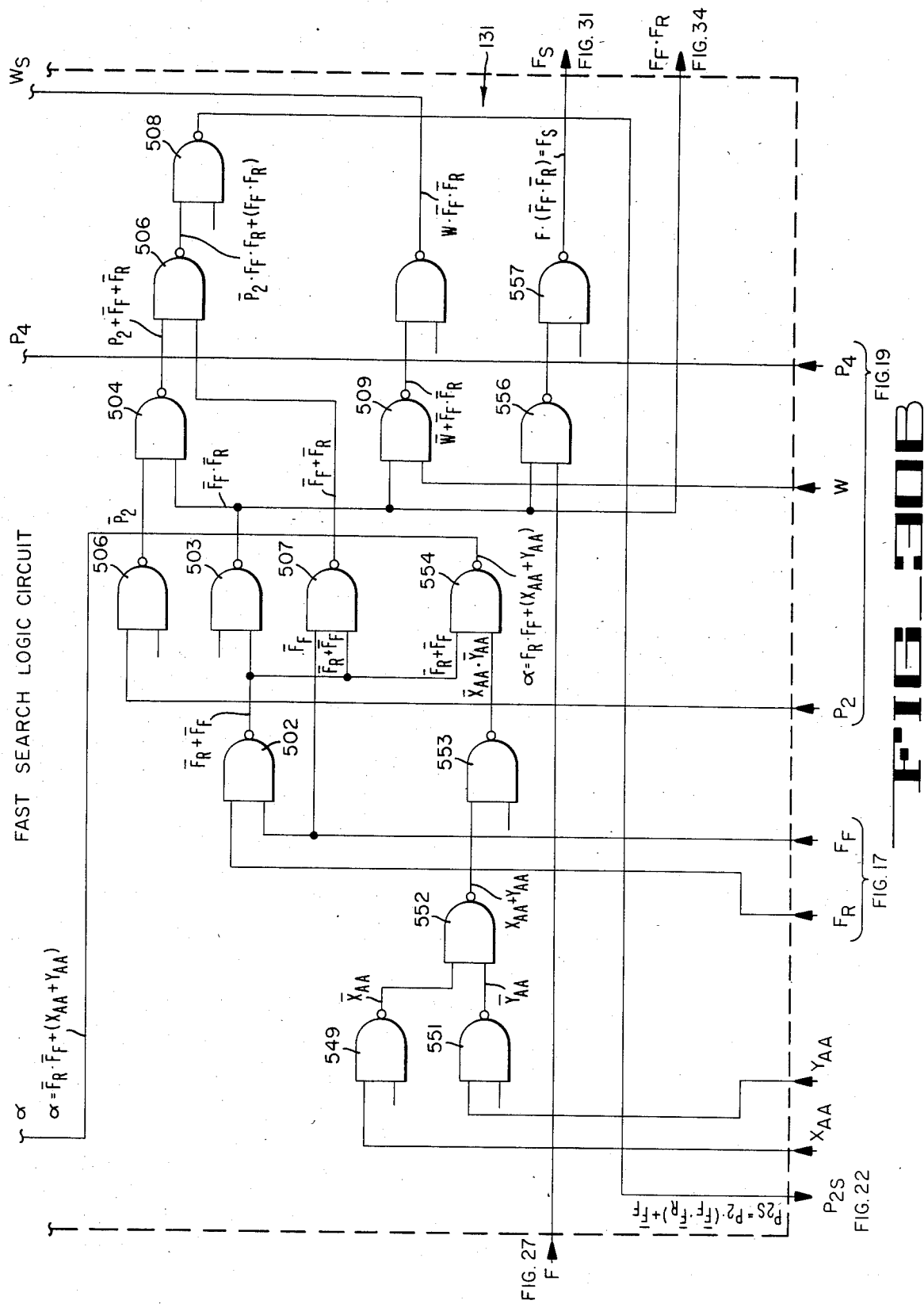

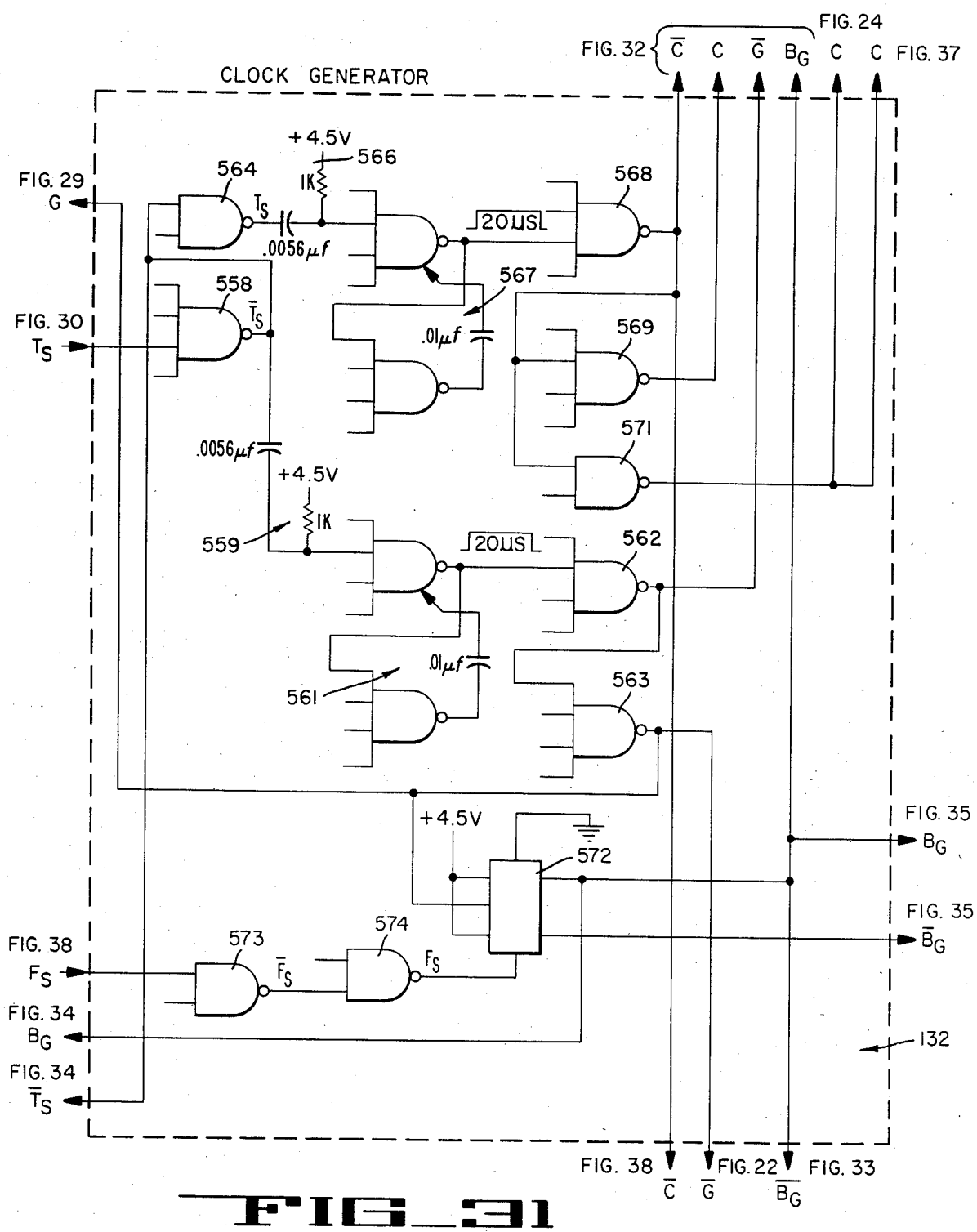
FIG_31

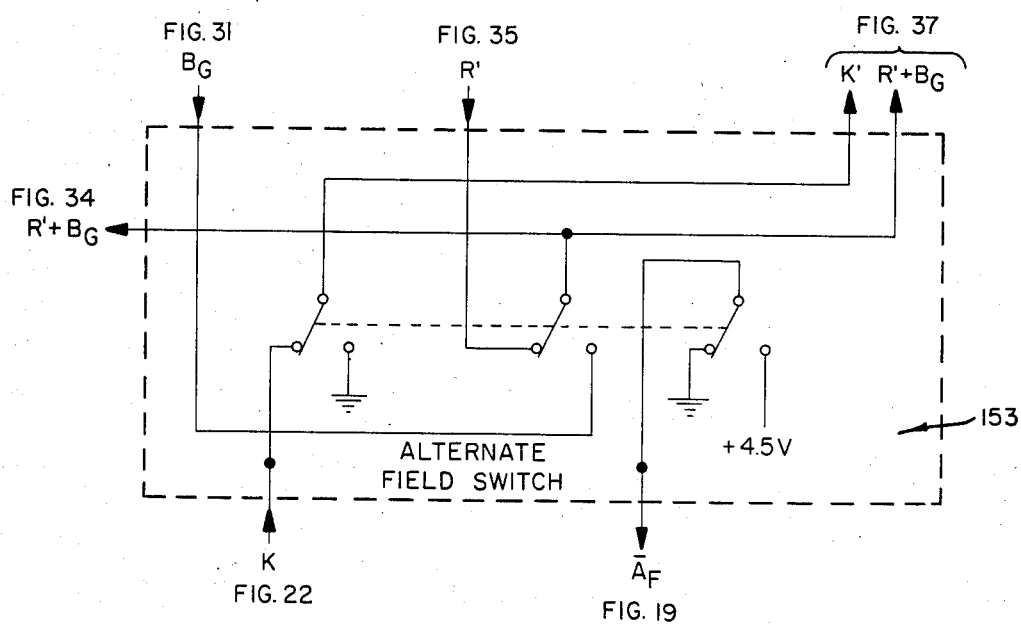
FIG_33

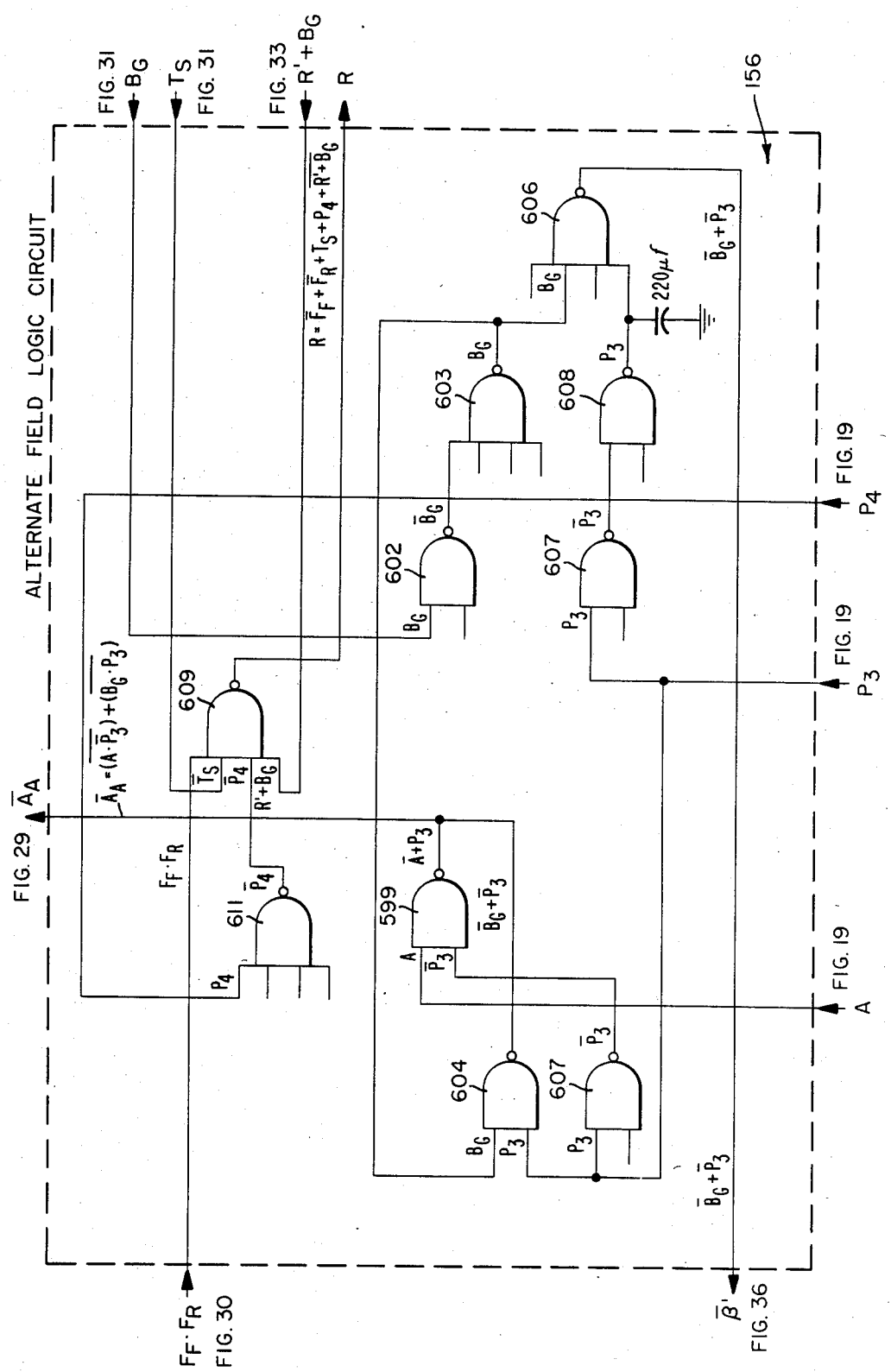

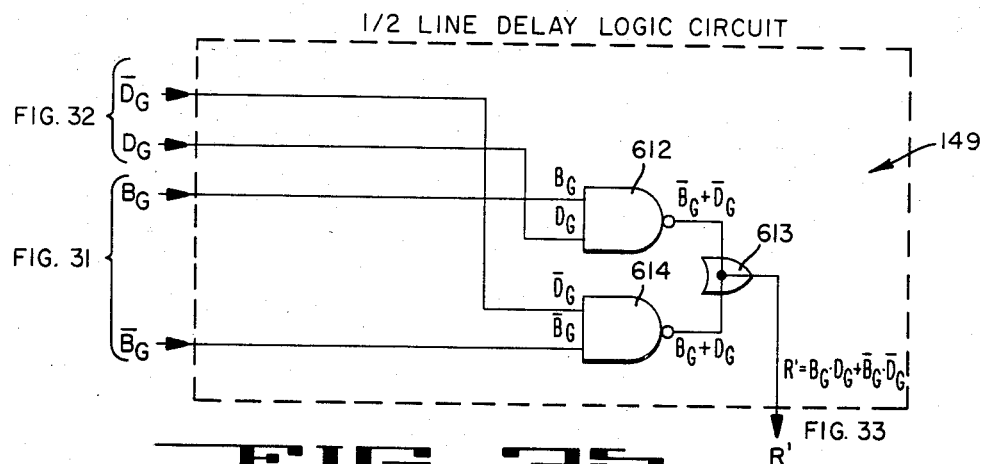
FIG_35
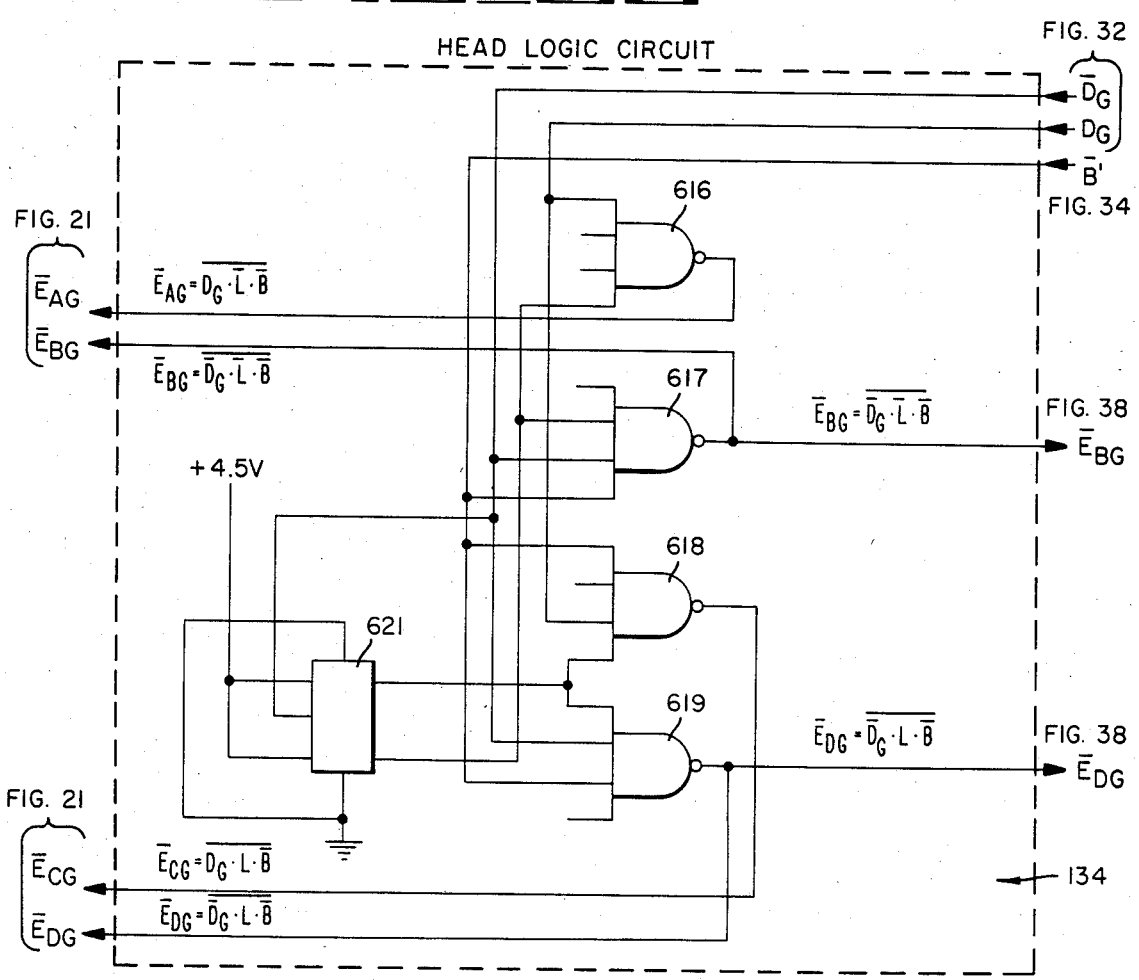
FIG_36

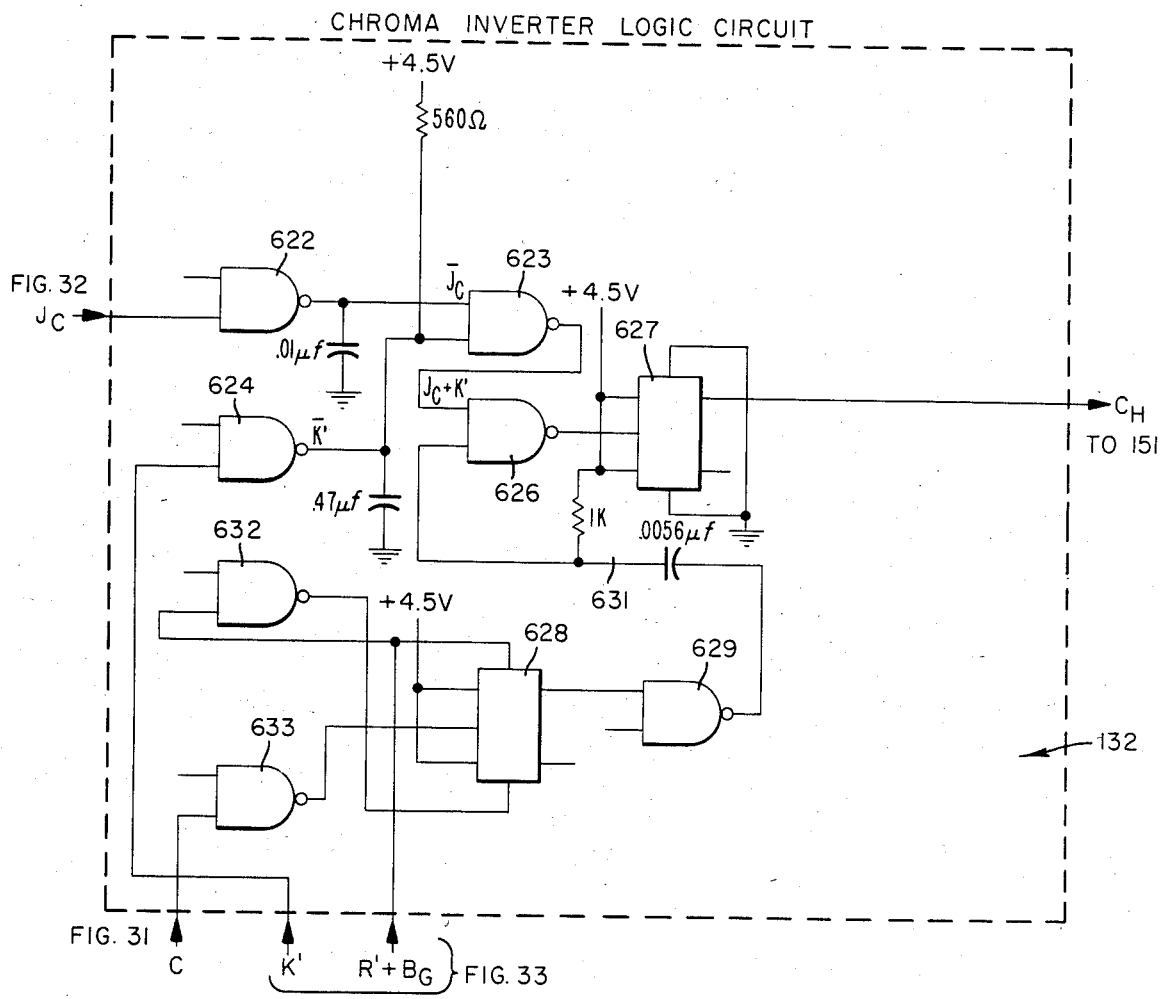
FIG_37

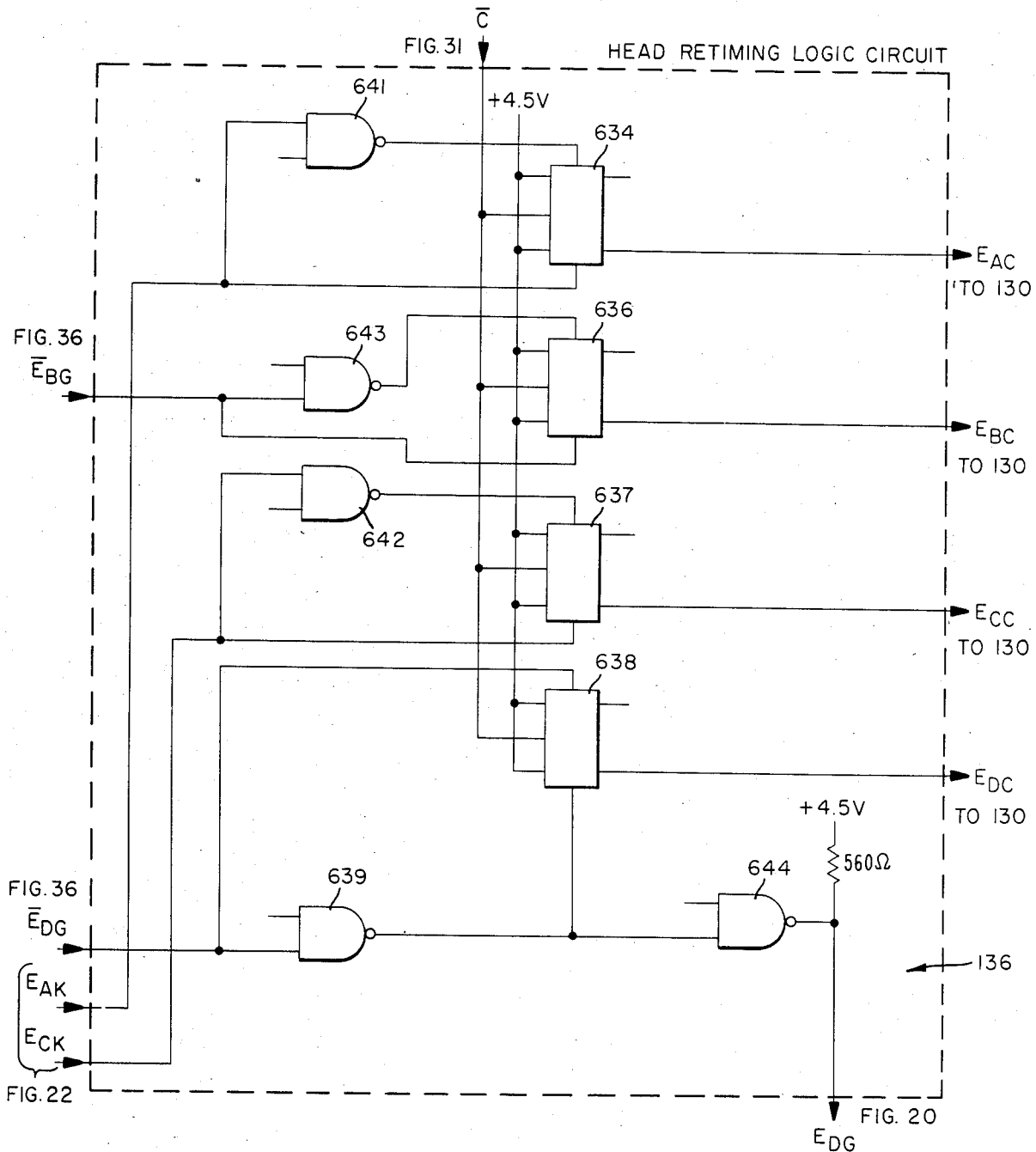
FIG_38

METHOD AND APPARATUS FOR RECORDING AND REPRODUCING TELEVISION OR OTHER BROAD BAND SIGNALS WITH AN ALTERED TIME BASE EFFECT

The present invention relates to a method and apparatus for recording and reproducing broad band signals, such as television and instrumentation signals, and more particularly to a method and apparatus for recording such signals on a magnetic medium and then reproducing such signals with an altered time base effect.

Normally, broad band signals, that is signals having a frequency range above about 1 megahertz, for example, television and instrumentation (analog) signals, are recorded by transverse tape recorders, such as the VR 2000 (video) or the FR 700 (instrumentation), and helical scan video tape recorders, such as the VR 660, all of which are sold by the assignee of this application. Small segments of television signals have been recorded by disc recorders. To obtain an altered time base effect in such recorders (e.g., in the case of television signals, slow motion, faster than normal motion and stop motion), the overall time length of the recorded event should be changed without altering the individual frequencies. All the frequencies would be changed in the signal if the head to magnetic medium writing speed were changed during replay. In this connection, a composite television signal, in present day television systems, defines a continuous series of equal time periods called frames, each frame being divided into two equal time periods, called fields. The fields are interlaced and each field contains signals corresponding to a full scan of a television screen. The fields are identified by vertical sync pulses and the video signal within each field is interspersed with horizontal sync pulses which separate adjacent lines of the television picture. The television receiver contains internal synchronizing circuits that are designed to operate in response to the vertical and horizontal sync signals to produce an orderly scan of the television screen. If a different head to magnetic medium writing speed were employed during reproducing than during recording, substantial timing differences would be introduced in the synchronizing pulses which would result in loss of synchronization in the receiver. To provide an altered time base effect, the timing of the synchronization pulses should not be changed.

Various methods have been previously employed to record and reproduce video signals with a different time base effect. In one method, the television signal is recorded on a magnetic tape by a helical scan recorder so that a complete frame or field is recorded on each oblique track and so that the horizontal sync pulses in adjacent tracks are aligned. By suitably selecting the tape speed during replay, slow motion, faster than normal or stop motion may be obtained. With this method, it is difficult to adjust the recorder for any selected speed of slow motion and the reproduced picture is noisy and tends to breakup. Also, because the track lenth changed with a change of tape speed, the reproduced signal did not meet broadcast standards.

In a second method, the television signal is recorded on and reproduced from a spiral track on the upper surface of a magnetic disc (i.e. the recording/reproducing head advances radially as the disc rotates). A second head is disposed in a fixed radial position on the lower surface of the disc. This disc recorder has not been versatile, did not record color, and had a relatively low replay capacity.

An object of the present invention is the provision of an improved method and apparatus for recording and reproducing broad band signals, such as television and instrumentation signals, with an altered time base effect.

Another object of the invention is to provide a variable time base effect replay method and apparatus, in which the reproduced signal fully complies with broadcast standards even during changes of speed or direction of motion.

Still another object is the provision of an apparatus for providing color instant replay in slow and stop action.

Other objects and advantages of the present invention will become apparent from the detailed description and accompanying drawings in which:

FIG. 2 is a plan view of the apparatus of FIG. 1 with portions of the discs broken away to better illustrate the four head mounting and stepping mechanisms;

FIG. 3 is an enlarged plan view of one of the head mounting and stepping mechanisms of the apparatus of FIG. 2;

FIG. 4 is an elevational view of the head mounting and stepping mechanism of FIG. 3;

FIG. 5 is an enlarged cross-sectional view taken along the plane of line 5—5 of FIG. 4;

FIG. 6 is a perspective view of a portion of the head mounting and stepping mechanism of FIG. 3;

FIG. 7 is a perspective view similar to that of FIG. 6 but with parts removed and portions broken away to better illustrate certain features of the mechanism;

FIG. 8 is a different perspective view of the apparatus of FIG. 7;

FIG. 9 is an end elevational view of the apparatus of FIG. 8;

FIG. 10 is a three sheet block diagram of the circuit of the apparatus shown in FIG. 1, FIG. 10d showing how FIG. 10a, FIG. 10b and FIG. 10c are arranged to form the complete block diagram;

FIGS. 12a and 12b show the relationship of various wave forms in the circuit shown in FIG. 10 and the associated stepping of the heads during recording and during playback at normal speed;

FIG. 13 is a graph showing the stepping of the heads during normal speed forward and reverse motion replay;

FIG. 14 shows various wave forms in the circuit shown in FIG. 10 and the associated stepping of the heads during normal and slow motion replay;

FIG. 15 is a circuit diagram of the speed control means in the control circuit of FIG. 10c;

FIG. 20 is a circuit diagram of the clock motor control means in the control circuit of FIG. 10c;

FIG. 21 is a circuit diagram of the carriage logic circuit in the disc/servo circuit of FIG. 10a;

FIG. 22 is a circuit diagram of the reverse motion logic circuit in the disc/servo circuit of FIG. 10a;

FIG. 23 is a circuit diagram of the carriage control logic circuit in the disc/servo circuit of FIG. 10a;

FIG. 24 is a circuit diagram of the carriage retiming logic circuit in the disc/servo circuit of FIG. 10a;

FIG. 25 is a circuit diagram of the carriage reversing logic circuit on the disc/servo circuit of FIG. 10a;

FIG. 26 is a circuit diagram of the carriage error correction logic circuit in the disc/servo circuit of FIG. 10a;

FIGS. 27a and 27b are a circuit diagram of the sync separator in the electronics circuit of FIG. 10b;

FIG. 28 is a circuit diagram of the servo reference delay in the electronics circuit of FIG. 10b;

FIG. 29 is a circuit diagram of the slow motion quantizer in the electronics circuit of FIG. 10b;

FIGS. 30a and 30b are a circuit diagram of the fast search logic circuit in the electronics circuit of FIG. 10b;

FIG. 31 is a circuit diagram of a clock generator in the electronics circuit in the electronics circuit of FIG. 10b;

FIG. 33 is a circuit diagram of an alternate field switch on the electronics circuit of FIG. 10b;

FIG. 34 is a circuit diagram of an alternate field logic circuit in the electronics circuit of FIG. 10b;

FIG. 35 is a circuit diagram of a $\frac{1}{2}$ line delay logic circuit in the electronics circuit of FIG. 10b;

FIG. 36 is a circuit diagram of a head logic circuit in the electronics circuit of FIG. 10b;

FIG. 37 is a circuit diagram of a chroma inverter logic circuit in the electronics circuit of FIG. 10b; and FIG. 38 is a circuit diagram of a head retiming logic circuit in the electronics circuit of FIG. 10b.

Figure 1:
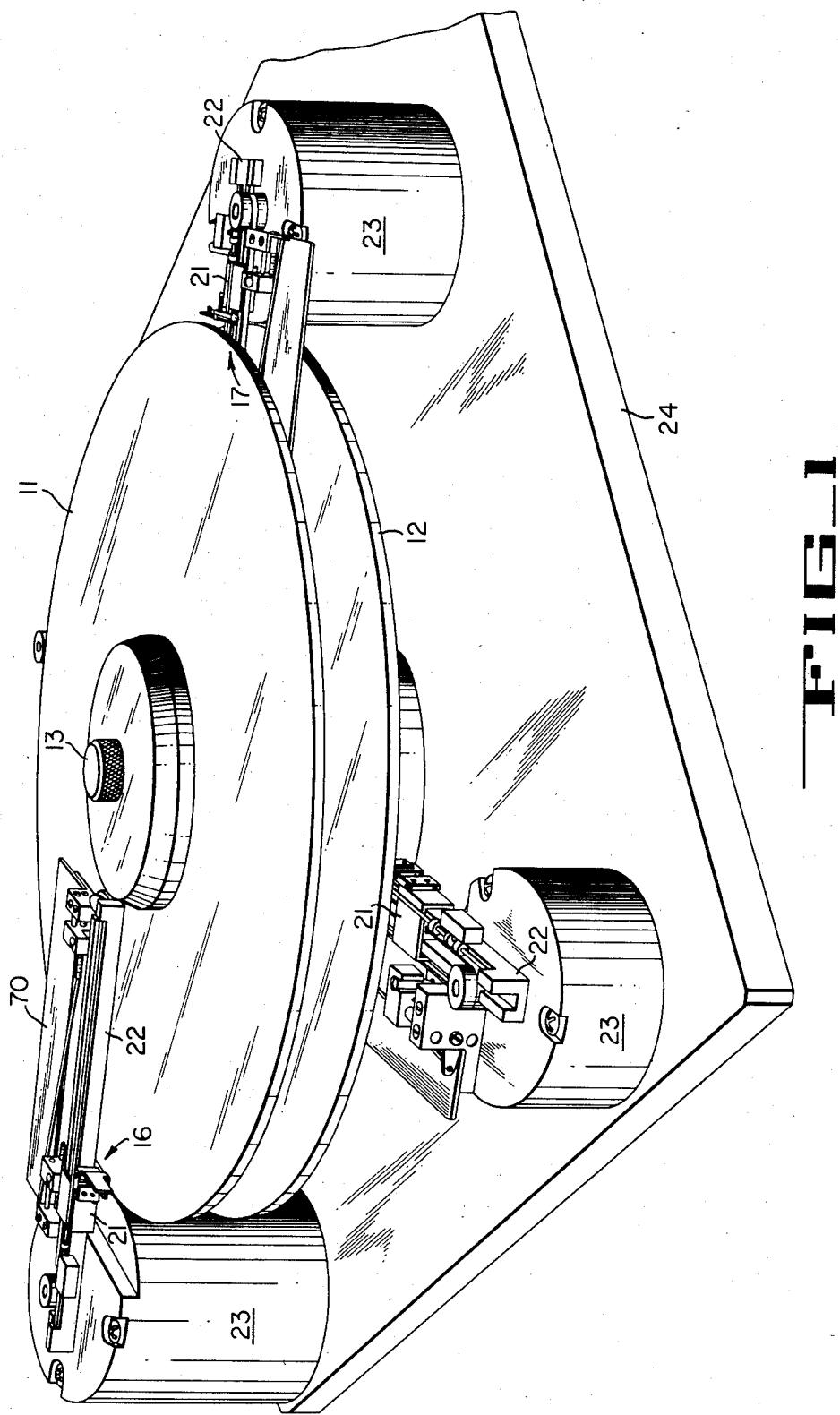
FIG. 1 is a perspective view of the mechanical portion of a recording and reproducing apparatus for practicing the method of the invention showing the relationship of three of four head mounting and stepping mechanisms with respect to the surfaces of two recording discs.

In accordance with the present invention, a method is provided for recording broad band signals, such as television signals and instrumentation signals, (e.g., radar signals) and replaying the same with an altered time base effect. Generally, the method comprises recording equal periods of the broad band signal in sequence on at least one magnetic medium, with each of the respective periods of the signal being recorded at a particular head to medium writing speed. During reproduction, the respective recorded periods are replayed with the same head to medium speed as used during recording but with preselected periods being repeated a pre-selected number of times, the selected periods and the number of repetitions being determined by the time base effect desired. The reproduced periods are formed into a constant output signal which provides the desired time base effect.

For purposes of description, the method of the invention is disclosed hereinafter in connection with an apparatus for practicing the method. The apparatus shown in the drawings is particularly adapted to record and reproduce a composite television signal on a plurality of recording mediums, for example, a pair of rotating discs having four recording surfaces. A sequential series of four equal time periods of the incoming signal are recorded on the recording surfaces, each period on a different one of the recording surfaces. In the case of a television signal, the equal period preferably is a complete field, however, other equal periods may be selected, such as frames. A recording head is provided for each surface and each head records one of the fields complete in an endless circular track and is then stepped incrementally by an associated stepping motor in a radial direction in preparation for recording a new field in the next series of four fields. During the period when one head is stepping, other fields are recorded by the other three heads so that each head records every fourth field and skips the intervening three. In this way, a large number of fields are stored on the discs. Each field may be replayed complete and repetitively according to a selectable pattern to provide a slow or stop motion effect; and the order may be reversed to provide a reverse motion effect at any speed. Means are provided to automatically select a suitable pattern of the replayed fields for any desired speed over a continuously variable range. Means are also provided for adjusting the reproduction of each field to ensure correct interlace of successive reproduced signals. The apparatus is easily rearranged for a flexible variety of other uses for example only every other incoming field may be recorded to provide a fast motion effect.

Referring now to the drawings, there is shown an apparatus for recording a standard NTSC color or monochrome video signal. As shown particularly in FIGS. 1 and 2 of the drawings, the apparatus includes four recording mediums provided by the upper and lower surfaces of a pair of magnetic recording discs 11 and 12 fixedly mounted in spaced parallel relationship on a spindle 13. The spindle is driven from below, in FIG. 1, at a constant rotational speed by a disc motor 15 controlled by a disc servo 15a which rotates the discs at the field rate (e.g., approximately 60 revolutions per second for NTSC) locked in phase to an external vertical sync reference as described hereinafter. Thus, each complete revolution of the discs corresponds exactly to one television field, beginning and ending during the vertical interval. The disc servo 15a preferably is of a velocity and phase control type, portions of which are disclosed in copending application Ser. Nos. 644,261 filed June 7, 1967 and 644,234, filed June 7, 1967, assigned to the assignee of this application, and the remainder of the disc servo 15a may be of a conventional type.

Each of the discs 11 and 12 includes a metal base coated on its upper and lower surfaces with a highly polished, thin layer of a magnetic recording material having optimum coercivity. Four radially moving recording, erasing, and reproducing heads 16, 17, 18 and 19 are provided each for engagement with a different one of the four disc surfaces. Each head is mounted on a hollow cylindrical head carriage or mount 21 encompassing and slidable on an arm 22, which in turn is solidly mounted on a housing of a stepping motor 23. The stepping motors are mounted on a base plate 24 at appropriate heights to position the various heads 16–19 adjacent their respective recording surfaces. All of the arms 22 and the mounts 21 are oriented with the same sides thereof facing upwardly, although the heads 16–19 are mounted thereon to face upwardly or downwardly according to whether they are intended to engage a lower surface or an upper recording disc surface, heads 16 and 17 facing downwardly, and heads 18 and 19 facing upwardly.

The structure of the arm 22 and typical mounting for the mount 21 and head 19 is shown in greater detail in FIGS. 3, 4 and 5. The arm 22 is formed as a channel member, in the channel 31 of which runs a metal belt 32, which is firmly attached intermediate its ends to the sliding mount 21, and at both ends to a drum 33 on the shaft 34 of the stepping motor 23 for causing radial stepping movement of the mount 21 whenever the motor steps as described hereinafter in detail. The belt 32 also runs around a pulley 36 mounted at the radially inner end of the arm 22 and set at a slight axial angle to the vertical so as to cause the return run 37 of the belt 32 to arrive at the drum 33 at a different level. The belt 32 is wrapped a plurality of times around the drum 33 mainly for the reason that the most suitable and available commercial stepping motor selected for the illustrated apparatus has fewer steps in one revolution than the number of tracks which can be recorded on the disc 11. The number of wraps and the size of the drum 33 are chosen, according to the relationship $$W = T/S = L/C$$

in which "W" is the number of wraps of the belt around drum 33, "T" is the number of tracks that would be described on the disc 11 through the full head-traversing range "L", "S" is the number of steps in one revolution of the motor 23, and "C" is the circumference of the drum 33. In the illustrated embodiment, the number of tracks is about three times as great as the number of motor steps, so the belt 32 is wrapped three full turns around drum 33. The wrapping of the belt for the radially most outward position of the head mount 21 is shown in FIG. 5, which also shows how the ends of the belt are secured in a radial slot 38 of the drum by means of set screws 39.

The radially most outward position of the mount 21 is shown in FIGS. 3 and 4, in which the mount engages a "fail-safe" means 41 for de-energizing the stepping motor 23 at the outer limit of traverse "L" of the mount to avoid damage to the motor and belt coupling. The means 41 includes a microswitch 42 mounted on the stepping motor 23 and having a plunger 43 that engages a concave cam 44. The cam is mounted on a rod 46 that is in turn loosely mounted at the ends of sockets 47 formed in extensions of the arm 22 so that the rod and cam 44 have sufficient lengthwise play to actuate the microswitch. A stop block 48 is attached to the rod 46 at the outer limit of range "L", and a second stop block is attached to the rod at the inner limit of range "L." The top blocks 48 are engaged by the mount 21 at these limits to operate the microswitch 42 and de-energize the stepping motor 23.

In the actual operation of the apparatus, the full traverse range "L" is not used and the operation of stepping motor 23 is reversed at the ends of a smaller traverse range l (FIG. 3). The limits of the smaller traverse range l are defined by a pair of identical photocell means 51 and 52 which sense the arrival of the mount 21 and are connected to electrical circuits, described hereinafter in detail, for controlling the reversal of the stepping motor. The photocell means 52 which is shown in detail in FIG. 6, includes a block 53 in which is mounted a downwardly directed light source 54, and an apertured mask 56 beneath the source. Beneath the mask is a photocell 57 also mounted in the block 53 and the photocell receives light from the source 54 whenever a plate 58, that is attached to the head mount 21, does not intervene between the light source and photocell. The blocks 53 are each mounted for radial sliding motion on a pair of pins 61 (FIG. 3) and are adjusted in radial position by means of turnscrews 62 threaded through the respective blocks intermediate the pins and extending from respective brackets 63 and 64 that are mounted respectively on the motor 23 and arm 22. The brackets 63 and 64 also serve to mount the pins 61. Compression springs 66 are mounted on the pins 61 and bear between the blocks and brackets. The inner turnscrew 62 is conveniently adjustable from the side of the apparatus by means of an extension 67 coupled thereto by a flexible coupling 68 and extending through a portion of bracket 63. In operation, whenever the head mount 21 reaches one end of the operative traverse range l, the plate 58 cuts off the light to one of the photocells, resulting in a change in the electrical signal from the photocell, which change is employed to inhibit further movement of the stepping motor 23 and condition it for reverse movement. If either of the means 51, 52 fails to function, the motor is stopped by the microswitch 42 when the mount 21 reaches the corresponding limit of traverse range L.

A pair of prewarning photocell means 69a and 69b similar to those previously described are mounted on the arm 22 associated with the head 16, one 69a being positioned so as to be actuated by the head mount 21 a few tracks prior to the actuation of inner photocell means 51. The other prewarning photocell means 69b is positioned so as to be actuated by the head mount 21 a few tracks prior to the actuation of the outer photocell means 52. The prewarning photocell means 69a and 69b are employed, as described fully hereinafter, to slow the carriage down to normal speed prior to reversal during the fast search mode of operation.

The arm 22 also serves to mount circuit board 70 containing certain electronic components.

The mounting of the head mount 21 for sliding movement on the channel arm 22 is shown in FIG. 7. Of course, it is desirable to have the mount 21 bear solidly down upon the top surfaces 71 and 72 of the arm in order to enable accurate positioning of the head 19 against the recording surface of the disc and precise control as well of the bearing pressure between the head and disc. To this end, three bearing members 73, 74 and 75 are inset in the mount 21, members 73 and 74 bearing against surface 71, and member 75 bearing against surface 72. This arrangement provides a three-point suspension for the mount. Likewise, a firm gauge bearing is desired on the upstream side of the assembly with respect to the direction of rotative motion of the disc, which is from upper right to lower left as shown by arrow 76 in the Figure. Therefore, a pair of bearing members 77 and 78 are inserted in the mount 21 to bear against the upstream side 79 of the arm 22. The bearing members 73–75 and 77, 78 are formed of hard, wear-resistant, low-friction material, and project slightly from the walls of the mount 21 to constitute the sole engagement of the mount 21 with the upper and upstream sides of the arm 22. To ensure solid engagement of these bearing members, there are also provided a pair of spring-loaded rollers 81 and 82 that are mounted on the mount 21 to engage the downstream and lower sides, respectively, of the arm 22. The rollers 81, 82 are each mounted for rotation on extensions 83 that extend through openings 84 in the mount 21, from the midpoints of respective leaf springs 86. The springs 86 are each solidly mounted at one end by means of a bolt 87 extending through a spacing tube 88 and threaded into the mount 21. At the other end, each spring 86 is secured to the mount 21 by a bolt 89 that may be tightened or loosened to increase or decrease the bearing force of the respective roller 81 against the mount 21. Except for rollers 81 and 82 and bearing members 73–75 and 77, 78, there is no contact between the mount 21 and arm 22, all other parts of the mount being spaced substantially away from the arm, as shown in FIG. 9.

Details of the mounting of head 19 on the mount 21 are shown in FIGS. 8 and 9. The head 19 consists of a very tiny element in the form of a block or wafer, having a magnetic transducing gap (not shown) transverse to the direction of movement (arrow 76) of the recording surface. The element 19 is mounted at the downstream apex of a small triangular plate 91, at the two upstream corners of which are inserted a pair of hard, wear-resistant, low friction bearing elements 92 and 93. The head element 19 together with the bearing elements 92, 93, provide a three-point contact of the assembly 19, 91-93 with the recording surface, to ensure that the head will not be tilted in either the Y-Z plane or the X-Z plane. A correct orientation of the head 19 in the X-Y plane is maintained by mounting the triangular plate 91 at the downstream end of a long spring leaf 94 which is rigid in the X and Y directions, flexible in the Z direction, and torsionally flexible, and which in turn is secured at its upstream end to a bracket means 96 extending from the mount 21. Thus, the head 19 is always "trailing" and tends to swing into correct orientation and position in the X-Y plane.

The position and orientation of the head 19 being thus provided for, it is desirable further to be able to adjust the bearing pressure of the head 19 and to ensure that the bearing pressures of the elements 92 and 93 are substantially equal, for the optimum transducing efficiency and least damage and wear of the bearing surfaces. The equalization of the bearing pressures of elements 92, 93 is arranged for in the means 96, which includes a bracket 97 mounting the spring leaf 94. The bracket 97 is secured to one of a pair of blocks 98, 99 particularly the block 98, by means of a pin 101 and bolt 102. The block 99 is secured to the mount 21. The blocks 98,99 are arranged to lie in the Y-Z plane and are coupled at their upper ends by a leaf spring 103. A compression spring 104 inset between the blocks at their midpoints urges them apart, while a bolt 106 passing freely through the block 99 and threaded into the block 98 adjustably retains them together against the pressure of spring 104. Thus, by operating the bolt 106, the block 98, bracket 97, and plate 91 can be tilted in the Y-Z plane until the bearing pressures of elements 92, 93 are equalized.

The leaf spring 94 is not stiff enough to support the weight of the plate 91 without flexing, and the actual bearing pressure for the head is supplied by a leaf mainspring 107 extending from an adjustably rotatable block 108 that is mounted on the bracket 97. The block 108 is tightly bolted to the bracket, but the bolt (not shown) may be loosened for rotation of the block 108 as by means of a screwdriver slot 109 and the bolt may then be re-tightened. The other end of the spring 107 bears against a jewel bearing 111 fixed precisely at the center of the triangular plate 91, so as to further insure an equal distribution of the bearing forces to head 19 and bearings 92 and 93. When it is desired to change heads or for any reason to relieve the head bearing pressure without altering the setting of the block 108 and spring 107, an eccentric screw 112 is rotated. The screw 112 is threaded into the bracket 97 and when so rotated engages a redoubled lip 113 extending from the spring 107 so as to draw the spring away from the bearing 111.

To arrange the head element for bearing against one of the upper disc surfaces, as in the case of heads 16 and 18 the assembly of blocks 98, 99 is detached from both the mount 21 and the bracket 97. The blocks 98, 99 are then rotated 180 degrees about the Y-axis and refastened to the upstream side of block 98. The pin 101 extends equally far from both sides of the block 98, and the threaded hold for bolt 102 transpierces the block. A screw 114 clamps the belt 32 between a pair of parallel flanges 115 that extend from the mount 21 into the channel of arm 22.

A circuit 116 for controlling the operation of the stepping motors 23 is shown in block form in FIG. 10a interconnected with the block diagram of a control circuit 117 (FIG. 10c) which contains the controls used in operating the apparatus and with the block diagram of an electronics circuit 118 (FIG. 10b) which contains the signal electronics and control logic of the block diagram. A signal indicated with a letter with a line on the top thereof is the complementary signal of the signal indicated with the same letter without the line. Also, in the description hereinafter, signals are described as being at 1 or 0 which means the signals are equal to the binary value 1 or the binary value 0. The recording of a video signal on the device will first be described. As shown in FIG. 10b, a composite sync signal which may be provided by the broadcast station, is applied to a sync separator circuit 121 which derives a servo reference pulse $S_r$ which corresponds in timing to the first serration of the vertical sync pulse in the composite sync signal (FIG. 12a). This reference pulse $S_r$ is applied to a servo reference delay 122 wherein the servo reference pulse $S_r$ is delayed by 15 micro-seconds during recording for a purpose described hereinafter. The delayed servo reference pulse $R_d$ is applied to the disc servo 15a of the disc motor 15. The disc servo 15a locks the disc motion to the delayed reference pulse $R_d$ so that as previously indicated, the disc is in the same angular position for each vertical pulse. The 15 micro-second delay of the servo reference pulse is provided during record mode so as to make it possible during playback to advance the position of the disc to thereby compensate for signal delay in the video electronics.

A video signal, such as a live television (video) signal or a television signal that is being reproduced at normal speed from a magnetic tape, is coupled to the input frequency modulator 123 (FIG. 10b), which may be conventional. The frequency modulated output of the modulator 123 is coupled through a record amplifier 125 to four record gates 124, one for each head 16–19. In the record mode the four record gates 124, which may be conventional analog gates are operated in sequence for the duration of one field by signals $E_{ac}$, $E_{bc}$, $E_{cc}$, and $E_{dc}$, which are four similar signals comprising a series of pulses, the signals being 90° out of phase with each other as shown in FIG. 12b and as described hereinafter. The outputs of the record gates 124 are coupled through respective record/reproduce relays in a head amplifier circuit 126, to the respective heads 16, 17, 18 and 19 which record the signals on the discs 11 and 12. In the discussion hereinafter, it shall be assumed that the discs 11 and 12 are rotating at the proper speed and that the apparatus has been placed in the record mode of operation by the operator pressing a record button S2 in a playback direction control means 127. The pressing of the record button S2 causes Q₁ to be equal to 0 which, in turn, in a control logic circuit 128 causes P₄ and P₂ to be equal to 1. The presence of the P₄=1 signal at four "and" gates (not shown) in a reproduce gates circuit 130 causes the signals $E_{ac}$, $E_{bc}$, $E_{cc}$, and $E_{dc}$ to be applied to the record gates 124.

Figure 11:
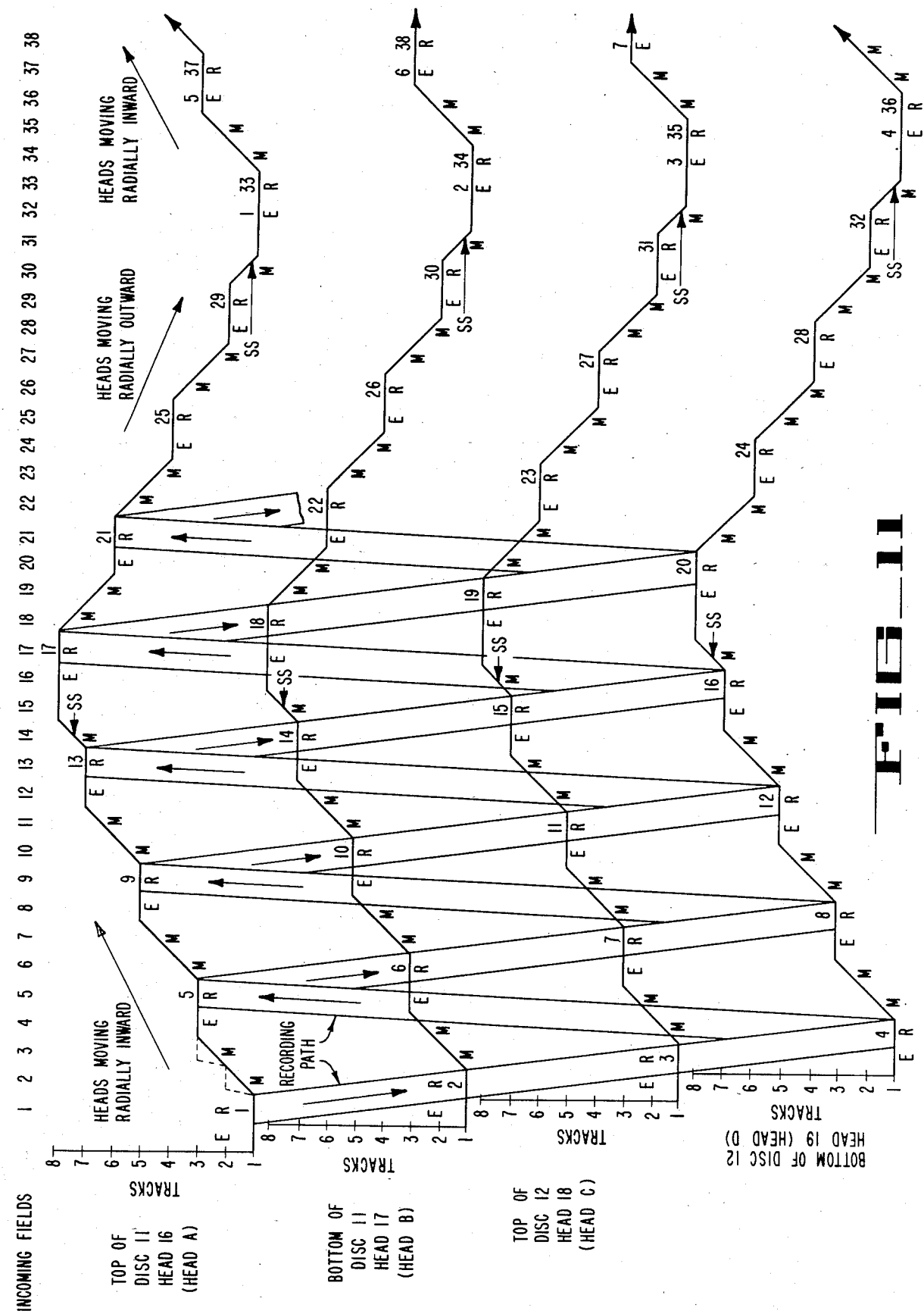
FIG. 11 is a graph showing the relationship of the stepping of the heads and the incoming signal during recording and during playback at normal speed.

The manner in which the stepping motors are stepped and the heads energized is illustrated in a four-part graph. In FIG. 11, each part represents the recording operation of one of the disc surfaces and its associated head. For convenience, the heads are referred to hereinafter as heads a, b, c and d instead of by the reference numerals 16, 17, 18 and 19 and associated circuits and waveforms are identified with the same subscript. It is also assumed that the heads are at the outermost tracks of the discs. The y axis of each part of the graph represents eight tracks of an eight-track disc with the outermost track being numbered 1 the number of tracks being assumed at this figure for the sake of simplicity and for illustrative purposes only; it being understood that the actual discs used in the apparatus have room for many more tracks. The four parts of the graph have a common x axis time base labeled at the top of the page as incoming fields and an assumed sequence of such fields numbered from 1 through 38 is shown. The incoming fields represent the fields of the video signal being recorded.

As shown on the graph, during the time before incoming field "1" arrives, head a is on track 1 of its associated disc surface a, with the disc making one 360-degree revolution during this time period, and the head is in erase mode as indicated by the label "E".

During the first time interval, when field "1" is incoming, the signal $E_{ac}$ is equal to 1 and it opens the record gate 124a associated with head a, thereby coupling the output of the record amplifier 125 to head a. Head a thus records field "1" on track 1 of disc surface a. At the same time, a DC erase signal is applied to the next head, head b, on track 1 of disc surface b. The DC erase signal is applied through one of four erase "and" gates (not shown) in the head amplifier circuit 126 which gate is connected to head b and is actuated for one field by the pulse $E_{ac}$ supplied by the "and" gates in the reproduced gates circuit 130. gates circuit 130.

During the second time interval, the signal $E_{bc}$ 1 causes the record gate 124b to couple field 2 to head b thereby recording the same on track 1 of disc surface b and the erase signal is coupled through the erase gate (not shown) associated with head c, which gate is actuated by the pulse $E_{bc}$ whereby head c erases track 1 of disc surface c. At the same time a pulse $F_{aci}$ (described hereinafter) is applied to through a motor drive amplifier 129a, described hereinafter, to the stepping motor 23a (FIG. 10a) and head a is stepped from track 1 to track 2 of disc surface a.

During the third time interval, the pulse $E_{cc}$ causes the record gate 124c to couple field 3 to head c thereby recording the same on track 1 of the disc surface c and causes head d to erase on track 1 of disc surface d. The pulse $F_{aci}$ is again applied to the motor drive amplifier 127a causing the stepping motor a to step head a from track 2 to track 3 of disc surface a, and a pulse $F_{bci}$ is applied to the motor drive amplifier 129b which causes stepping motor b to be energized and step head b from track 1 to track 2 of disc surface b.

Similarly, during the fourth time interval, the pulse $E_{dc}$ causes the record gate 124d to couple field 4 to head d on track 1 of disc surface d, and the pulse $E_{dc}$ causes head a to begin to repeat the cycle by erasing on track 3 of disc surface a. Pulse $F_{bci}$ is again applied to head b causing it to step to its track 3 and a pulse $F_{cci}$ is applied to motor drive amplifier 129c which energizes stepping motor c thereby stepping head c to its track 2.

It will be seen therefore, that each head follows a series of repeated sequences "Erase-Record-Move-Move" designated "ERMM" in FIG. 11, and that sequential fields in each group of four fields are recorded on different disc surfaces, the odd fields being recorded on disc surfaces a and c and the even fields on disc surfaces b and d. The sequence of recording can be followed from head to head and disc surface to disc surface by means of the "recording path", bearing arrows, that is traced on FIG. 11. Furthermore, while the heads are recording and moving in a radially inward direction, they record only on alternate (odd numbered) tracks on the respective disc surfaces, it being planned to use the intervening (even numbered) tracks while the heads are moving radially outwardly. This skipping of alternate tracks is the requirement that dictates the two stepping or "Move" actions in sequence. For clarity on the drawing these "Move" steps are shown as 45-degree straight lines. However, the moving time of each head is actually somewhat less than one-fifth of the time interval corresponding to a field, as shown in dashed lines for the first two "Move" steps of head a. Thus, the entire sequence could be performed at five times the normal recording or playback speed, as is required in a "fast search" mode later to be described.

The signals $E_{ac}$, $E_{bc}$, $E_{cc}$, and $E_{cd}$ (FIG. 12b) for switching the record gates 124 are generated in the following manner. As shown in FIG. 12a, a signal T is generated in the sync separator circuit 121. The T signal includes a series of pulses each of which is a positive return to zero pulse which begins at the end of the last line horizontal sync pulse of the composite sync signal extends through equalization, vertical sync and equalization and terminates prior to the beginning of the first line horizontal sync pulse. The signal T is coupled to a fast search logic circuit 131 and a corresponding signal $T_s$ is produced at the output of the fast search logic circuit 131 as long as the apparatus is not in its fast search mode of operation (P₄ equal to 1). The signal $T_s$ is coupled to a clock generator 132 which provides a pre-pulse G (FIG. 12a) coincident with the front of each pulse $T_s$ and a clock pulse C coincident with the back of the pulse $T_s$. Hereinafter pulses timed by G and C are respectively indicated with the subscript "g" and "c".

In the clock generator 132, the pre-pulse G is divided by 2 so that it is driven to one by a first pre-pulse G, to zero by the second pre-pulse G, then to one by the third pre-pulse, etc. thereby providing a rectangular wave $B_g$ (FIG. 12a). In other words, the zero crossings (transitions) of the rectangular wave $B_g$ are coincident with the pre-pulses G. The rectangular wave $B_g$ is coupled to a slow motion logic circuit 133 wherein, in the normal record mode of operation ($W_s=0$) the wave $B_g$ produces at its output a corresponding rectangular wave $D_g$. The clock pulse C is also applied to the slow motion logic circuit 133 and produces at its output during the record mode a corresponding pulse $J_c$. The wave form $D_g$ is coupled to a head logic circuit 134. In the head logic circuit 134, the wave form $D_g$ is divided by 2 forming a rectangular wave form L (FIG. 12b). From the two wave forms $D_g$ and L, four head switching signals $E_{ag}$, $E_{bg}$, $E_{cg}$ and $E_{dg}$ are produced in the head logic circuit 134, the signals being each a series of equally spaced pulses and being the same except being out of phase by 90 degrees with respect to each other. The pulse $E_{ag}$ has a rise corresponding to the rise of the first L pulse or the first $D_g$ pulse and a back corresponding to the back of the first $D_g$ pulse. Pulse $E_{bg}$ has a front corresponding to the back of the first $D_g$ pulse and a back corresponding to the back of the first L pulse or front of the second $D_g$ pulse. Pulse $E_{cg}$ has a front corresponding to the back of the first L pulse or front of the second $D_g$ pulse and a back corresponding to the back of the second $D_g$ pulse. Pulse $E_{dg}$ has a front corresponding to the back of the second $D_g$ pulse and a back corresponding to the front of the second L pulse or front of the third $D_g$ pulse.

The head switching signals $\bar{E}_{bg}$ and $\bar{E}_{dg}$ are coupled to a head retiming logic circuit 126. The signals $\bar{E}_{ag}$ and $\bar{E}_{cg}$ are coupled through a carriage logic circuit 137 and a reverse motion logic circuit 138 and, in the record mode, appear at the output of the reverse motion logic circuit 138 as corresponding signals $\bar{E}_{ak}$ and $\bar{E}_{ck}$. The signals $\bar{E}_{ak}$ and $\bar{E}_{ck}$ from the reverse motion logic circuit 138 are coupled to the head retiming logic circuit 136. In the head retiming logic circuit 136, a clock pulse $\bar{C}$ received from the clock generator 132 times the transitions of the input pulses $\bar{E}_{bg}$, $\bar{E}_{dg}$, $\bar{E}_{ak}$, and $\bar{E}_{ck}$ which were coincident with the prepulses G, so that the transitions of the E pulses at the output, $E_{ac}$, $E_{bc}$, $E_{cc}$, and $E_{dc}$, are coincident with the clock pulses C. Thus the transitions of the output pulses of the head retiming logic circuit 136 are coincident with the end of the last equalization pulse of each field. The outputs of the head retiming logic circuit 136 are applied to the record gates 124 via the "and" gates in the reproduce gates circuit 138, at the end of the last equalization pulse of each field.

In the carriage logic circuit 137 the signals $E_{ag}$, $E_{bg}$, $E_{cg}$, and $E_{dg}$ are formed into carriage signals $F_{ag}$, $F_{bg}$, $F_{cg}$ and $F_{dg}$ for stepping the head carriages 23. As shown in FIG. 12b each pulse $F_{ag}$ is equal in time to the pulse $E_{bg}$ plus the pulse $E_{dg}$, each pulse $F_{bg}$ is equal in time to $E_{cg}$ plus $E_{dg}$, $F_{cg}$ is equal in time to $E_{dg}$ plus $E_{ag}$, and $F_{dg}$ is equal in time to $E_{ag}$ plus $E_{bg}$.

The carriage signals $F_{bg}$ and $F_{dg}$ for carriages b and d are coupled to a carriage control logic circuit 139 and appear as corresponding pulses F'b and F'd at the output. The carriage signals $\bar{F}_{ag}$ and $\bar{F}_{cg}$ for carriage a and c are applied to the reverse motion logic circuit 138 and in the record mode ($P_{2s}=1$), the carriage signals $\bar{F}_{ag}$ and $\bar{F}_{cg}$ produce at the output of the reverse motion logic circuit 138 corresponding, but complementary, signals $F_{ak}$ and $F_{ck}$. The signals $F_{ak}$ and $F_{ck}$ are applied to the carriage control logic circuit 139 and appear at the output as corresponding signals $F'_a$ and $F'_c$.

The carriage signals $F'_a$, $F'_b$, $F'_c$ and $F'_d$ are applied to a carriage retiming logic circuit 141 wherein the carriage signals are retimed by the clock pulses C from the clock generator 132. The retimed carriage signals gate $J_c$ pulses from the slow motion logic circuit 133 (FIG. 12b). The $J_c$ pulses correspond during the record mode ($W_s-0$) with the clock pulses C but are delayed two micro-seconds in the carriage retiming logic circuit 141 so as not to coincide with the zero crossing of the retimed carriage pulses. The gated $J_c$ pulses at the output of the carriage retiming logic circuit 141 are identified as signals $F_{ac}$, $F_{bc}$, $F_{cc}$ and $F_{dc}$ and are return to zero pulses of 20 micro-second duration. A signal Q is applied to the carriage retiming logic circuit 141 which inhibits the carriage signals when the disc servo is not operating, therefore preventing the carriages from moving along the discs when they are not rotating.

These return to zero carriage pulses are coupled to a carriage error correction logic circuit 142 and for inward movement of the carriages (M=0) appear as pulses at the outputs $F_{aci}$, $F_{abci}$, $F_{cci}$ and $F_{dci}$. These pulses are applied to motor drive amplifiers 129 and which, in turn, control the associated stepping motors 23 to thereby cause the carriages to be stepped inward, the carriage being stepped once for each pulse. Thus it can be seen that each carriage rests for two fields and then is stepped at approximately the end of the last equalization pulse of the next two fields (two steps).

The carriages 23 continue to step inward until head a arrives at the radially innermost limit of range I. At this point, the head carriage 21a actuates the innermost photocell device 51a ($Y_a$ in FIG. 10a). The operative position of $Y_a$ photocell device 51a is carefully adjusted to be substantially at the mid-point of the first step after the innermost odd numbered track, i.e., between track s 7 and 8 as shown by the arrow labeled SS in FIG. 11. The $Y_a$ photocell device 51a inhibits the associated stepping motor 23a from causing further inward movement and conditions the stepping motor for causing outward movement of the carriage. In this connection, the signal $Y_a$ is coupled to a carriage reversing logic circuit 143 and its complement at the output of that circuit is coupled to the carriage error correction logic circuit 142. In the carriage error correction logic circuit 142, the signal $Y_a$ inhibits signal $F_{aci}$ thereby preventing further inward movement of head a. Head a thus dwells on track 8 while field 15 is arriving instead of making another inward step. Subsequently, the pulse $E_{dc}$ causes head a to erase on track 8 (field interval 16) and then the pulse $E_{ac}$ causes head a to record field 17 on track 8. Likewise, during field intervals 15, 16 and 17 the head carriages 21b, 21c and 21d actuate the photocell devices 51b, 51c, and 51d respectively. The generated signals $Y_b$, $Y_c$ and $Y_d$ after being inverted in the carriage reversing logic circuit 143 inhibit signals $F_{bci}$, $F_{cci}$ and $F_{dci}$, respectively, in the carriage error correction logic circuit 142.

When all inner photocell devices 51 are actuated, and the pulse $E_{bg}$ and the pulse $J_c$ are coincident. The carriage reversing logic circuit 143 causes a signal M to be switched from 0 to 1. Thereafter, the pulses $F_{bc}$, $F_{cc}$, $F_{dc}$ and $F_{ac}$ cause $F_{bco}$, $F_{cco}$, $F_{dco}$ and $F_{aco}$ pulses to be applied to the associated motor drive amplifiers 129 resulting in outward stepping of the respective carriage motors 23.

During field intervals 18 and 19, head a is stepped radially outward to even numbered track 6 and then continues outwardly in normal fashion until the head carriage 23a actuates the outer photocell device 52a as indicated by the arrows labeled SS between tracks 2 and 1 and field interval 30. The operations of heads b, c and d are exactly similar except that each is one field out of phase with the preceding head and each reaches its respective outer photocell device 52 one field interval after the preceding head.

When head a actuates its outer photocell device 52a the signal $X_a$ from the photocell device inhibits the second of the pulses $F_{ac}$ whereby further outward movement of the stepping motor 23a is inhibited. Likewise, the actuation of the outer photocell devices by the head carriages 23 of heads b, c and d generate signals $X_b$, $X_c$, and $X_d$ which after being inverted in the carriage reversing logic circuit 143 inhibit the second of the pulses $F_{bc}$, $F_{cc}$ and $F_{dc}$ whereby further outward movement of the respective carriages is inhibited. All of the carriages remain in their outer position until the reception of the next pulse $E_{bg}$ and the pulse $J_c$ at which point the pulses $F_{bc}$, $F_{cc}$, $F_{dc}$ and $F_{ac}$ produce pulses $F_{bci}$, $F_{cci}$, $F_{dci}$ and $F_{aci}$ pulses whereby the stepping motors are stepped inwardly. During the field interval 32, pulse $E_{dc}$ causes head a to erase field one from its track 1 and during field interval 33 pulse $E_{ac}$ causes the head a to record field 33 on track 1. Similarly, during field interval 36 head a erases field 5 from track 3 and during field interval 37 head a records field 37 on track 3. The operations of heads b, c, and d follow successfully as indicated above and as shown in FIG. 11.

The carriage reversing logic circuit 143 (FIG. 10a) is provided to hold each of the heads at the turning point (track 8 or track 1) until either all inner or all outer photocell devices are actuated, i.e., all heads have arrived at either the inner or outer limit, so that the heads step off in the opposite direction in correct time sequence. This corrects the error which occasionally happens when one of the heads does not correctly receive a stepping signal and in effect falls behind the others during the inward or outward traverse. Each such error is corrected no later than at the end of the traverse during which the error occurs.

The same sequence of operation of the stepping motors and heads is followed for normal speed forward replay from the discs except that in replay the erasing signals are not sent to the heads and each head is caused to reproduce during its R field interval instead of recording. The sequence of operation for normal speed forward of the reproduced picture is illustrated in the left of FIG. 13 and on the right in the same figure the reverse motion of the reproduced picture is illustrated. Reverse motion of the picture is defined herein as meaning an apparent reverse motion to the viewer of the action sequence producing, for example, the illusion of a broken vase reassembling itself and becoming whole again. In FIG. 13, it is assumed that the operator presses a normal speed replay button S9 in a speed control means 144 which causes $P_1$ to be equal to 1 and presses a forward button S5 in the playback direction control means 127 thereby causing the signal on line $P_4$ to be equal to 0. The absence of signal $P_4$ at each of four "and" gates in the reproduce gates circuit 130 causes the signals $E_{ac}$, $E_{bc}$, $E_{cc}$, and $E_{dc}$, to be applied to four "and" reproduce gates in the reproduce gates circuit 130, one for each channel. Thus, the reproduce gates 130 are switched sequentially by the same signals $E_{ac}$, $E_{bc}$, $E_{cc}$, and $E_{dc}$, which switched the record gates 124.

In replay, the heads are coupled through the respective record/reproduce relays to respective reproduce pre-amps in the head amplifier 126, which amplify the FM signals from the respective heads. The outputs of the pre-amps are respectively coupled to reproduce gates 130 which reconstitute the reproduced fields into a continuous FM signal which is coupled to an equalizer circuit 146. A predetermined amount of equalization is selected for the signal reproduced by each head by employing the head switching pulses $E_{ac}$, $E_{bc}$, $E_{cc}$, $E_{dc}$, to select the amount of equalization provided by the equalizer. The equalized reproduced signal is applied to a demodulator 147, the output of which is coupled to an electronic switch 148. The electronic switch 148 when actuated, couples a half line delay circuit 149 for a purpose hereinafter described, which includes a 30 megahertz amplitude modulator, an ultrasonic delay line operating on a center frequency of 30 megahertz, and a 30 megahertz demodulator. For normal replay, ($P_1=1$) the electronic switch 148 is not actuated and the reproduced video signal is coupled undelayed, through an output video amplifier 150 to a horizontal sync time base correcting circuit (Amtec) 150a, which provides for phase adjustment of the horizontal sync signal, and its associated video signal, to that of a horizontal drive signal, described hereinafter.

The output of the Amtec circuit 150a is applied to a chroma inverter circuit 151 which, when actuated, changes the phase of the chroma information by 130 degrees. This chroma inverter circuit 151 is described in a concurrently filed application entitled Chroma Inverter (I.D.-1560), Inventor Evangelos I. Pezirtzoglou. The Chroma inverter circuit 151 is actuated for a purpose described hereinafter when reproducing a color signal at certain times during other than normal replay. The output signal from the Chroma inverter 151 is coupled to a circuit 151a (Colortec) which provides for color phase adjustment of the composite video color output signal to that of an external color burst reference signal.

Delays are introduced in the reproduced signal by the Amtec and Colortec circuits 150a and 151a, and to compensate for these delays, the horizontal drive signal applied to the Amtec unit is delayed. In this connection, the horizontal sync pulses derived from the composite sync in the sync separator circuit is applied through a reference delay 151b to the Colortec circuit 151a. In the Colortec circuit, the horizontal drive is varied before it is applied to the Amtec circuit so that the Colortec operates in approximately the middle of its range of possible correction. That is, the reproduced color burst signal applied to Colortec circuit 151a is phased by the Amtec circuit to be approximately in the middle of the operating range of the Colortec circuit. The error voltage provided by the Amtec circuit 150a is coupled to the servo reference delay 122 wherein it varies the phase of the signal $R_d$ and thereby changes the position of the disc. This ensures that the Amtec circuit operates in the middle of its range of possible correction.

The output of the Colortec circuit 151a is coupled to a video signal processing amplifier (processor) 151c, which may be of the conventional type. The outputs of the processor are applied to a monitor (not shown) and to utilization circuit (not shown).

FIG. 13 shows a replay sequence which begins with the heads being coupled in sequence for one field interval to replay fields 5, 6, 7, 8, 9 and 10 in normal speed forward mode. Between field 10 and field 14 it is assumed that the operator presses a reverse button S3 in the playback direction control means 127. This produces a signal on $Q_2$ which in to control logic circuits 128 causes a signal $P_2$ to go from 1 to 0. The reverse signal $P_2$ is applied to the fast search logic circuit 131 and, if the apparatus is not in the fast search mode of operation, this signal appears on the output as $P_{2S}=0$. Signal $P_{2S}$ is applied to the reverse motion logic circuit 138. The reverse motion logic circuit 138 is arranged so as not to operate until the next $E_{bg}$ pulse after the $P_{2S}$ goes to 0. When the next $E_{bg}$ pulse is received the reverse motion logic circuit 138 causes a signal K to change from 0 to 1 and the signal $E_{ag}$ and the signal $E_{cg}$ to be interchanged in the sequence as shown in FIG. 13, that is, the signal $E_{cg}$ appears on the $E_{ak}$ output and the signal $E_{ag}$ appears on the $E_{ck}$ output. Likewise, the signals $F_{ag}$ and $F_{eg}$ are interchanged in sequence whereby the signal $F_{ag}$ appears at the $F_{ck}$ output and the signal $F_{cg}$ appears on the $F_{ak}$ output. In addition, a 20 microsecond pulse N is generated by the reverse motion logic circuit 138 each time the apparatus is switched from forward to reverse ($P_{2S}=0$) or vice versa ($P_{2S}=1$). The signal N is applied to the carriage reversing logic circuit 143 wherein the pulse N causes the signal M to change from 0 to 1 thereby causing the carriages to move outwardly and the fields are replayed in reverse order thereby giving the effect of reverse motion.

To avoid confusing the logic circuits, the reverse motion logic circuit 130 is arranged so that the apparatus can not go from forward to reverse or vice versa when any of the photocell devices 51 and 52 are actuated. More specifically, an inhibiting signal X+Y is supplied by the carriage reversing logic circuit 143 to the reverse motion logic circuit 138 whenever any of the X signals is equal to 1 or whenever any of the Y signals is equal to 1. Hence, before causing a reversal of the direction of motion of the apparatus, the reverse motion logic circuit 138 waits for the first $E_{bg}$ pulse after the X+Y signal is in a non-inhibit condition (i.e., equal to 0).

In addition, it should be noted that, in the reverse mode of operation, the carriages reach the photocell devices 51 and 52 at the end of second move rather than during the first move as in forward mode. So that tracking is proper the first move pulse of each carriage is inhibited before the carriages move away from the photocell devices. This is accomplished as follows: The first carriage to move away from the photocell device is carriage d. The first carriage pulse $F_{dc}$ is inhibited by the carriage error correction logic circuit 142 since the carriages do not go into radially inward-outward reverse until the second $F_{ac}$ pulse has caused the carriage a to actuate the photocell device; this is after the first $F_{dc}$ pulse. The first carriage pulse $F'_c$ is inhibited if carriage signal $F_{dg}$ equals 1 and if either of the photocell devices 51c or 52c is actuated. Thus, the carriage 21c does not move until after the carriage 21d, and thus is inhibited from receiving the first carriage pulse $F_{ac}$. Similarly, the carriage pulse $F'_b$ is inhibited if carriage signal $F_{ck}$ equals 1 and if either photocell device 51b or 52b are actuated and the carriage pulse $F'_a$ is inhibited if carriage pulse $F_{bk}=1$ and if either photocell device 51a or 52a are actuated.

The apparatus will continue in its reverse mode of operation until the forward button S5 is pressed. At this point the $P_2$ signal goes to one and accordingly $P_{2S}$ signal goes to one. The presence of the $P_{2S}$ signal in the reverse motion logic circuit 138 causes the reverse motion logic circuit to switch the apparatus back to its forward mode. However, this does not occur until the first $E_{bg}$ signal after the initiation of the $P_2$ signal as shown in FIG. 13. When the reverse motion logic circuit is switched to its forward condition, signal K is changed from 0 to 1 and the pulse N is produced. The pulse N causes the carriage reversing circuit 143 to change M from 0 to 1 which causes the carriages 23 to change radial direction. The signals $E_{ak}$ and $E_{ck}$ revert back to their forward condition wherein they are respectively controlled by the signal $E_{ag}$ and the signal $E_{bg}$. The appartus continues in its forward condition until a reverse signal is again applied.

In reverse, the head switching sequence preserves the normal progression of fields from odd to even but loses the track to track phase continuity of the chroma signal. Normally, to meet F.C.C. standards, at the beginning of each field the chroma phase lags in phase by 90° from what it was at the beginning of the previous field. In switching during the reverse mode of operation, for example, from head d to head c, we are switching from the end of one field to the beginning of the one which preceded it in the original recording. This constitutes a 180° chroma phase reversal which is corrected by reversing the chroma phase by inserting the chroma inverter 151 into the circuit. The insertion of the chroma inverter 151 is controlled by a chroma inverter logic circuit 152. The signal K from the reverse motion logic circuit 138, which is equal to 1 when the apparatus is in the reverse mode of operation, is coupled through an alternate field switch 153 (described hereinafter) and appears at the output of the alternate field switch as $K'=1$. This output $K'$ is coupled to the chroma inverter logic circuit 152. Each time a $J_c$ pulse is generated, which pulse, as previously described, causes a new field to be taken off the disc, the chroma inverter logic circuit 152 produces a pulse $C_h$ which causes the chroma inverter circuit 151 to change the phase of the subcarrier of the chroma information in the field by 180 degrees. Thus, in the reverse mode of operation the chroma phase is reversed each time the heads are switched.

FIG. 14 shows how the stepping and replay of the heads are controlled at normal speed and at 3/7 the normal speed as an example of a slow motion mode of operation. A slow motion mode of operation is initiated by pressing the forward button S5 in the playback direction control 127 and one of a slow motion 1 button S8, a slow motion 2 button S7, and a slow motion 3 button S6 in the speed control means 144. Depressing slow motion 1 button S8 causes a $Q_6$ to be equal to 0 which in the slow motion control oscillator 154 causes the generation of a square wave signal on $\overline{A}'$ having a frequency equal to about the frequency of the signal $D_g$ in the normal mode. Depressing the slow motion 2 button S7 causes $Q_7$ to be equal to 0 which in the slow motion control oscillator causes the square wave signal $\overline{A}'$ to have a freqency of about two-thirds that of the normal frequency of the signal $D_g$. Depressing slow motion 3 button S6 causes $Q_8$ to be equal to 1 which in the slow motion control oscillator 154 connects a manually variable resistance which varies the frequency of the square wave signal $\overline{A}'$ from twice the normal frequency of $D_g$ to DC.

The square wave signal $\overline{A}'$ is coupled to the control logic circuit 128 and appears at the output as a corresponding slow motion control signal A which is applied to an alternate field logic circuit 156. If the apparatus is not in the alternate field mode of operation ($P_3=0$) the slow motion control signal A appears as a corresponding but complementary signal $\overline{A}_a$ at the output of the alternate field logic circuit which signal is fed to a slow motion quantizer 157. In the slow motion quantizer, the slow motion control square wave $\overline{A}_a$ is time quantized by the prepulse G from the clock generator 132 so that the average number of zero crossings per second of a resulting wave $Z_g$ equals the average number of positive zero crossings of the slow motion control square wave $\overline{A}_a$ unless there are more positive zero crossings of $\overline{A}_a$ than G per second. Under these conditions, the wave form $Z_g$ is at the same frequency as G and is therefore identical in frequency to the wave B. Also, the slow motion quantizer 157 is provided with means (described hereinafter) for eliminating any ambiguity which may occur due to the coincidence of the prepulse G and the zero crossing of $\overline{A}_a$.

The slow motion control wave $\overline{A}_a$ and the resulting wave $Z_g$ for normal speed and for three-sevenths normal speed are shown in FIG. 14. The wave $Z_g$ is coupled to the slow motion logic circuit 133 where, two prepulses G after the apparatus is placed in the slow motion mode of operation, $Z_g$ produces a corresponding wave form $D_g$ at the output of the slow motion logic circuit. The slow motion logic circuit 133 is conditioned for slow motion operation by a wave form $W_s$ going from zero to one. The wave form $W_s$ which is fed to the control logic circuit 133 via the fast search logic circuit 131 and goes to one when one of the slow motion control buttons S6, S7 and S8 in the speed control means 144 is pressed and the forward button S5 in the playback direction control means 127 is pressed.

In the slow motion logic circuit 133 one of the pulses $J_c$, which are positive pulses each of 20 microseconds duration, is produced by the clock pulse C which first occurs after each zero crossing of $D_g$. If $D_g$ is equal to $B_g$, as during the normal mode of operation, then one pulse $J_c$ is produced by each clock pulse C, and therefore, $J_c$ is identical to C.

As shown in FIG. 14 and as previously described, the signal $D_g$ controls the stepping of the carriages and the switching of the heads, each zero crossing of the wave form $D_9$ causing each head to move one position in its operating cycle move, move, wait (erase), replay (record). In slow motion, the wave form $D_g$ has less zero crossing per second than in the normal mode. The zero crossings, however, still occur during the vertical interval since the zero crossing correspond to the pre-pulse G and switching and stepping is controlled by the pulse $J_c$, which corresponds in timing with the pulse C.

As previously described the signals $E_{ac}$, $E_{bc}$, $E_{cc}$ and $E_{dc}$ are formed by the zero crossings of $D_g$. The wave forms $E_{ac}$, $E_{bc}$, $E_{cc}$ and $E_{dc}$ produced by the wave form $D_g$ during normal and during three-sevenths normal speed are shown in FIG. 14. The first two $E_{ac}$ pulses shown cause but a single reproduction of the corresponding field since the apparatus is in the normal speed replay mode, but the fourth and fifth $E_{ac}$ pulses each last two field intervals and cause two reproductions of the corresponding field while the third $E_{ac}$ pulse causes three reproductions. The $E_{bc}$, $E_{cc}$ and $E_{dc}$ pulses are similarly related respectively to the first and every other negative going $D_g$ pulse, to the second and every other positive going $D_g$ pulse, and to the second and every other negative going $D_g$ pulse.

AS previously indicated, the coincidence of the carriage stepping pulses $F'_a$, $F'_b$, $F'_c$ and $F'_d$ and the pulses $J_c$ produce pulses $F_{ac}$, $F_{bc}$, $F_{cc}$ and $F_{dc}$ at the output of the carriage retiming logic circuit 141 and these pulses cause the carriage to step. The occurrence of these pulses with respect to the timing of the switching of the heads is shown in FIG. 14.

Following these notations, in the lower part of FIG. 14 it will be seen that normal speed replay fields 1 to 8 are reproduced once each; then in three-sevenths speed, field 9 is played three times, field 10 and 11 twice each, field 12 three times, fields 13 and 14 twice each, field 15 three times and so on. Thus for a three-sevenths speed replay, the cycle 3-2-2 repeats itself every seven fields.

In slow motion the variable resistance (described hereinafter) varies the frequency of the slow motion control signal $A_a$ over a continuum of frequencies under the control of the operator. Thus the sequence of repetitions will change; being patterned for each selected speed of slow motion. However, the slow motion quantizer 157 controls the signal $Z_g$ in such a way that there are only two types of repetitions. One set of fields is repeated a certain number of times each and all other fields are repeated another number of times, the two numbers differing only by the integer one. For example, for three-sevenths normal speed replay, one set of fields is repeated twice each and all the others are repeated three times each. This effect produces the least possible variation in the apparent speed of the action and is preferable, for example, to reproducing one field five and the others one each for three-sevenths speed replay. If a speed reduction of two to one is selected each track is scanned twice. At a three to one speed reduction, each track is scanned three times. At a two and one half speed reduction, half the tracks are scanned twice and half are scanned three times.

As previously indicated, in slow motion replay successive fields are derived from the same recorded track, and, therefore, the second field is identical to the one preceding it. In the illustrated apparatus, means is provided to ensure that the output signal is a standard interlace pattern on a picture monitor, that is, the signal is a succession of odd and even fields characterized by a half line shift of horizontal sync with respect to the vertical in each field. In this connection, as previously described, the phasing of the switching of the heads during record is such that each recorded field begins and ends just after the last equalizing pulse of the vertical interval (FIG. 12a). Also, even fields are recorded and reproduced by heads b and d and begin at A and end at A', odd fields are recorded by heads a and c and begin at B and end at B'. To artificially produce line interlace, odd fields are changed to even fields when an even field is required or even fields are changed to odd fields when an odd field is required by insertion of the half line delay 149 in series with the reproduced video signal during the horizontal scanning interval of each field (i.e. from A to A' or from B to B'). The insertion of the half line delay 14a is controlled by a ½ line delay logic circuit 158. Generally, this logic circuit 158 determines the types of field that is reqired from the studio composite sync and determines the type of field being reproduced by each head from the head which is energized (odd fields are reproduced by head a and c and even fields by heads b and d) and inserts the half line delay 146, as required, always removing the half line delay during the vertical interval B' to A and A' to B. More specifically, in slow motion the ½ line delay logic circuit 158 causes the half line delay 149 to be switched in if it were out and switched out if it were in at the beginning of each re-scan. (i.e., identical fields are being replayed). When the playback signal is advanced from one track to the next (i.e., carriage movement and head switching progress from one field to the next) it is not necessary to correct the line interlace. In other words, since switching from one track to the next produces a normal transition from one field to the next, the ½ line delay logic circuit 158 causes the state of the half line delay 149 to remain unchanged during the transition. That is, if the half line delay 149 were in the signal path before the switch it remains in after the switch; if it were bypassed before the switch it remains bypassed after.

As shown in FIG. 10b, the connecting of the half line delay 149 into the circuit is controlled by the electronic switch 148 which in turn is controlled by the signal R received via the alternate field logic circuit 156 from the alternate field switch 153. The signal R at the output of the alternate field switch 153 corresponds to the signal R' received by the alternate field switch from the half line delay logic circuit 158. The half line delay logic circuit 158 is controlled by the pulses $B_g$ from the clock generator 132 and the pulses $D_g$ from the slow motion logic circuit 133. The pulses $B_g$ indicate whether the station sync generator is generating an odd or even fields. In this connection, in the clock generator 132 the $B_g$ wave form is phased by the signal $F_s$ which is received via the fast search logic circuit 131 from the sync separator 121 (pulse F). As shown in FIG. 12a, the pulse F has the same time duration as a horizontal sync pulse which occurs at the beginning of every even field. The pulse F is formed in the sync separator 121 by the coincidence of a monostable pulse triggered from the first serrated pulse and a horizontal line sync pulse.

The pulse F is coupled via the fast search logic circuit 131 to the clock generator 132 wherein it phases the rectangular wave form $B_g$ so that it is one for every even field and zero for each odd field (FIG. 12a). Referring to the wave form $D_g$ (FIG. 12b or FIG. 14) it can be seen that when $D_g$ is equal to one either $E_{ag}$ or $E_{cg}$ is equal to one. Thus, when $D_g$ is equal to one, the signal is being replayed from disc surface a or disc surface c. Thus an even field is being replayed when $D_g$ is equal to one. When $D_g$ is equal to zero either $E_{bg}$ or $E_{dg}$ is equal to one and an odd field is being replayed from disc surface b or disc surface d. Therefore, if $B_g$ is equal to one and $D_g$ is equal to one, the station is on an even field and an even field is coming from the disc. If B equals zero and D equals zero the station is on an odd field and an odd field is coming from the disc. But if $B_g$ and $D_g$ are different (e.g., $B_g$ equal one and $D_g$ equal zero) the station will be on a different type of field than that coming from the disc. This is rectified by causing the half line delay 149 to be connected in series with the signal during this field. The half line delay logic circuit 158 is arranged so that if $B_g$ and $D_g$ are the same the output signal R' is equal to one and if $B_g$ and $D_g$ are different, the output signal R' is equal to zero. When R' is equal to one the electronic switch 148 bypasses the half line delay and when R' is equal to zero the electronic switch 148 connects the half line delay 149 in series with the output signal.

Since the equalization pulse train in both the odd and even fields are identical and should not be delayed by the half line delay 149, during the equalization pulse train the signal R' is returned to one by the alternate field logic circuit 156. This is controlled by the pulse $T_s$ which, as previously indicated, extends from the beginning of equalization to the end.

Also in the slow motion mode of operation a chroma phase problem arises in attempting to generate a continuous signal from rescanning certain tracks. In scanning a complete field a chroma phase at the end of the field is advanced 90 degrees with respect to its phase at the beginning of the field. If the field is then rescanned from the beginning a 90 degrees phase discontinuity appears in the chroma signal at the beginning of the scan. This would not only destory dot interlace but in a normal receiver it would seriously disrupt the color demodulation process. The chroma phase shift is further influenced by the insertion or removal of the half line delay 149. Insertion of the half line delay 149 delays the chroma phase 90 degrees, removal of the delay advances the chroma 90 degrees. Thus when the half line delay 149 is inserted at the beginning of a rescan its 90 degrees phase shift adds to the 90 degrees shift caused by rescanning, producing a total chroma phase shift of 180 degrees. Conversely, if at the beginning of a rescan the half line delay 149 is switched out its phase shift cancels out the 90 degrees caused by rescanning. The combined result when in slow motion mode of operation therefore is that a 180 degrees phase shift occurs in the chroma phase at the beginning of every second field of rescan. This fact is compensated by inserting the chroma phase inverter 151 to reverse the chroma phase each time the half line delay 149 is switched in. As shown in FIG. 10b the insertion of the chroma inverter circuit 151 is controlled by the chroma inverter logic circuit 152 which in turn is controlled by the signal R' from the alternate field switch 153. Whenever R' is equal to zero the chroma inverter circuit 151 is connected into the circuit and when R' is equal to one the chroma inverter circuit 151 is disconnected from the circuit.

To place the apparatus in its freeze mode of operation, a freeze button S4 in the playback direction control means 127 is pressed. This causes the signal on Q3 to go to zero which in the control logic circuit 128 inhibits and causes the slow motion control wave form A to go to one. Thus, the signal A has no zero crossings and hence the $Z_g$ signal produced by the slow motion quantizer 157 and the corresponding $D_g$ signal are equal to one. Thus, the heads are not switched and the carriages are not stepped and hence the heads replay the same field continuously. The half line delay logic 158 and the chroma inverter logic 152 work the same way as in the slow motion mode of operation. Accordingly, during the still framing mode of operation, the half line delay 149 is inserted during the horizontal scanning interval of alternate fields. The chroma inverter 151 is inserted each time the half line delay 149 is inserted.

The apparatus, when in the freeze mode of operation is arranged so that it can be advanced frame by frame. This is accomplished by pressing the frame advance button S1 in a search and frame advance control means 159. The pressing of the frame advance button S1 causes $\overline{A}_2$ to go to 1 which signal is coupled to the control logic circuit 128. In the control logic circuit 128, the frame advance signal $\overline{A}_2$ causes the slow motion control wave form A to go from one to zero. This produces a one advance in the stepping of the carriage and one advance in the head switching wave forms as described above in connection with the slow motion mode of operation. In other words, this produces a zero crossing of the $D_g$ wave form. A release of the frame advance button S1 causes $\overline{A}_2$ to go to zero which, in turn, causes A to return to one in readiness for another frame advance if S1 is again pressed.

The illustrated apparatus is also arranged so that it may be in an alternate field record mode in which half the incoming fields are recorded, that is, every other field. This doubles the recording time of the system and also permits faster than normal speeds. In record, the machine is put into one-half normal speed. Thus, if in the replay mode the machine is put into half speed slow motion, the motion will appear normal, since the machine takes as long to replay the information as it took to record it. All the modes that are normally available in replay are also available in the alternate field mode except that all slow motion speeds will be twice as fast. For example, if normal replay is selected the motion will be twice normal.

To record in the alternate field record mode the alternate field switch 153 is changed to its alternate field position and the apparatus is put into its normal record mode of operation, as previously described. When the alternate field switch 153 is moved to its alternate field position a signal $\overline{A}_F$ at its output goes from 0 to 1. This signal $\overline{A}_F$ is applied to the control logic circuit 128. The signal $\overline{A}_F$ in the control logic circuit 128, causes P$_3$ to be equal to P$_4$. In the alternate field logic circuit 156, the signal P$_3$ being equal to one causes A$_a$ to be equal to B$_g$ which is received from the clock generator 132 instead of A as during the normal mode of operation. Since the signal B$_g$ is equal to half the frequency of A$_a$ at normal speed the A$_a$ signal led to the slow motion quantizer 157 causes the machine to be exactly in half speed slow motion. Under these conditions each head erases for two fields and then records for two fields, moves to the next track for two fields and then it moves another track width for two fields and starts the sequence over again. This would mean that each head records two fields on each track and to eliminate this a signal $\beta'$ is generated by the alternate field logic circuit 156.

The signal $\beta'$, in other than alternate field record mode is equal to one. The signal $\beta'$ is coupled to the head logic circuit 134 wherein if $\beta'$ is equal to one the head switching signals E$_{ag}$, E$_{bg}$, E$_{cg}$ and E$_{dg}$ are provided as described above in the normal mode of operation. However, if $\beta'$ is equal to zero all head switching signals are inhibited, i.e., the record heads are off. The alternate field logic circuit 156 is arranged so that, in the alternate field mode, $\beta'$ is equal to one for odd fields and zero for even fields. Therefore, none of the heads will record even fields, only odd fields, and each head will only record once on each track. To do this $\beta'$ is made equal to the inverse of the signal B$_g$. If it were desired to record only even fields $\beta'$ would be made equal to the signal B$_g$. So that the apparatus is controlled by the Z$_g$ wave form rather than the B$_g$ wave form during record as would normally occur, the wave form W$_s$ is switched to its one condition by the P signals and $\overline{A}_f$ becoming equal to one, as explained in greater detail hereinafter.

Since in the alternate field record mode all recorded fields are alike (i.e., all odd), it is necessary, when reproducing a signal, to alternately switch in the half line delay at the end of every field, whether switching from head to head or not. As illustrated, the electronic switch 148 controlling the half line delay 149 is controlled by a B$_g$ pulse rather than the signal R, the substitution taking place in the alternate field switch. Likewise, the chroma inverter logic circuit is controlled by the signal B$_g$, the same being substituted for the signal R in the alternate field switch. In the alternate field mode the pulse K' is inhibited by the alternate field switch. Also, as in the normal mode, the switching of the half line delay 149 is inhibited (R is caused to go to 1) by the machine being put into fast forward or fast reverse by a signal F$_F$ or F$_R$=0 being fed to the alternate field logic circuit 156 by the fast search logic circuit 131.

The apparatus is also provided with a fast search mode of operation which is used to rapidly move the heads at about four times normal speed from one point on each disc surface to another. In the fast search mode of operation, as in the normal speed mode of operation, the heads are retained precisely in step. Otherwise, in subsequent playback, loss of field to field continuity would result. Therefore, the sequence of motion is kept the same as in normal speed operation. To place the apparatus in fast forward search, a fast forward button S10 in a search and frame advance control means 159 is pressed. The pressing of this button causes a signal F$_f$ at its output to go from zero to one. The signal F$_f$ is applied to the fast search logic circuit 131 wherein the signal F$_f$ causes an internal clock signal T$_{fs}$ to be substituted for the pulse T on the output line T$_s$. This signal T$_{fs}$ is about four times the frequency of the normal pulse T. Thus the clock generator 132 provides signals G, C and B$_g$ which are at about four times the normal frequency and hence the carriages are stepped and the heads switched at about four times the normal speed. This signal F$_f$ in the fast search logic circuit 131 also causes the signal P$_{2S}$ to be one which causes the machine to go forward. Moreover, the signal F$_f$ inhibits the signal W$_s$ causing it to go to zero.

Because of the inertia of the carriage drive system, it is not convenient to reverse the direction of travel of the carriages at the inner and outer limits of travel when moving at search speeds. Therefore, the photocell arrangement 69a and 69b located on the carriage drive 21a detects the approach of the head a to the inner and outer limits and briefly slows the carriage speed to normal while the reversing of direction is taking place. More particularly, when the carriage 21a approaches either the rim or the hub, the photocell device 69a or 69b associated therewith is energized and the resulting signal X$_{aa}$ or Y$_{aa}$ is applied to the fast search logic circuit 131. In the fast search logic circuit 131 the signal X$_{aa}$ or Y$_{aa}$=1, substitutes the signal T for the internal clock of the fast search logic circuit and the apparatus slows down to normal. This normal speed continues until the photocell device X$_{aa}$ or Y$_{aa}$ is deenergized as the heads move away from either the rim or the hub. When the fast forward button S10 is released the apparatus goes into its freeze mode of operation.

To place the apparatus in its fast search reverse mode of operation a fast reverse button S11 in the search and frame advance control means 159 is pressed and thereby produces a signal F$_r$. The signal F$_r$ is applied to the fast search logic circuit 131 wherein it causes similar operations to that of the fast forward previously described except that the signal P$_{2s}$ goes to zero rather than to one and thereby places the apparatus in reverse.

In either fast search modes of operation the apparatus, the heads are by-passed so that the apparatus is in an electronics to electronics condition (E to E mode). The fast search signal F$_f$ or F$_r$ inhibits the operation of the electronic switch 148 (R=0) so that the ½ line delay 149 is not inserted.

The apparatus is arranged to go into its freeze mode of operation when the fast search button S10 or S11 is actuated. To do this, a F$_f$ or F$_r$=1 signal provided by the search and frame advance control means 159 is supplied to the playback direction control means 128 wherein it actuates the freeze mode controls.

Now considering the individual circuits shown in FIGS. 15 through 38. In these circuits three types of gates are employed. One of these gates provides a two-input DTL (diode transistor logic) "Nand" logic function. One suitable "Nand" gate is one of the quadruple gates in a ST680a manufactured by Signetics Corporation. This gate is indicated by a generally semicircular block with a small circle at its output. A second gate which is used provides a four-input diode transistor logic "Nand" function with an expander mode. This gate is indicated by a generally semicircular block with an arrow and with a small circle at its output. A suitable "Nand" gate is one of two gates in an SP616A manufactured by Signetics Corporation.

It has been found that either the two-input or the four-input "NAND" gate acts as an inverter when all but one of its inputs is permitted to float, that is, only one input is connected to a signal.

A third gate is a two-input gate expander which is indicated by a generally semicircular block. A suitable expander is one of the quadruple expanders of a SP631 manufactured by Signetics Corporation. A fourth element which is used in the circuits is a DC-triggered, master slave, J-K flip flop. One suitable flip-flop is a SP620A manufactured by Signetics Corporation.

The flip flop circuit may be set or reset asynchronously with the $P_j$ and $P_k$ inputs or switched synchronously by using the J and K inputs together with a clock. When it is switched asynchronously, the flip flop behaves as an RS flip flop. When it is switched synchronously the circuit acts as a J-K flip flop.

Now referring to the drawings, the individual circuits for the blocks of the control circuit 117 will be described first. The signals are indicated as they would be in the record mode. The circuit for the speed control means 144 is shown in FIG. 15. This circuit includes the normal button S9, the slow motion 1 button S8, the slow motion 2 button S7 and the slow motion 3 button S6, each of which is a momentary contact push button. Each of the buttons is coupled to a logic circuit arranged so that when the button is depressed, an associated control signal is provided, an associated signal light is energized and the logic circuits of the other buttons are returned to their deenergized condition. Each of the logic circuits is smaller. In this connection, each button has a normal position wherein it applies a DC signal to its associated signal line, and a second position, its depressed condition, wherein it connects its signal line to ground. The signal line of the normal button S9 is connected to one input of an upper "Nand" circuit 161 of a normal button flip flop circuit 162 and to one input each of lower "Nand" circuits 163, 164 and 166 included respectively in a slow motion a flip flop circuit 167, a slow motion 2 flip flop circuit 168 and a slow motion 3 flip flop circuit 169. Likewise, the signal line of the slow motion 1 button S8 is connected to one input of an upper "Nand" circuit 171 of the slow motion one flip flop circuit 167 and to one input of each of the lower "Nand" circuits 172, 164, and 166 included respectively in the normal flip flop circuit 162, the slow motion 2 flip flop circuit 168 and the slow motion 3 flip flop circuit 169. The signal line of the slow motion button S7 is coupled to one input of an upper "Nand" circuit 173 of the slow motion 2 flip flop circuit 168 and to one input each of the lower "Nand" circuits 172, 163 and 166 included respectively in the normal flip flop circuit 162, the slow motion 1 flip flop circuit 167 and of the slow motion 3 flip flop circuit 169. Similarly, the signal line of the slow motion 3 button S6 is connected to the one input of an upper "Nand" circuit 174 of the slow motion 3 flip flop circuit 169 and to one input, each of the lower "Nand" circuits 172, 163, and 164 included respectively in the normal flip flop circuit 162, the slow motion 1 flip flop circuit 167 and the slow motion 2 flip flop circuit 168. The outputs of the lower "Nand" circuits 172, 163, 164 and 166 are respectively connected to the other inputs of the upper "Nand" circuits 161, 171, 173 and 174 of the associated flip flop circuits. Likewise, the outputs of the upper "Nand" circuits 161, 171, 173 and 174 are connected respectively to the inputs of the lower "Nand" circuits 172, 163, 164 and 166 of the associated flip flop circuits.

In operation, assuming that the normal button S9, the slow motion 1 button S8, the slow motion 2 button S7 and the slow motion 3 button S6 are in their normal positions, a binary 1 signal is applied to each flip flop circuit 162, 167, 168 and 169, and hence the output from each lower "Nand" circuit 172, 163, 164 and 166 is binary 1 and the output from each upper "Nand" circuit 161, 171, 173, and 174 is equal to 0. However, if one of the buttons is pressed, the signal on its signal line is changed from binary 1 to binary 0. Since this signal is applied to the lower "Nand" circuits of the other three flip flop circuits this will cause the output of the lower "Nand" circuits of each of the flip flop circuits associated with the other three buttons to go to 0 thereby resetting any of the other three flip flop circuits which may have previously been set. The 0 signal on the signal line of the button which is pressed is also fed to the upper "Nand" circuit of the associated flip flop circuit whereby the output of this upper "Nand" circuit goes to 1. This binary 1 signal applied to the lower "Nand" circuit, causes the output of the lower "Nand" circuit to go to binary 0. The output of each lower "Nand" circuit 172, 163, 164 or 166 is applied through an associated inverter circuit 176 to a switching transistor 177 which energizes a signal light 178 associated with the buttons.

The output of the upper "Nand" circuit 161 of the normal flip flop circuit 162 is coupled to $P_1$. Thus, $P_1$ is at the binary 0 whenever the apparatus is in any other mode of operation except the normal mode and at binary 1 when the normal button S9 is pressed. The signal from the slow motion 1 flip flop circuit 167 is obtained at the output of the lower "Nand" circuit 163 and appears at Q6, Q6 being equal to 0 when the slow motion 1 button S8 is pressed and 0 at other times. Likewise, the output from the lower "Nand" circuit 164 of the slow motion 2 flip flop circuit 168 is applied to Q7, Q7 being 0 when the slow motion 2 button S7 is pressed and 1 at other times. The output from the slow motion 3 flip flop circuit 169 is taken from the lower "Nand" circuit 166 and is applied through an inverter 179 and appears at Q8. Thus, Q8 is 1 when the slow motion 3 button S6 is pressed and 0 at other times. A second output is taken from the output of the upper "Nand" circuit 174 is the slow motion 3 flip flop circuit 169 and appears on Q9. Q9 is therefore 0 except when the slow motion 3 button S6 is pressed.

So that the apparatus is always placed in the normal mode of operation when it is turned on, a delay circuit 181 is provided to delay the application of binary 1 signal to the normally closed contacts of the normal button S9. To insure that the buttons in the playback direction control means 127 are inoperable if the buttons are maintained in a pressed condition, the four signal lines from the normal, slow motion 1, slow motion 2 and slow motion 3 buttons S9, S8, S7 or S6, respectively, are applied to the inputs of a "Nand" gate 182. The output of this gate 182 is coupled through an inverter 183 to Q13, whereby Q13 is one except during the time when any of the four buttons are held in a pressed condition.

The other circuit of FIG. 15 is a cue control circuit which is employed to indicate a particular position on the disc. More particularly, a timer or clock motor 184 (FIG. 20) is provided which contains a pointer (not shown) which rotates clockwise or counter clockwise on a dial (not shown) according to the selected speed and direction of motion and indicates to the operator the position of the heads within the memory of the system. A second pointer (not shown) is used as a cue marker and is connected magnetically to the timing indicator so as to normally rotate with the timing indicator. When a cue push button S12 is pressed, the cue marker stops rotating and remains locked in a fixed position on the dial indicating the location or address of a particular recorded event. Pressing the cue push button S12 a second time unlocks the cue pointer which, because of the magnetic attraction, immediately seeks out the timing indicator and rotates with it ready to lock up again when the cue push button is next pressed.

More particularly, as shown in FIG. 15 the cue button S12 has two positions. In its normal position the cue button S12 connects a binary 1 signal to its signal line and in its pressed condition it connects a binary 0 signal to the line. The signal line of the cue button is coupled through an integrating circuit 186 to to the clock input of J-K binary element 187 which is connected as an RS flip flop to switch states for each pulse at its clock input. The K input of the binary element 187 is connected to a binary one signal and the J input is connected to $Q_{12}$ which is at the binary 1 value except when the record button S2 is in its pressed condition. The $Q_{12}$ signal is also passed through an inverter 185 to the $P_j$ input of the binary element 187, and the $P_k$ input of the binary element 187 is grounded. Thus, when the record button is pressed, the binary element 187 resets.

The principal object of the binary element 187 is connected through an inverter 188 to a switching circuit 189 which operates a cue brake 191. The cue brake 191, when energized, stops the motion of the cue needle. Thus, whenever the cue button S12 is pressed the input to the differentiating circuit is grounded thereby discharging the capacitor which changes the state of the binary element 187 and causes the cue brake 191 to change states. The principal output of the binary element 187 is also coupled through an inverter 193 to a switching transistor circuit 194 which controls the energization of a signal light 196 associated with the cue button Now referring to FIG. 16, the circuit for the playback direction control means 127 is shown. In the playback direction control means four operating buttons are shown; the record button S2, the reverse button S3, the freeze button S4 and the forward button S5. Each button sets an associated flip flop circuit similar to that described above in connection with the buttons in the speed control means 144. In this connection each of the buttons S2, S3, S4 and S5 has a normal position in which a binary 1 is applied to its signal line and a pressed condition wherein a binary 0 is applied to its signal line. The signal lines of the record button S2 and the reverse button S3 are respectively applied to upper "Nand" circuits 197 and 198 of associated flip flop circuits 199 and 201. The signal line of the record button S2 is coupled to the lower "Nand" circuits 202, 203 and 204 of the reverse flip flop circuit 201, a freeze flip flop circuit 206, and a forward logic circuit 207. The signal line of the reverse button S3 is coupled to the lower "Nand" circuits 208, 203 and 204.

The signal line from the forward button S5 is fed through a "Nand" circuit 209 and an inverter 210 to its upper "Nand" circuit 211, and to the lower "Nand" circuits 208, 202 and 203 of the other three flip flop circuits 199, 201, and 206. The other input to the "Nand" circuit 209 is the $Q_{13}$ signal, coupled via a manual direction switch S101 from the speed control means 144. As previously indicated $Q_{13}$ is equal to 1 except when one of the four buttons in the speed control means is maintained in its pressed state. Also the binary 1 signal to the normally close contact of S5 comes from $Q_{10}$ which is a delayed 1 signal provided by the delay circuit 181 so that when the apparatus is turned on it automatically goes into the forward mode.

The signal line from the freeze button S4 is fed to one input of a "NAND" gate 211, the other input to the "Nand" gate 211 coming from the $F_f + F_r$ signal which is normally 1 except when the fast forward button or the fast reverse button is pressed. The output of the "Nand" gate 211 is fed through an inverter 212 to the lower "Nand" gate 208, the lower "Nand" gate 202, upper "Nand" gate 213 and the lower "Nand" gate 204. Thus, if the freeze button S4 is pressed the apparatus will go into a freeze mode of operation, or when the fast forward or fast reverse buttons are pressed the apparatus will go into the freeze mode of operation when the buttons are released.

Each of the outputs of the lower "Nand" circuits 208, 202 and 204 is fed through an inverter 214 to a transistor switch 215 which controls an indicating light 216 associated with each button. The output from the lower "Nand" circuit 203 of the freeze flip flop circuit 206 is coupled to a "Nand" circuit 217, the other input being the signal $Q_{14}$ from the control logic circuit, $Q_{14}$ is 1 except when freeze is selected by means of the variable speed control as described hereinafter. The output from the lower "Nand" gate 208 of the record flip flop circuit is fed to $Q_1$. Thus, $Q_1$ is equal to 1 except when the apparatus is in the record mode ($Q_1$ is indicated as equal to 0 since it is assumed that the apparatus is in the record mode). In the reverse flip flop circuit 201, the output from the upper "Nand" gate 198 is fed to $Q_2$, $Q_2$ thus being equal to 0 except when the apparatus is in its reverse mode of operation. In the freeze flip flop circuit 206, the output from the lower "Nand" gate 203 is fed to $Q_3$ and thus $Q_3$ is equal to 1 except when the apparatus is in the freeze mode of operation. No output is needed for the forward flip flop since if the other three flip flop circuits are not set the apparatus goes into its forward mode.

Figure 17:
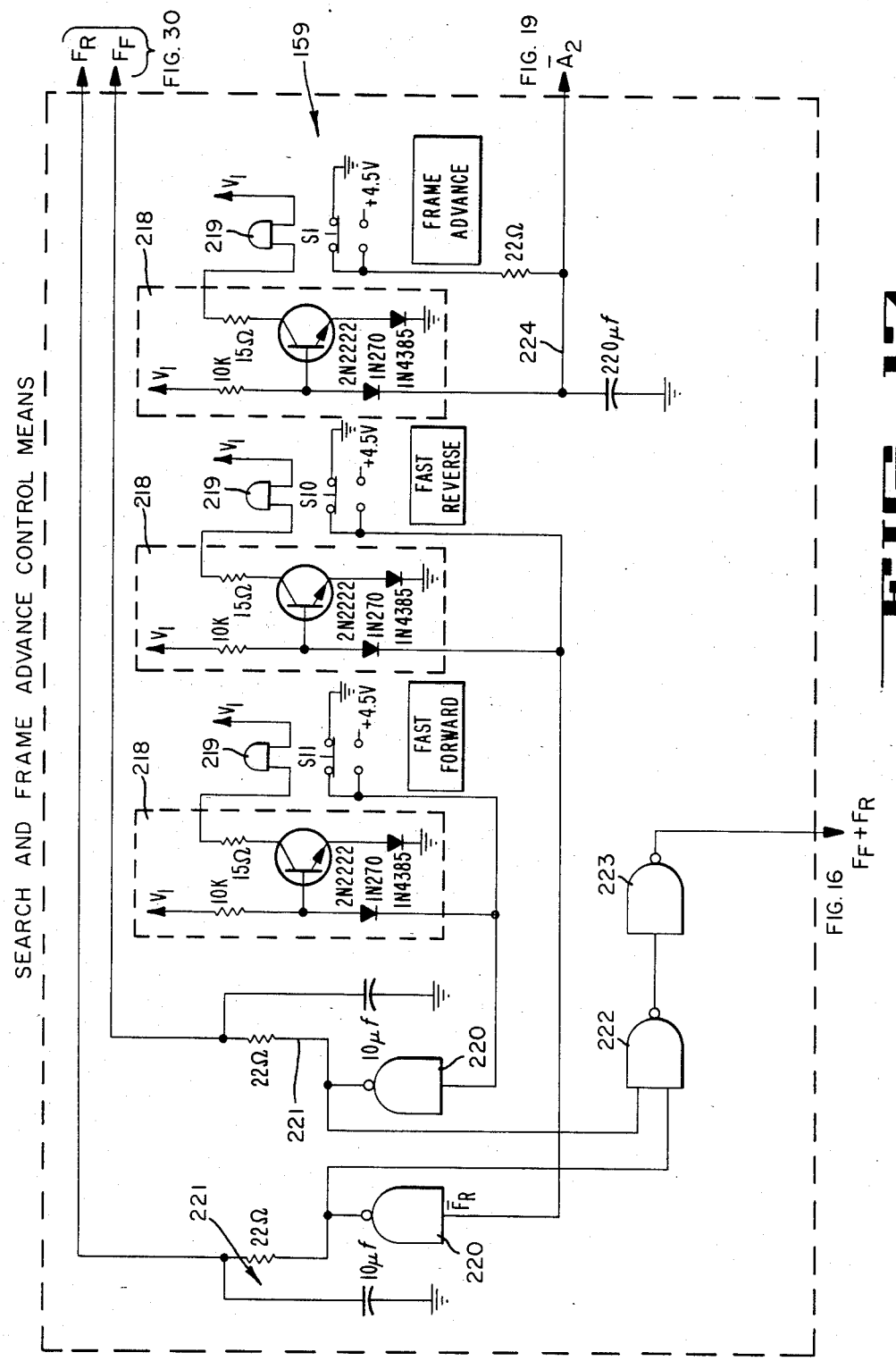
FIG. 17 is a circuit diagram of the search and frame advance control means in the control circuit of FIG. 10c.

A logic circuit which may be employed for the search and frame advance control means 159 is shown in FIG. 17. In the search and frame advance control means 159 there are three push buttons, the fast forward S11, the fast reverse S10 and the frame advance S1. Each of the buttons has a normally closed position wherein binary 0 is applied to its signal line and a normally open position which, when closed by the switch being pressed, applies a binary 1 to its signal line. The signal lines of the fast forward button S11, the fast reverse button S10, and the frame advance button S1 are connected through respective switching transistor circuits 218 to associated indicating lights 219 thereby energizing the associated indicating lights when the buttons are pressed.

The fast forward and fast reverse signal lines are connected through respective inverter circuits 220 and integrating circuits 221 to the respective outputs $F_r$ and $F_f$. Since the fast forward button S11 and fast reverse button S10 are in the 0 binary position during normal conditions, the $F_r$ and $F_f$ signals are equal to 1 in all modes of operation except when the fast forward or fast reverse buttons are depressed. The output of the fast forward inverter 220 and the fast reverse inverter 220 are applied to the respective inputs of a "Nand" circuit 222, the output of which is fed through an inverter 223 to the $F_f+F_r$ output. Thus the $F_f+F_r$ output is at the binary value 1 except when either the fast forward or fast reverse button is pressed.

The frame advance button S1 is arranged so that $A_2$ is normally 0 and goes to a binary value 1 when the frame advance button S1 is pressed. An integrating circuit 224 is connected to the signal line of the frame advance button S1. When the frame advance button is released, the signal $A_2$ goes to 0 but is delayed slightly by the integrating circuit 224.

Figure 18:
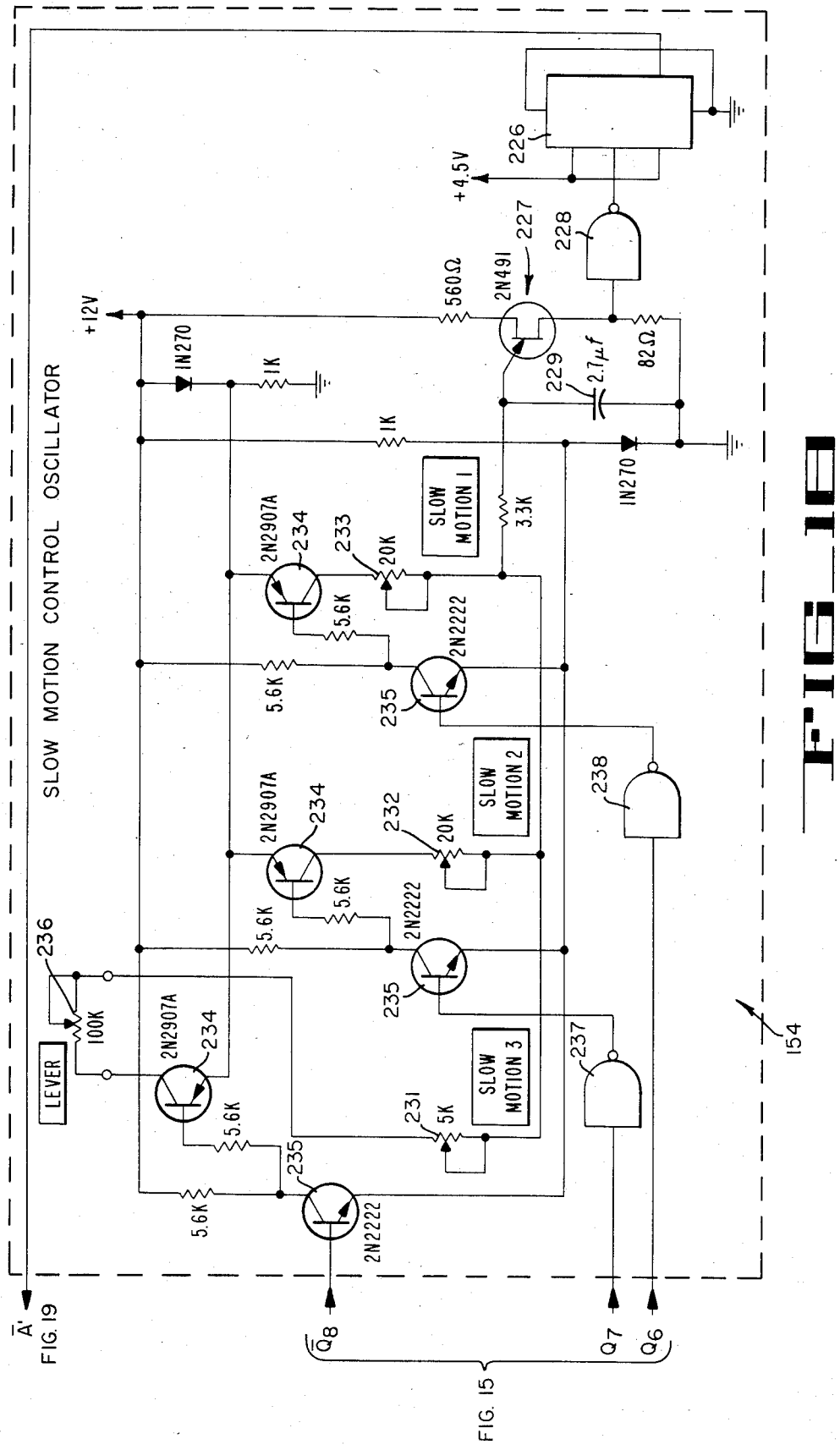
FIG. 18 is a circuit diagram of the slow motion control oscillator in the control circuit of FIG. 10c.

The logic circuit for the slow motion control oscillator 154 is shown in FIG. 18. The illustrated slow motion control oscillator 154 includes a J-K binary element 226 which is triggered by clock pulses. As shown the $J_k$ inputs are connected to positive voltage supply and the $P_j$ and $P_k$ inputs are connected to ground. The complementary output of the binary element 226 is connected to $\overline{A}'$. The clock pulses which trigger the J-K binary element 226 are generated by a uni-junction timing circuit 227, the output of which is connected through an inverter 228 to the clock input of the J-K binary element 226. The uni-junction timing circuit 227 includes a capacitor 229 connected in series with parallel connected resistors 231, 232, 233, the build up of charge on the capacitor 229 to a preselected voltage causing the circuit to "fire". Each of the resistors 231, 232, and 233 is coupled in series with a transistor 234 which, in combination with a second transistor 235, switches the associated resistor into series with the capacitor 229. Each of the transistor switching circuits 234, 235 is associated with one of the slow motion buttons S8, S7 or S6. The resistor 232 associated with the slow motion 2 button S7 and the resistor 233 associated with the slow motion 1 button S8 are adjusted to provide a preset resistance value whereby when the slow motion 2 or slow motion 1 buttons are pressed a preselected timing of clock pulses will be provided by the uni-junction trigger 227. However, a resistor 236 associated with the slow motion 3 button is connected to a manually controlled lever (not shown) in the control panel whereby the timing of clock pulses is under the control of the operator. The resistor 231 is connected in series with the slow motion 3 resistor 236 logic and is employed to establish the upper range defined by resistor 236 at or slightly above a valve corresponding to normal speed.

The signal $\overline{Q}_8$ is provided by the slow motion 3 logic circuit 169 and is normally 0 except when the slow motion 3 button S6 is pressed. When $Q_8$ equals 1, the resistors 231 and 236 are connected in series with the capacitor 229. Likewise, the signal $Q_7$ from the slow motion 2 logic circuit 168, which is normally 1 except when the slow motion 2 button S7 is pressed, is fed through an inverter 237 to its associated switching circuit 234, 235 to thereby normally disconnect the slow motion 2 resistor 232 from the capacitor and connect it in series when $Q_7$ goes to 0, i.e., when the slow motion 2 button S7 is pressed. Signal $Q_6$, which is normally 1 except when the slow motion 1 button S8 is pressed, is coupled through an inverter 238 to its associated transistor switching circuit 234, 235 to thereby disconnect the slow motion 1 resistor 233 except when the $Q_6$ signal goes to 0. This occurs when the slow motion 1 button S8 is pressed.

Thus, the frequency of the slow motion control wave form $\overline{A}'$ depends upon the frequency of the clock pulses and this in turn depends upon which slow motion button has been pressed. The frequency is at preselected frequency if the slow motion 1 or the slow motion 2 button is pressed and is a controllable frequency when the slow motion 3 button is pressed.

Figure 16:
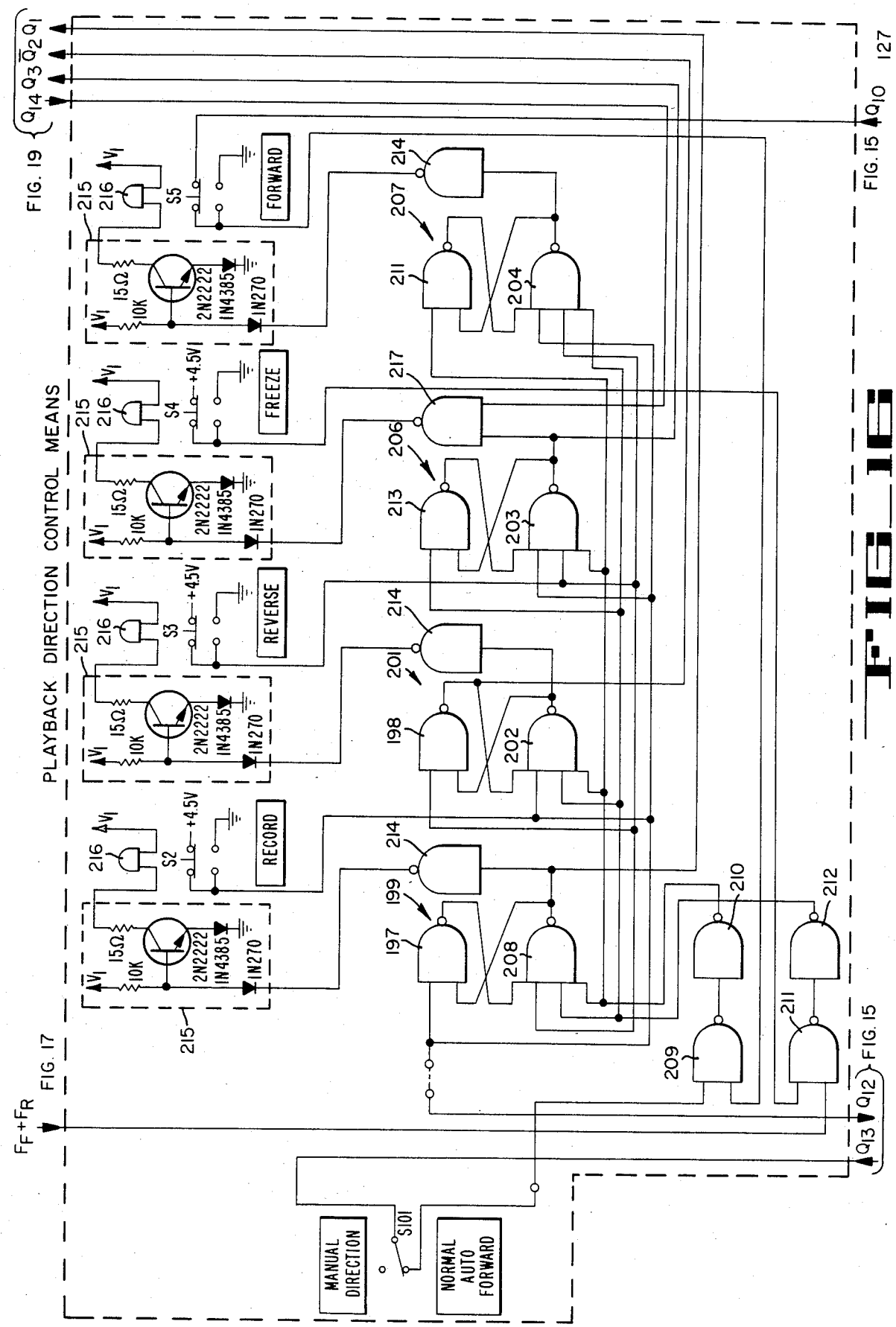
FIG. 16 is a circuit diagram of the playback direction control means in the control circuit of FIG. 10c.
Figure 19:
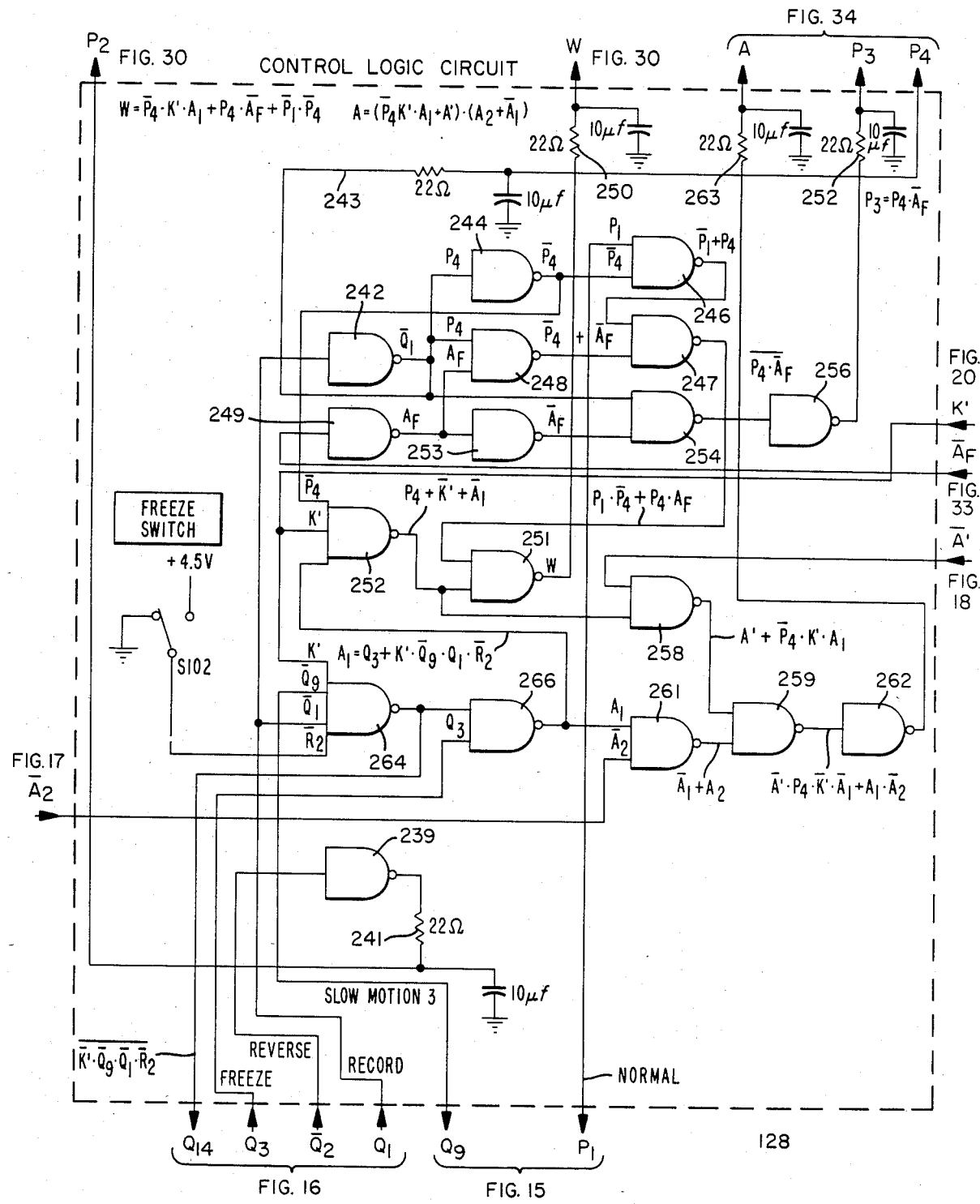
FIG. 19 is a circuit diagram of the control logic circuit in the control circuit of FIG. 10c.

In FIG. 19 the control logic circuit 128 is shown. The reverse signal $\overline{Q}_2$ from FIG. 16 is coupled through an inverter 239 and an integrating circuit 241 to the line $P_2$. The reverses signal $\overline{Q}_2$ is normally equal to 1; thus $P_2$ is equal to 1 during the forward mode, the record mode or the freeze mode and is equal to 0 in the reverse mode.

The record signal $Q_1$ is applied through an inverter 242 and an integrating circuit 243 to the output $P_4$. The record signal $Q_1$ is normally 0 during the record mode and changes to 1 in the reverse mode, the freeze mode or the forward mode of operation. Thus the signal $P_4$ is only equal to 1 during the record mode.

The output of the inverter 242, i.e., the $P_4$ signal, is fed through an inverter 244 to the lower input of a "Nand" gate 246. The upper input to the "Nand" gate 246 is the normal signal $P_1$ which is equal to 1 in the normal mode. The output of the "Nand" gate 246 is fed to the upper input of a second "Nand" gate 247. An output from the first "Nand" gate 246 equal to 1 is provided whenever the apparatus is in the record mode or in a playback mode other than normal. The other input of the second "Nand" gate 247 is received from a third "Nand" gate 248, the inputs of which are the record signal $P_4$ and the alternate field signal $A_f$ via an inverter 249. The alternate field signal $A_f$ is normally 1 and only becomes 0 when the apparatus is in the alternate field mode of operation. Thus, an output equal to 1 is provided from the second "Nand" gate 247 as long as the apparatus is in the replay mode and the normal mode and not in the alternate field record mode. The signal from the second "Nand" gate 247 is applied to one input of a fourth "Nand" gate 251. The other input of the fourth "Nand" gate 251 is the output from a fifth "Nand" gate 252 which nands the signals $\overline{P}_4$, K' and $A_1$, the signal $A_1$ being equal to 0 except when the apparatus is in the freeze mode of operation or in the fade mode of operation ($Q_3=0$), the signal K' being equal to 1 when the apparatus is in the forward mode of operation and 0 when it is in its reverse mode of operation, and $\overline{P}_4$ being the complement of the record signal. Thus, the output from this fifth "Nand" gate 252 is 1 except when the apparatus is in its replay mode (i.e., $P_4$ is equal to 0), or in its forward mode of operation (K'=1), and $A_1$ is equal to 1. The output of the fourth "Nand" gate 251 is fed through an integrating circuit 250 to the output W, the logic equation being $W = \overline{P}_4 \cdot K' \cdot A_1 + P_4 \cdot \overline{A} + \overline{P}_1 \cdot \overline{P}_4$. Thus, W is equal to 1 if $P_4$ is equal to 0 (i.e., the apparatus is in the replay mode), K' is equal to 1 (i.e., the apparatus is in the forward mode) and $A_1$ is equal to 1 (i.e., the apparatus is in the freeze mode) or if $P_1$ is not equal to 1 and $P_4$ is equal to 0 (i.e., the apparatus is in the normal replay mode) or if the apparatus is in the alternate field record mode ($P_4 \cdot \overline{A}_F = 1$).

The alternate field signal $A_F$ from the inverter 249 is coupled through another inverter 253 to one input of a "Nand" gate 254, the other input being the record signal $P_4$. The output of this "Nand" gate 254 is fed through an inverter 256 and through an integrating circuit 257 to the output $P_3$, the logic equation being $P_3 = P_4 \cdot \overline{A}_f$. Thus, $P_3$ is equal to 1 when $P_4$ and $\overline{A}_f$ are both equal to 1 which would occur when the apparatus is in the alternate field mode and in the record mode.

The slow motion control wave form $\overline{A}'$ is fed to one input of a "Nand" gate 258, the other input is the signal $P_4 + \overline{K}' + \overline{A}_1$ from the "Nand" gate 252. Thus, the $\overline{A}'$ signal is inhibited if the apparatus is in its record mode, in its forward mode, and in either freeze mode. Otherwise, the output of this "Nand" gate 258 is fed to a second "Nand" gate 259 which also receives the signal $\overline{A}_1 + A_2$ from a third "Nand" gate 261. The signal $\overline{A}_1 + A_2$ signal is 1 except during either freeze mode of operation ($Q_3 = 1$) when the advance button ($\overline{A}_2 = 1$) is pressed. The output of this "Nand" gate 259 is applied through an inverter 262 and an integrating circuit 263 to the output A, the logic equation of which is $A = (\overline{P}_4 \cdot K \cdot \overline{A}_1 + A') \cdot (A_2 + \overline{A}_1)$.

Means are provided to place the apparatus in the freeze mode when the lever associated with the resistor 231 reaches the low end of its travel. In this connection, the lever actuates a switch S102 which connects an output $R_2$ to a "Nand" gate 264, the other inputs being the K', the $\overline{Q}_0$, and the $\overline{Q}_4$ signals. The output of the gate is applied to the output $Q_{14}$ which controls the freeze indicating light 216. This output which is normally 1 except when the switch is actuated, is applied to a "Nand" gate 266, the other input being the signal $Q_3$ from the freeze flip flop circuit 217. Thus, the output of this "Nand" gate 266 is normally 1 except either when the freeze button is pressed, which causes $Q_3$ to go to 0 or when the lever-operated switch 102 is actuated in the slow motion 3 playback mode. This causes $A_1$ to go to 1, thereby permitting the frame advance circuit to block and unblock the "Nand" circuit 261.

Figure 20:
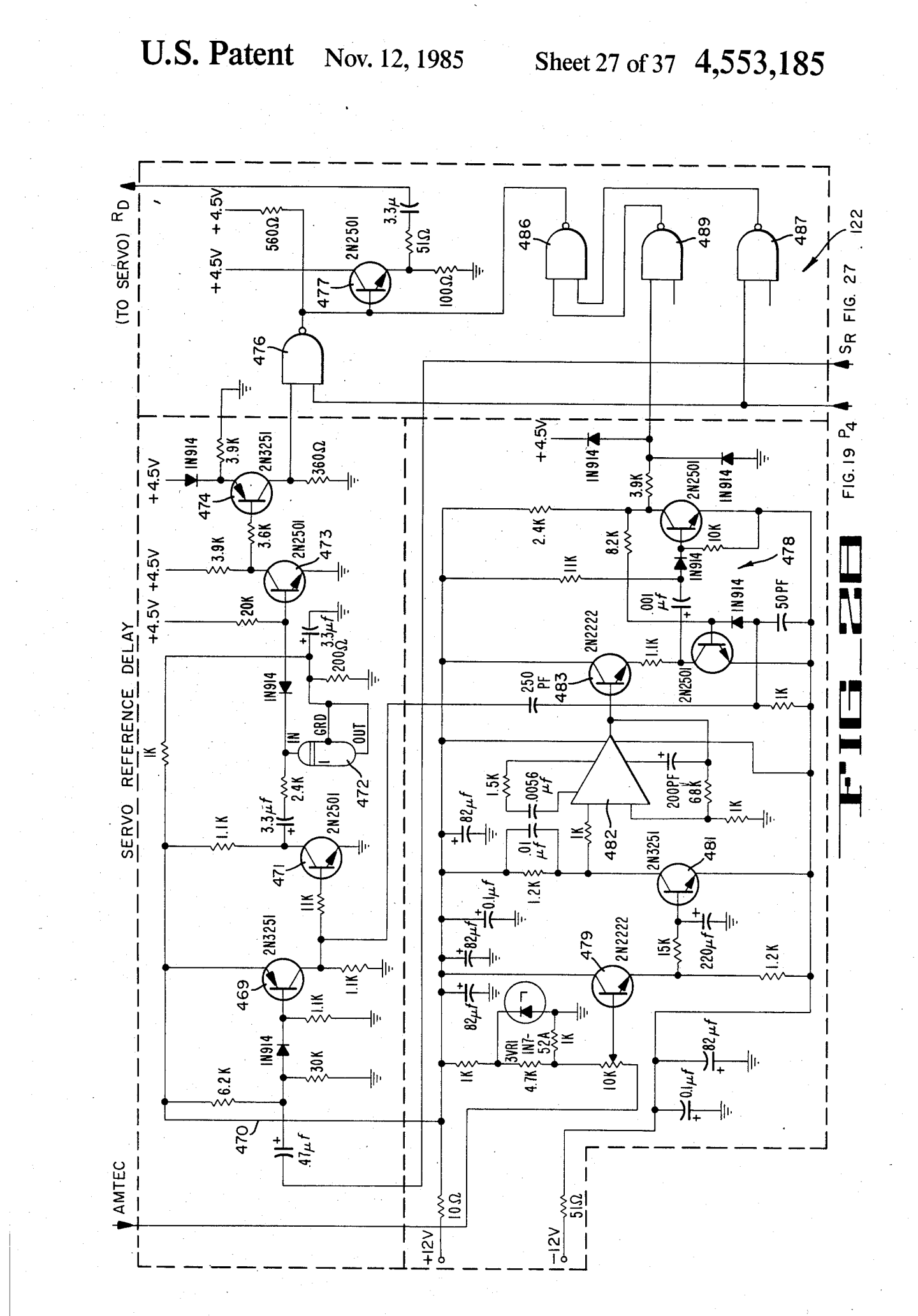

FIG. 20 shows a logic circuit which may be employed for a clock motor control means 267. In this circuit the clock motor 184 is driven at a speed corresponding to that of the switching of the heads and in the same direction. In this connection, the $E_{dg}$ signal from the head retiming logic circuit 136 controls the clock motor 184. Particularly, the $E_{dg}$ is fed through an inverter 268 to the clock input of a J-K binary element 269 which is connected as a J-K flip flop. The principal output and the complementary output of the J-K binary element 269 are applied to inputs of the respective "Nand" gates 271 and 272. The other inputs of the "Nand" gates 271 and 272 are received through an inverter 273 from the output of a monostable circuit 274. The monostable circuit 74 is triggered by the $E_{dg}$ pulse at the output of the inverter 268 which is buffered by an emitter follower 276 and differentiated by a differentiating circuit 277. This insures that the outputs of the "Nand" gates 271 are certain width pulses no matter what the width of the $E_{dg}$ pulse.

The outputs of the "Nand" gates 271 and 272 are fed through respective inverters 278 and 279 to a reversing circuit which includes four "Nand" gates 281, 282, 283, and 284, the "Nand" gates 281 and 283 being coupled to the inverter 278 and the "Nand" gates 282 and 284 being coupled to the inverter 279. The other inputs of the "Nand" gates 281 and 282 are received from the principal output of a J-K binary element 286 and the "Nand" circuits 283 and 284 receive their outputs from the complementary output of the element 286. The reversing signal K from the reverse motion logic circuit 138 (FIG. 22) causes the state of this binary elment 286 to be switched. The signal K is applied through an inverter 287 to the $P_j$ input. The clock pulse for this J-K binary element is received from the inverter 273. The output of the four "Nand" gates 281–284 are applied through respective inverters 289, 291, 292 and 293 to transistor switching circuits 294, 296, 297 and 298 for controlling the d.c. voltage applied to the windings of the clock motor 184. Thus, the direction of the clock motor 184 is changed when K is changed, but the direction of rotation of the clock motor is not reversed until the arrival of the $E_{dg}$ signal.

The K signal at the output of the inverter 288 is applied through a normal-reverse stepping switch S103 to the K' output. If this switch is in its open condition, frame-by-frame stepping is possible in the reverse direction in the freeze position of the variable speed control lever.

FIG. 21 shows a logic circuit which may be employed for the carriage logic circuit 137. In this circuit the signal $\overline{E}_{ag}$ from the head logic circuit 134 (FIG. 36) is combined with the signal $E_{bg}$ from the head logic circuit to form signal $\overline{F}_{dg}$ (FIG. 12b), the signals $\overline{E}_{bg}$ and $\overline{E}_{cg}$ from the head logic circuit are combined to form the signal $\overline{F}_{cg}1$, the signals $\overline{E}_{cg}$ and $\overline{E}_{dg}$ from the head logic circuit are combined to form the signal $\overline{F}_{bg}$ and the signals $\overline{E}_{dg}$ and $E_{ag}$ from the head logic circuit are combined to form the signal $F_{ag}$. More particularly, the signals $\overline{E}_{ag}, \overline{E}_{bg}, \overline{E}_{cg}, \overline{E}_{dg}$ from the head logic circuit 134 (FIG. 36) are applied to respective inverters 299, 301, 302, and 303 to provide the signals $E_{ag}, E_{bg}, E_{cg}$ and $E_{dg}$. Signals $E_{cg}, E_{bg}$ and $E_{ag}$ are applied to the associated outputs. The signals $E_{ag}, E_{bg}, E_{cg}$ and $E_{dg}$ are also applied through respective inverters 304, 305, 307 and 308 to the upper inputs of "Nand" gates 309, 311, 312 and 313, respectively. The signal $\overline{E}_{ag}$ at the output of the inverter 304 is also fed to the other input of "Nand" gate 313 associated with $\overline{E}_{dg}$ signal thereby providing the signal $F_{cg}$ which has the logic equation $F_{cg} = E_{dg} + E_{ag}$. The signal $F_{cg}$ is fed through an inverter 314 to the output $\overline{F}_{cg}$. The signal $E_{bg}$ at the output of the inverter 306 is also fed to the Nand gate 309 associated with the $E_{ag}$ signal thereby providing at the output of the "Nand" gate 309 the signal $\overline{F}_{dg}$ which has the logic equation $F_{dg} = E_{ag} = E_{bg}$, which signal $F_{dg}$ is applied to the output $F_{dg}$. The signal $\overline{E}_{cg}$ is also applied to the "Nand" gate 311 associated with the signal $E_{bg}$ thereby providing at its output the signal $E_{bg} + E_{cg}$ which is identified by the signal $F_{ag}$. This signal $F_{ag}$ is fed through an inverter 316 to the output $\overline{F}_{ag}$. The signal $\overline{E}_{dg}$ at the inverter 308 is also fed to "Nand" gate 312 associated with the signal $E_{dg}$ thereby providing an output $E_{cg} + E_{dg}$ which is identified as $F_{bg}$. The signal $F_{bg}$ is fed to the output $F_{bg}$.

A circuit for the reverse motion logic circuit 138 is shown in FIG. 22. As previously indicated this circuit is employed to exchange the signal $E_{ag}$ and the signal $E_{cg}$ on the outputs $E_{ak}$ and $E_{ck}$ and the signal $F_{ag}$ and signal $F_{cg}$ on the outputs $F_{ak}$ and $F_{ck}$ to cause reverse motion of the apparatus.

The signal $P_{2s}$ which is received from the fast search logic circuit 131 (FIG. 30) is equal to 1 for forward motion and goes to 0 for reverse motion. This signal $P_{2s}$ is fed through an integrating circuit 317 and through an inverter circuit 318 to the $P_k$ input of a first JK binary element 319 connected as a JF flip flop and through another inverter circuit 321 to the $P_j$ input of the first binary element. The pre-pulse G from the clock generator 132 (FIG. 31) and the signal $\overline{E}_{bg}$ from the carriage logic circuit 137 (FIG. 21) are coupled through a "Nand" gate 322 to the clock input of the first binary element 319. If the apparatus is in its forward mode of operation, the principal output of the first binary element 319 is at the binary 1 value. If the apparatus is caused to go into its reverse mode of operation, $P_{2s}$ goes from 1 to 0 thereby causing a binary 1 to be applied to the $P_k$ input of the first binary element 319 and a 0 to the $P_j$ input. However, the first binary element does not switch until the next pre-pulse G is received. The G pulses are inhibited during the $E_{bg}$ pulse by the "Nand" gate 322. This insures that the apparatus does not attempt to go into its reverse mode if the operator pushes the reverse button S3 during the entire $E_{bg}$ pulse.

The principal and complementary outputs of the first binary element 319 are applied to the $P_j$ and $P_k$ inputs respectively of a second JK binary element 323 connected as a JK flip flop. This second flip flop 323 will not switch states until it receives an $E_{bg}$ pulse from the carriage logic circuit (FIG. 21) and a prepulse G and will not switch then if the X+Y signal is not present, i.e., one of the photocell devices 51 or 52 is energized. The logic circuit which provides this function includes a "Nand" gate 324, which has applied to its inputs the signal X+Y from the carriage reversing logic circuit 143 (FIG. 25) and the pre-pulse G. The output of this "Nand" gate 324 is passed through an inverter circuit 326 to one input of a second "Nand" gate 327. The other input of the second "Nand" gate 327 is the signal $E_{bg}$; thus the output of this second "Nand" gate 327, which is fed to the clock of the second flip flop 323, is 1 in the absence of the signal $E_{bg}$ and the pre-pulse G and in the absence of X+Y signal. The output signal will only go to zero when the pulse $E_{bg}$ and the pre-pulse G is received and the signal X+Y is equal to 1. Since the pre-pulse G signal is timed to occur about at the rise time of the pulse $E_{bg}$ the second flip-flop 323 switches states at the beginning of an $E_{bg}$ pulse.

The complementary output of the second flip-flop 323 is applied through an inverter 328 and is identified as the signal K which is connected to the output K. The signal K is also connected to an inverter 329, the output of which is the complementary identified as the signal $\overline{K}$. This signal $\overline{K}$ is connected to the $\overline{K}$ output.

The exchanging of the signals $E_{ag}$ and $E_{cg}$ is accomplished in two exclusive "Or" gates 331 and 332. "Or" gate 331 includes an upper "Nand" gate 333 which receives inputs K and $E_{ag}$ and a lower "Nand" gate 334 which receives the inputs $\overline{K}$ and $E_{cg}$. The other exclusive "Or" gate 332 includes an upper "Nand" gate 336 which receives the signal K and the signal $E_{cg}$ as inputs, and a lower "Nand" gate 337 which receives the signal $\overline{K}$ and the signal $E_{ag}$ at its inputs. The outputs of each pair of Nand gates 333, 334 and 336, 337 are connected to a "Nor" gate 338 and 339, respectively. The output of the upper exclusive "Or" gate 331 is connected through an inverter 341 to the output $E_{ak}$. The output of the lower exclusive "Or" gate 332 is applied through an inverter 342 to the output $E_{ck}$. Thus, the signal $E_{ak}$ is equal to signal $E_{ag}$ and the signal $E_{ck}$ is equal to $E_{cg}$ if K is equal to 1. However, if the signal K is equal to 0 then the signal $E_{ak}$ is equal to $E_{cg}$ and $E_{ck}$ is equal to $E_{ag}$.

The $F_{cg}$ and $F_{ag}$ signals are exchanged in a similar manner, that is, two exclusive "Or" gates 343 and 344 are employed and the signals $\overline{F}_{ag}$, $\overline{F}_{cg}$, K and $\overline{K}$ are applied thereto. The outputs of the upper exclusive "Or" gate 343 is applied to the output $F_{ak}$ and the output of the lower one is applied to the output $F_{ck}$. Thus, signal $F_{ak}$ is equal to $F_{ag}$ and the signal $F_{ck}$ is equal to $F_{cg}$ if K is equal to 1. If K is equal to 0, then $F_{ak}$ is equal to $F_{cg}$ and $F_{ck}$ is equal to $F_{ag}$.

The reverse motion logic circuit 138 is also provided with means for generating a 20 microsecond pulse, called N, each time K is changed from 0 to 1 or vice versa. This means comprises a monostable multivibrator 346 formed by two Nand gates and a capacitor, the capacitor determining the length of each pulse. The signal K and the signal K' are applied through respective differentation circuits 347 and 348 to the inputs of the monostable multivibrator 346. Since the monostable multivibrator 346 is only responsive to positive pulses, a pulse is provided at the output for each rise in the K pulse and each rise is in the K' pulse. The output of the monostable circuit 346 is applied through an inverter 349 to the output N.

The carriage control logic circuit 139 is shown in FIG. 23. This is a circuit which corrects for an error that may occur in the stepping of the heads. In this connection, it only allows the carriage to move away from the photocell devices 51, 52 in order (i.e., "a" followed by "b", then "c" and then "d") by inhibiting the F' pulse that would normally cause a carriage to move when it should not. In the forward mode the only carriage that can move in error is carriage "d"; this carriage can move away from the photocell devices 51, 52 at the same time as carriage "a". Therefore, the logic inhibits the pulse $F'_d$ from being equal to 1 while either of the photocell devices 51d, 52d on channel "d" are in operation at the same time as $F_{ac}=1$ (i.e., $X_d$ or $Y_d=1$).

In the reverse mode this circuit works in a similar manner and accomplishes two objectives. First, it only allows the carriages to move away from the end stop switches in order (i.e. "d" followed by "c", then "b" and then "a"). Second, just before the carriages move away from the end stop switches, each carriage is inhibited from receiving one of its two carriage pulses so that the carriages track in the proper tracks.

Referring to FIG. 23, the signals $\overline{X}_a$ and $\overline{Y}_a$ which come from the carriage reversing logic circuit 139 (FIG. 25) and which are associated with the carriage "a", are applied to a first "Nand" gate 351, the signals $\overline{X}_b$ and $\overline{Y}_b$ associated with the "b" carriage are applied to a second "Nand" gate 352, the signals $\overline{X}_c$ and $\overline{Y}_c$ associated with the "c" carriage are applied to the inputs of a third "Nand" gate 353 and the signal $\overline{X}_d$ and $\overline{Y}_d$ associated with the "d" carriage are applied to a fourth "Nand" gate 354. The output of the "Nand" gate 351 associated with the "a" carriage signals is applied to one input of a fifth "Nand" gate 356, the other inputs being the reversing signal $\overline{K}$ and the $F_{bg}$ signal from the reverse motion logic circuit 138 (FIG. 22). The output of this fifth "Nand" gate 356 corresponds to $F_{bg}$ as long as the apparatus is in the reverse mode ($\overline{K}=1$) and one of the $X_a$ and $Y_a$ signals is interrupted; otherwise the output is equal to 1. The output of the fifth "Nand" gate 356 is applied to the input of a sixth "Nand" gate 357 which receives at its second input the signal $F_{ak}$ from the reverse motion logic circuit 138. The output is applied to the $F'_a$ output terminal.

Thus, the signal $F'_a$ corresponds to $\overline{F}_{ak}$ in the forward mode and as shown by FIG. 12b the latter half of the $\overline{F}_{ak}$ pulse is inhibited by pulse $F_{bg}$ when the apparatus is in its reversemode, and either $X_a$ or $Y_a$ is present (i.e. the carriage a is at the rim or hub), thus preventing head a from leaving before head b.

The second "Nand" gate 352, which is associated with the $X_b$ and $Y_b$ photocells, has its output connected to the one input of a seventh "Nand" gate 358 which receives at its other inputs the signal $\overline{K}$ and the $F_{ck}$ signal. The output of this seventh "Nand" gate 358 is applied to one input of an eighth "Nand" gate 359 which also receives the $F_{bg}$ signal. The output is connected to the $F'_b$ output. This logic circuit operates in the same manner as the $F'_a$ circuit previously described.

The third "Nand" gate 353 which is associated with the $\overline{X}_c$ and $\overline{Y}_c$ signals, has its output connected to one input of a ninth "Nand" gate 361 which also receives the reversing signal $\overline{K}$ and the $F_{dg}$ signal. The output of this ninth "Nand" gate 361 is connected to one input of a tenth "Nand" gate 362 which receives at its second input, the $F_{ck}$ signal. The output of this "Nand" gate is applied to the output $F'_c$. This logic circuit also operates in a similar manner to the logic circuit described in connection with $F'_a$ circuit previously described.

The fourth "Nand" gate 354 which is associated with the $\overline{X}_d$ and $\overline{Y}_d$ signals has its outputs connected to one input of an eleventh "Nand" gate 363, the other two inputs being the reversing signal K and the $F_{ak}$ signal. The output of this eleventh "Nand" gate 363 is connected to a twelfth "Nand" gate 364 which also receives the signal $F_{dg}$. The output of this "Nand" gate 364 is connected to the $F'_d$ output. Thus, during pulse $F_{ak}$, $F'_d$ is inhibited if the apparatus is in its forward mode (K=1) and either of the photocell signals $X_d$ or $Y_d$ is present (i.e. the carriage d is at the rim or hub). Thus, carriage "d" cannot move at the same time as carriage "a". In the reverse mode, (K=0) the first carriage pulse $F_{dc}$ (FIG. 12b) is inhibited by the carriage error correction logic 142 (FIG. 26). This is because the carriages do not go into the reverse mode until after the second channel "a" carriage pulse has caused the $X_a$ or $Y_a$ signal go to 0, thus inhibiting the first pulse of carriage "d".

Figure 32:
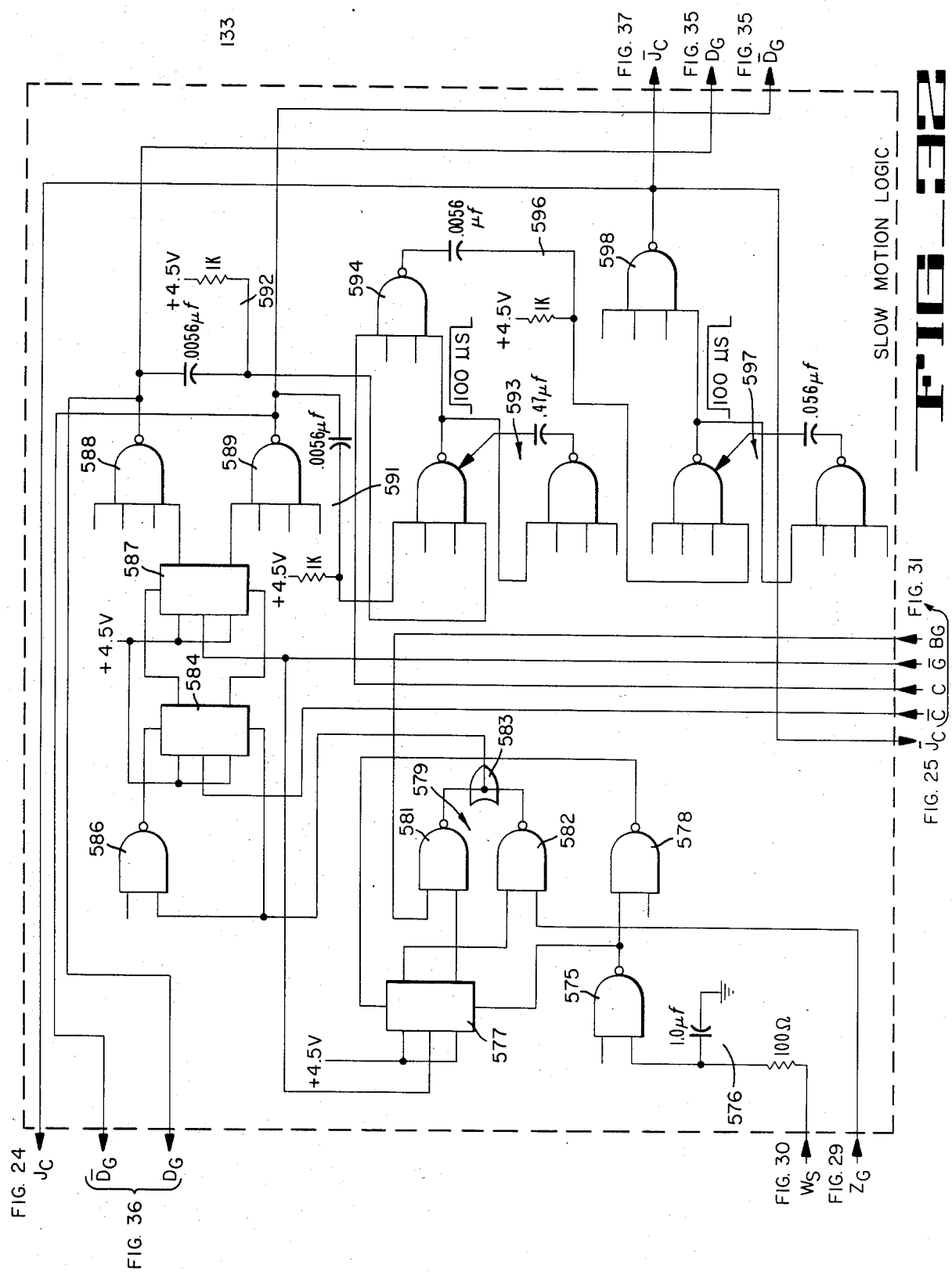
FIG. 32 is a circuit diagram of a slow motion logic in the electronics circuit of FIG. 10b.

A circuit which can be used for the carriage re-timing logic circuit 141 is shown in FIG. 24. This circuit is employed to re-time the $F'_a$, $F'_b$, $F'_c$ and $F'_d$ signals which have zero crossings at G and the resulting re-timed pulses are employed to gate the $J_c$ pulses. Four similar logic circuits are shown in FIG. 24 and therefore, only one logic circuit, the $F'_a$ logic circuit, is described similar components on the other circits being indicated with the same reference numerals. In the circuit shown in FIG. 24, the $F'_a$ signal is coupled to the $P_k$ input of a J-K binary element 366 connected as a J-K flip flop and through an inverter 367 to the $P_j$ input of the J-K flip flop 366. The clock inputs of the flip flop 366 is the clock pulse C from the clock generator 132 (FIG. 31) received via an inverter 368. The flip flop 366 is normally at a state such that the principal output is equal to 0, since the signal $\overline{F}'_a$ is coupled thereto. When the signal $\overline{F}'_a$ drops to 0, corresponding to the position of the switching pulse $F'_a$, a positive input is applied to the $P_j$ input. However, the flip flop 366 does not switch states until the clock pulse C is received. Thus the timing of the principal output corresponds to the coincidence of a C pulse with an $F'_a$ pulse. The principal output is connected to one input of a "Nand" gate 369. The other input of the "Nand" gate is a $J_c$ pulse received via a "Nand" gate 371 from the slow motion logic circuit 133 (FIG. 32). A capacitor 370 is connected between the input and ground so as to delay $J_c$ by about 2 microseconds before it is gated by the $F'_a$ re-timed pulse so that the negative zero crossings of the $F'_a$ pulse do not coincide. The other input of the "Nand" gate 371 is a Q signal which is received from the disc servo and is at the binary one value as long as the discs are rotating. Thus, each time a $J_c$ pulse is received during a re-timed $F'_a$ pulse the output of the "Nand" gate 369 goes to zero. Two $J_c$ pulses are provided for each $F'_a$ pulse (see FIG. 12b). The output of the "Nand" gate 369 is fed through an inverter 372 to the output $F_{ac}$.

A circuit which may be used for the carriage reversing logic circuit is shown in FIG. 25. When the carriages are at the hub or at the rim, the circuit determines when the motion of the carriage is reversed and also forms the X+Y signal for the reverse motion logic circuit 138 (FIG. 36). In this connection the $X_a$, $X_b$, $X_c$, $X_d$, $Y_a$, $Y_b$, $Y_c$ and $Y_d$ signals from the photocells are fed through respective inverters 373, 374, 376, 377, 378, 379, 381 and 382 to the respective complementary outputs of the circuit which are employed in the carriage control logic circuit 139 (FIG. 23) and in the carriage error correction logic circuit 142 (FIG. 26). The outputs from the $X_a$ and $X_b$ inverters 373 and 374 are coupled to inputs of a two input gate expander 383. Likewise the $X_c$ and $X_d$ inverters 376 and 377 are connected to the inputs of a second gate expander 384, the $Y_a$ and $Y_b$ inverters 378 and 379 are connected to the inputs of a third gate expander 386, and the $Y_c$ and $Y_d$ inverters 381 and 382 are connected to the inputs of a fourth gate expander 387. The outputs of the four expanders 383, 384, 386 and 387 are coupled to the expander input of a "Nand" gate 388 and the output of this "Nand" gate 388 is fed through an inverter 389 to the X+Y output. Thus, if any of the X or Y signals go to 1 (i.e., the photocell is actuated) the signal X+Y goes to 0.

The X and Y signals are also employed to provide the M signal which, in the carriage error correction logic circuit 142, changes the direction of carriage motors. In this connection, the $X_a$ and $X_b$ signals are fed to two inputs of a fifth expander 391 the output of which is connected to the $P_j$ input of a JK binary element 392 connected as a RS flip flop during normal conditions of operation (i.e. no reversals). The $X_d$ signal is fed through a sixth expander 393 to the $P_j$ input. The $X_c$ input is connected to one input of a seventh expander 394, the output of which is connected to the $P_j$ input. The other input of the seventh expander 394 is provided by a signal equal to $J_c \cdot E_{bg}$. In this connection, the $\overline{J}_c$ pulse from the slow motion logic circuit 133 (FIG. 32) is applied through an inverter 396 to one input of a "Nand" gate 397, the other input being the $E_{bg}$ pulse received from the carriage logic circuit 137 (FIG. 21). The output of the "Nand" gate 397 is connected through an inverter 398 to the input of the seventh expander 394. Thus, the $P_j$ input will be at the value one when all the X signals are equal to 1 (i.e., all the carriages are at the rim) and the $E_{bg}$ signal and the signal $J_c$ go to one. Otherwise, the $P_j$ signal is equal to 0. Likewise, the Y signals are combined and applied to the $P_k$ input of the binary element 392. In this connection, $Y_d$ is connected through an eighth expander 399 to the $P_k$ input, the signals $Y_b$ and $Y_a$ are connected to the two inputs of a ninth expander 401, the output of which is connected to the $P_k$ input, and the $Y_c$ signal is connected to one input of a tenth expander 402. The signal $J_c \cdot E_{bg}$ is connected to the other input of the tenth expander 402, the output of which is connected to the $P_k$ input. Thus, the $P_k$ input will be at one when all of the Y signals are at one (i.e., all the carriages are at the hub) and a $E_{bg}$ pulse $J_c$ pulse are present. Thus, when the carriages activate all the photocell devices 51 at the hub (i.e., $Y_a$, $Y_b$, $Y_c$ and $Y_d$ all go to 1) the $P_k$ signal goes to 1 when the next $E_{bg}$ pulse and the $J_c$ pulse are received. The JK binary element 392 is thus switched and its principal output M will go to 0. Likewise, when all the carriages activate the associated X photocells at the rim, the binary element 392 is switched to provide a 1 on its M output when the next $E_{bg}$ and $J_c$ pulses are received. As can be seen from the above the switching of the binary element 392 is timed by the $J_c$ pulse. The reason for this is that the resulting M pulse is thus timed at the clock pulse C.

The binary element 392 is also switched by a N pulse signal received from the reverse motion logic circuit 138 (FIG. 22) and applied to the clock input of the binary element 392. This N pulse is a 20 microsecond pulse generated when the apparatus goes from its reverse mode to its forward mode or vice versa. The principal output of the binary element 392 is connected to the M output and the complementary output of the binary element 392 is connected to the $\overline{M}$ output.

A circuit which can be used for the carriage error correction logic circuit 142 is shown in FIG. 26. This circuit is employed to switch the direction of movement of the motors (i.e., to inward or outward movement on the disc) and corrects for any error that may have occurred in the stepping of the carriages. Assuming that the carriages are moving in (i.e., M is equal to zero) the $F_{ac}$ signal from the carriage retiming logic circuit 141 (FIG. 24) is applied to one input of a first "Nand" gate 403, a signal $\overline{M}$ from the carriage reversing logic circuit 143 (FIG. 25) is fed to the second input, and the signal $\overline{Y}_a$ signal from the carriage reversing logic circuit 142 (FIG. 25) is fed to the third input, the output of the "Nand" gate 403 being connected to the $\overline{F}_{aci}$ output. Thus, a pulse is provided on the $\overline{F}_{aci}$ output for every $F_{ac}$ pulse except when the $Y_a$ signal goes to 1 (i.e., the carriage "a" is at the hub). Thus, the second $F_{ac}$ pulse is inhibited. Likewise, the $F_{bc}$ pulse, the $\overline{M}$ pulse and the $\overline{Y}_b$ pulse are coupled to a second "Nand" gate 404, the output of which is connected to the $\overline{F}_{bci}$ output; the $F_{cc}$ pulse, the $\overline{M}$ pulse and the $\overline{Y}_c$ are connected to the inputs of a third "Nand" gate 406, the output of which is connected to the $\overline{F}_{cci}$ output; and the $F_{dc}$ pulse, the $\overline{M}$ pulse and the $\overline{Y}_b$ pulse are coupled at the inputs of a fourth "Nand" gate 407, the output of which is connected to the $\overline{F}_{dci}$ output. The carriages step inward once for each pulse $F_{ac}$, $F_{bc}$, $F_{cc}$ and $F_{dc}$ until the associated X signal goes to 1, at which time further inward movement is inhibited. To reverse the motion of the carriages, four "Nand" gates 408, 409, 411 and 412 are provided each of which has one of its inputs connected to the M signal which goes to 1 to reverse the motion of the carriages. The first "Nand" gate 408 has a $F_{ac}$ signal and a $\overline{X}_a$ signal applied to its inputs, the second gate 409 has a $F_{bc}$ and an $\overline{X}_b$ signal applied to its inputs, the third gate 411 has an $F_{cc}$ and an $\overline{X}_c$ signal applied to its inputs, and the fourth gate 412 has an $F_{dc}$ signal and and $\overline{X}_d$ signal applied to its input. The output of the first "Nand" gate 408 is connected to the $\overline{F}_{aco}$ output, the output of the second "Nand" gate 409 is connected to the $\overline{F}_{bco}$ output, the output of the third "Nand" gate 411 is connected to the $\overline{F}_{cco}$ and the output of the fourth "Nand" gate 412 is connected to the $\overline{F}_{dco}$. Thus, the carriages step outward until the respective photocell signals are generated. This inhibits further outward movement of the associated carriage.

The output pulses from the carriage error correction logic circuit are applied to the motor drive amplifiers 129 which serve to provide suitable to drive the stepper motors. The motor drive amplifier may be similar to the circuit described above for driving the clock motor. Preferably, means (not shown) is provided in the motor drive amplifier for minimizing overshoot of each step, so that setting time is minimized. Such a means may include a timing circuit which, toward the end of a stepping motion of the motor, provides pulses to reverse the acceleration of the motor for just the time required to bring the motor to zero speed at the instant the motor completes its step.

Figure 27B:
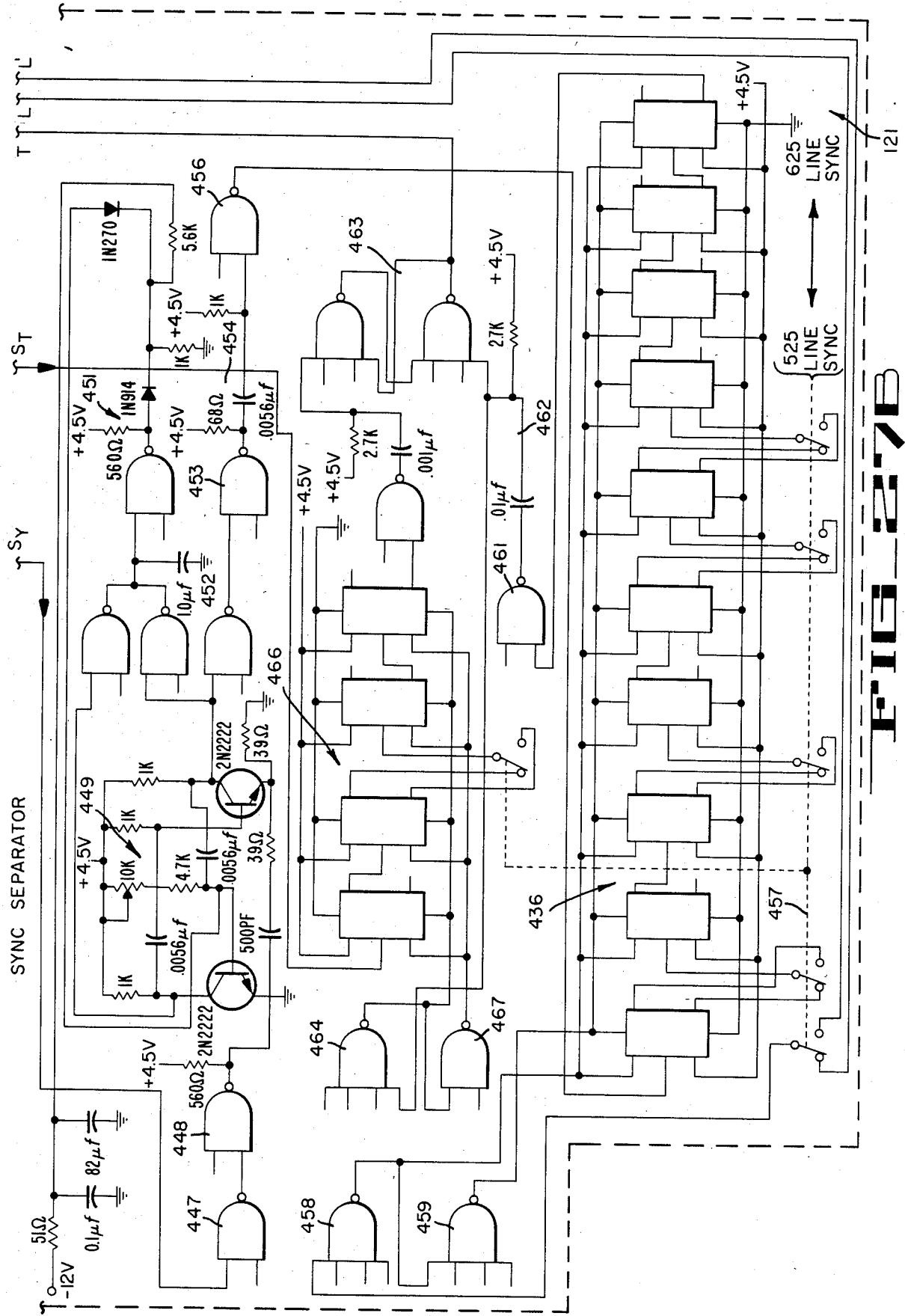

A circuit which may be used for the sync separator 121 is shown in FIGS. 27A and B, FIG. 27A being the upper half and FIG. 27B being the lower half of the circuit. The purpose of the sync separator circuit is to derive the signals $S_r$, F and T (FIG. 12a) from the reference composite sync signal, which signals are employed to control the timing of the various operations of the electronics circuit 118. The incoming composite sync signal, supplied by a suitable source such as the station synchronizing generator, is applied through a coupling capacitor 413 and is dc restored by a diode 414. It is then coupled to one input of an "Nand" gate 416 which serves to gate out the first serration of the vertical sync pulse identified as signal $S_r$ (the servo reference pulse). The signal employed for gating in the "Nand" gate 416 is generated by three monostable circuits 417, 418, and 419 and an integrating and clamping circuit 420 and extends for a period of approximately 17 microseconds. More particularly, the clamped composite sync is coupled through three inverters 421, 422 and 423, to the integrating and clamping circuit 420 which formed by a capacitor 424, and a resistor 426 connected to a power supply, the input signal being connected across the capacitor, and by a diode 427 connecting the capacitor to a power supply. The line sync pulse and the equalizing pulses, because of their short duration, develop only a slight voltage across the capacitor 424 which is not sufficient to overcome the clamping voltage of the diode 427; but the first portion of the vertical pulse is of suffcient duration to charge the capacitor sufficiently to overcome the clamping voltage thereby providing a trigger pulse via a differentiating circuit 428 for the first monostable circuit 417. The first monostable circit 417 includes two "Nand" gates and a capacitor and provides a pulse of 5 microsecond duration.

The output from the first monostable circuit 417 provides, via an inverter 430 and a differentiating circuit 429, a trigger for the second monostable circuit 418 consisting of two "Nand" gates and a capacitor. The second monostable circuit 418 provides an output pulse of 600 microseconds in duration which prevents pulses generated by the remainder of the vertical serrated pulse from providing additional trigger pulses to the subsequent monostable circuits. The output of the second monostable circuit 418 is coupled through a differentiating circuit 431 to the third monostable circuit 419 consisting of two "Nand"gates and a pair of capacitors, thereby triggering the same with the leading edge of the pulse. This monostable circuit 419 provides the L pulse having a period equal to 17 microseconds which is greater than one but less than two vertical serrated pulses. This L pulse is applied to the "Nand" gate 416 thereby gating out the first vertical serrated pulse which, after being inverted by an inverter 432, becomes the servo reference pulse $S_r$ (see FIG. 12a).

The output of the 600 of microsecond monostable circuit 418 is also applied through a differentiating circuit 433 to trigger a 47 microsecond monostable circuit 434 made up of two "Nand" gates and parallel capacitors. This 47 microsecond pulse is designated as the L' pulse and has a duration equal to a period of two vertical serrated pulses. These two wave forms, L and L', provide reset pulses for a binary divider 436, (FIG. 27b), explained hereinafter.

The F pulse is the field identification pulse (i.e. identifies odd and even fields) and is generated by gating out the line sync pulse coincident with the first vertical serrated pulse using a "Nand" gate 437 and the previously described L pulse as a gating wave form. The line sync pulses $S_y$ are generated by two monostable circuits 438 and 439 using the composite sync signal as the trigger for the first monostable circuit 438. In this connection, the composite sync wave form at the output of the inverter 421 is applied through a second inverter 441 and a differentiating circuit 442 to the first monostable circuit 438 made of two "Nand" gates and a connecting capacitor. This monostable circuit 438 produces a pulse of 45 microseconds duration which is used to inhibit alternate equalizing and vertical serration pulses. The output from the first monostable circuits 438 is coupled through an inverter 443 and a differentiating circuit 444 to the input of the second monostable circuit 439 composed of two "Nand" gates and a capacitor, thereby triggering the same. The second monostable circuit 439 provides a train of five-microsecond pulses which form the line sync signal $S_y$, which are applied to the "Nand" gate 437. Since the line sync signal $S_y$ and the signal $L_r$ only coincide for odd fields (FIG. 12a) an output is only produced for odd fields. The output of the "Nand" gate 437 is coupled through an inverter 446 to the output F.

The T pulse is a positive return to zero pulse which begins at the end of the last line sync pulse, extends through equalization and vertical sync and terminates prior to the beginning of the first line sync pulse. To generate the leading edge of the T pulse the $S_y$ line sync pulse is coupled through a pair of inverters 447 and 448 (FIG. 27b) to a flywheel circuit 449, the flywheel circuit composing a free running multivibrator made up of transistors together with the associated resistors and capacitors and a self-starting circuit 451 made up of three inverters. The flywheel circuit 449 is pretriggered by the incoming line sync signal $S_y$. Should one or more line sync signals be missing the flywheel circuit 449 will run at its natural frequency which is set for a frequency five percent slower than normal horizontal line frequency.

The output of the flywheel circuit 449 is coupled through a pair of inverters 452 and 453, a differentiating circuit 454, and a third inverter 456 to the clock input of the binary divider 436 which includes ten JK binary elements connected as a ripple through counter. A switch 457 is provided in the counter 436 to permit the apparatus to be employed with a SECAM system (625 line sync) or with a NTSC system (525 line sync). The switch 457 selects L' as a reset pulser for the NTSC system and the reset pulse L for the SECAM system, which provides for the difference between the number of lines and equalization pulses in the two systems. The reset pulse L or L' is applied through an inverter 458 to the J inputs of the binary elements in the counter 436 and through a second inverter 459 to the $P_j$ inputs.

The ripple through counter 436 counts the same number of line sync pulses for odd and even fields, and therefore the circuit is arranged so that the counter 436 counts exactly 258 line sync pulses when the switch 457 is in its NTSC position and 309 line sync pulses when it is in its SECAM position. To meet these requirements the pulse L' is applied to the counter 436 to reset the same after the second vertical serrated pulse for NTSC and the L pulse is applied to the counter 436 to reset the same after the first vertical serrated pulse for SECAM. When the last line sync pulse has been counted by the counter 436 an output is provided which is applied via an inverter 461 and differentiating circuit 462 to a "Nand" gate flip-flop 463 thereby changing the state of the same and generating the leading edge of the T pulse at its output (FIG. 12a).

In addition to generating the leading edge of the T wave form the differentiated output from the counter 436 is applied through an inverter 464 to the $P_k$ inputs of a chain of binary elements forming a second counter 466 and through a second inverter 467 to the K inputs. The counter 466 counts 12 when the switch 457 is in its NTSC position and counts 10 when the switch is in its SECAM position. The clock input fed to the second counter 466 is formed by gating out the composite sync wave form starting with the first vertical serrated pulse. The gating wave form is generated by the 600 microsecond monostable 418 (FIG. 27a), and is applied to a "Nand" gate 468. The sync wave form is received from the inverter 422. The output of the "Nand" gate 468 is applied to the clock input of the second counter 466 (FIG. 27b). The count thus lasts to the end of equalization at which time the counter 466 provides an output which resets the "Nand" gate flip-flop 463 thus generating the trailing edge of the T pulse (FIG. 12a).

A circuit which may be employed for the servo reference delay 122 is shown in FIG. 28. The purpose of the servo reference delay 122 is to retard the phase of the disc when recording, and then advance it while playing back. The resulting time advance of the reproduced signal compensates for the signal delays in the playback electronics (particularly Amtec and Colortea), so that the reproduced video is in the same time relationship to reference sync as is the video input signal.

To accomplish the delay of the servo reference pulse $S_r$ in record, the $S_r$ pulse received from the sync separator (FIG. 27) is fed through a differentiating circuit 470 and two inverting amplifiers 469 and 471 to a shorted delay line 472 having a transition and a reflected delay totaling 15 microseconds. The reflected pulse which is negative, triggers a diode-transistor gate circuit 473. The delay line 472 is maintained approximately two volts above ground to insure that noise will not trigger the diode-transistor gate circuit 473. The output pulse from the diode-transistor gate circuit 473 is inverted by the transistor circuit 474 and is fed to one input of a "Nand" gate 476, the other input being the record command $P_4$ ($P_4$ equals 1 during record) from the control logic circuit 128 (FIG. 19). The output signal is fed through an emitter follower 477 to the output $R_d$, the signal $R_d$ controlling the disc servo.

In replay the incoming servo reference pulse $S_r$ is again inverted by the transistor circuit 469 and is applied to a voltage variable delay circuit 478 consisting of two transistors coupled to a monostable circuit in which one collector voltage is varied in accordance with the slowly varying DC error voltage from the Amtec unit. The DC input from the Amtec unit is buffered by an emitter follower 479 and a grounded emitter circuit 481. The output of the grounded emitter circuit 481 drives a differential amplifier 482, the output of which is buffered by the emitter follower 483, and becomes the collector potential for the monostable circuit 478. The variable delay monostable 478 has a pulse width range from 0.5 microseconds to 8 microseconds.

The output from the monostable circuit 478 is applied through an inverter 484 to a "Nand" gate 486, the other input of the "Nand" gate 486 being received via an inverter 487 from the record command signal P4 (P4=0 in replay). The output of the "Nand" gate 486 is applied through the cathode follower 477 to the output $R_d$.

The slow motion quantizer is shown in FIG. 29. This circuit generates the $Z_g$ wave form which enables the apparatus to reproduce motion from normal motion down through any slow motion speed to about freeze motion. The slow motion control wave form $\overline{A}_s$ from the alternate field logic circuit 156 is applied through an integrator 488 and an inverter 489 to the $P_j$ input of a first JK binary element 491 connected as a JK flip-flop and through another inverter 492 to the $P_k$ input of the flip-flop. The prepulse G from the clock generator 132 (FIG. 31) is applied to the clock input of the first flip-flop 491. This flip-flop delays the zero crossings of $A_s$ if they occur at the same time as the prepulse G to avoid ambiguous flip-flop output. Thus, as shown in FIG. 14 if the prepulse G is present on the clock input when a zero crossing of $A_s$ occurs, the flip-flop 491 does not switch its output until G goes to zero.

The complementary output of the first flip-flop 491 is differentiated by a differentiating circuit 493 and the differentiated signal $S_l$ is applied to the $P_j$ input of a second JK binary element 494 connected as a RS flip-flop. This second flip-flop 494 is set by each G pulse if it has been previously reset by the $S_l$ signal from the first flip-flop 491. The G pulse from the clock generator 132 (FIG. 21) is delayed by, for example, 7 microseconds, to prevent ambiguous by, for example, 7 microseconds, to prevent ambiguous flip-flop outputs from the second flip-flop 494. In this connection, the prepulse G is coupled through a differentiating circuit 496, a buffing circuit 497, an inverter 498, and a second differentiating circuit 499 to the $P_k$ input of the second flip-flop 494.

The principal output $Z_l$ (FIG. 14) of the second flip-flop 494 is connected to the clock input of a third JK binary element 501 which is connected as a RS flip-flop and acts as a 2:1 divider. In this connection, the third flip-flop 501 changes its state for each negative going zero crossing of the principal output $Z_l$ of the second flip-flop 494. The complementary output of the third flip-flop 501 is applied to the output $Z_g$.

The output $Z_g$ thus has its zero crossings at the 7 microsecond delayed leading edge of the prepulse G. If the input rate of the slow motion wave form is larger than twice the field rate, the slow motion quantizer produces a $Z_g$ wave form equal in rate to $D_g$ (i.e. normal motion).

Figure 30A:
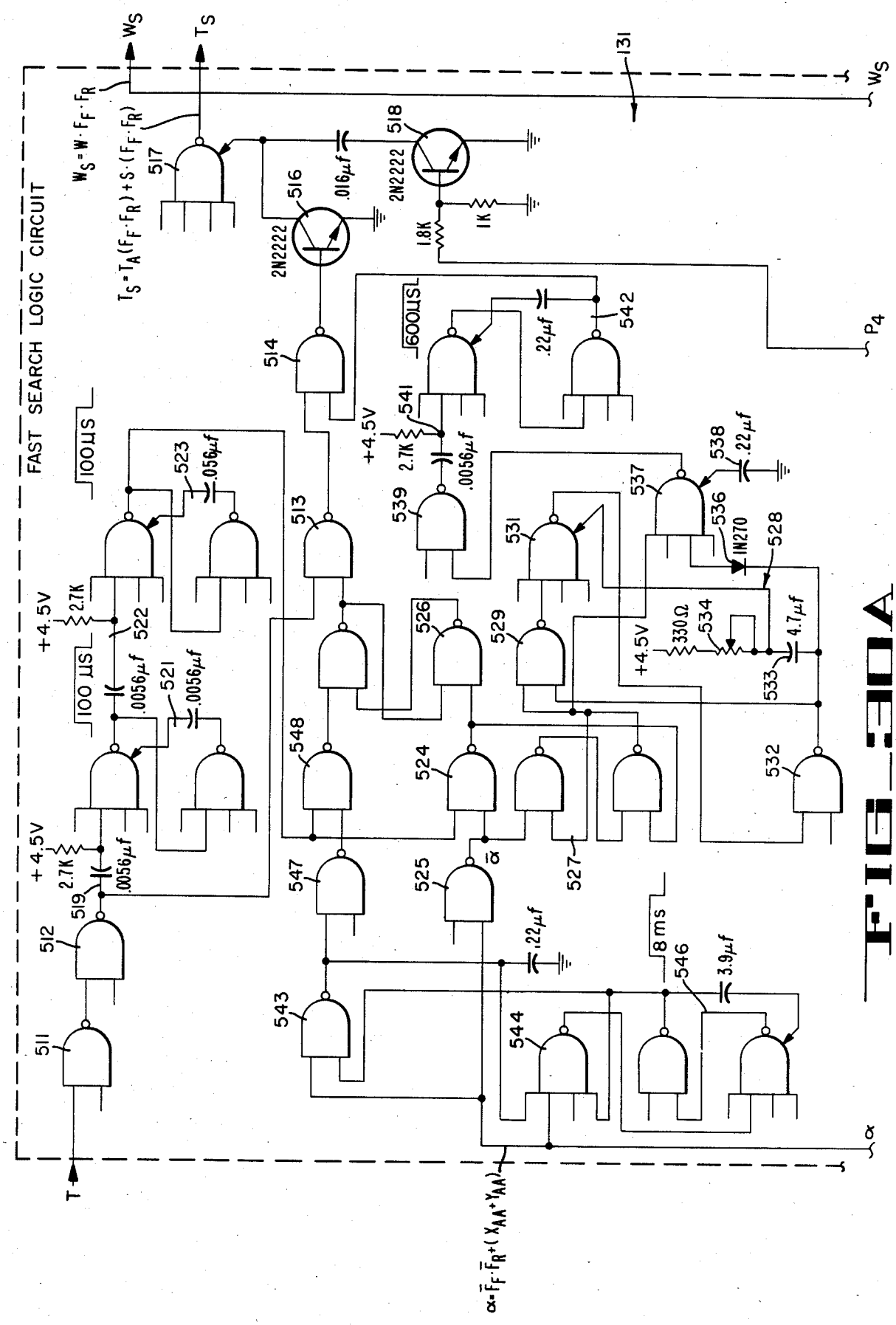

A circuit which may be employed for the fast search logic circuit 131 is shown in FIGS. 30a and 30b. This circuit controls the operation of the apparatus in its search mode and generates an internal clock signal which is about four and one-half times the rate of the normal pulse T to thereby cause the apparatus to step about four and one-half times as fast as normal.

More particularly, the commands for the apparatus in the fast search mode are generated in the lower portion of the circuit (FIG. 30b). In the fast search mode the apparatus is placed by suitable means (not shown) into an electronics to electronics (E to E) operation since no information is coming off the discs. Specifically, the output of the recording circuit 123 is fed to the input of the reproduce circuit 147 in both record and fast search modes, but in the fast search mode is not fed to the heads. Since the alternate field logic circuit 34 is activated by the control signal (P4=0), it is deenergized by a $F_f F_r$ signal from the fast search logic circuit 131. The $F_f F_r$ command for the alternate field logic circuit 15 is provided by coupling the $F_r$ and $F_f$ signals from the search and frame advance control means 159 (FIG. 17) to the inputs of a "Nand" gate 502, the output of which is applied through an inverter 503 to the output $F_f F_r$. This signal will be one except when the fast forward button 510 or the fast reverse button 511 is pressed and it will then go to zero. The $P_{2s}$ signal is generated by coupling the $F_f F_r$ signal at the output of the inverter 503 to one input of a "Nand" gate 504, the other input of the "Nand" gate 504 being the $P_2$ signal received via an inverter 506. Since $P_2$ is one in the forward mode of operation and zero is the reverse of operation, the output of the "Nand" gate 504 is equal to 1 except when the apparatus is in its reverse mode and the apparatus is not in its fast search mode. This output is applied to a second "Nand" gate 506 the other input of which is received from a third "Nand" gate 507. The inputs of the third "Nand" gate 507 are the fast forward signal $F_f$ and the $\overline{F}_r + \overline{F}_f$ signal from the "Nand" gate 507. The output of the second "Nand" gate 506 is applied through an inverter 508 to the $P_{2s}$ output. Thus, $P_{2s}$ is 1 in the fast forward search mode, 1 in the forward mode, 0 in the reverse fast search mode, and 0 in the reverse mode.

The slow motion signal W is inhibited by the fast search logic circuit when the apparatus is in its fast search mode. More particularly, the signal W from the control logic circuit 128 (FIG. 19) is applied to one input of a "Nand" gate 509, the other input being the $F_f F_r$ signal from the inverter 503. The output of the "Nand" gate 509 is passed through an inverter 510 to the $W_s$ output. Thus, W is inhibited ($W_s$ goes to 0) if either the fast forward button 510 or the fast reverse button S11 is pressed since $F_f$ or $F_r$ goes to 0. As will be explained, W going to 1 causes the slow motion logic circuit 133 to be controlled by $B_g$ rather than $Z_g$, $B_g$ being in turn controlled by $T_s$ from the fast search logic circuit 131.

In every mode except the fast search mode, the signal $T_s$ corresponds to the signal T which is received from the sync separator 121 (FIG. 27). The signal T as previously described and as shown in FIG. 12a is equal to 1 during the vertical interval. More particularly, as shown in FIG. 30a the T signal from the sync separator 121 is applied through a pair of inverters 511 and 512, to one input of a first "Nand" gate 513. As will be described hereinafter, the other input of this first "Nand" gate 513 is equal to 1 except during the fast search mode of operation. The output of the first "Nand" gate 513 is applied to one input of a second "Nand" gate 514, the other input of which is a binary 1, except during the fast search mode of operation. The output of the second "Nand" gate 514 is applied through a buffer 516 to the expander node of a "Nand" circuit 517 which acts as an additional buffer to the $T_s$ output. Thus, $T_s$ corresponds to T except during the fast forward or the fast reverse mode of operation. An inhibiting gate 518 is provided at the output of the buffer 516 which when switching from replay to record inhibits the signal $T_s$ for a slight time delay after P4 goes to one.

In the fast forward and fast reverse modes of operation, a 600 microsecond pulse is substituted for the signal T, the repetition rate of this 600 microsecond pulse being approximately once every 3.7 milliseconds or about four and one-half times the repetition rate of the pulse T. However, certain conditions must be met to assure correct operation of the stepper system, which is controlled by the $T_s$ pulses. It should be noted that the carriage and stepping motor assemblies contain an inherent inertia limiting the maximum number of steps which can be performed without errors in a given time unit. This requires that the switching from normal to fast mode, or from fast to normal mode must be time quantized during the T pulse cycle so that time interval between the normal T pulse and the fast search T pulse is not less than that which will cause an error in stepping. Thus, in the illustrated circuit transfer switching from normal T pulses to fast search T pulses or vice versa, is arranged to take place over a time interval equal to or longer than the interval between two fast T pulses. Furthermore, the transfer may not take place during the presence of a normal T pulse to preserve the shape of the T pulse and to prevent the simultaneous occurrence of a normal and a fast search T pulse.

First considering the normal to fast search transfer, the normal T pulse from the inverter 512 (FIG. 30A) is fed via a differentiator 519 to a first monostable circuit 521 including two "Nand" gates and a capacitor, which circuit generates a 100 microsecond pulse at the trailing edge of the T pulse. This output pulse is fed through a differentiating circuit 522 to a second monostable circuit 523, including two "Nand" gates and a capacitor, whereby the second monostable 523 is triggered by the trailing edge of the first 100 microsecond pulse. The output of the second monostable 523 is also a 100 microsecond pulse which is delayed by 100 microseconds with respect to the trailing edge of the T pulse. This output pulse is fed to a first "Nand" gate 524, the other input of which is $\alpha$ received via an inverter 525. The signal $\alpha$ goes to 0, as described hereinafter, when either fast search switch is pressed and the photocell devices $X_{aa}$ and $Y_{aa}$ are not energized. Thus, the output of the first "Nand" gate 524 goes to zero for 100 microseconds after the first T pulse occurs after $\alpha$ goes to 0, and this output is applied to the set input of a first flip-flop circuit 526 including a pair of cross coupled "Nand" gates. The output of the first flip-flop circuit 526, which is applied to the "Nand" gate 513, thereby goes from 1 to 0 and inhibits the normal T pulse.

The 100 microsecond pulse at the output of the first "Nand" gate 524 is also applied to the set input of a second flip-flop circuit 527 composed of two cross coupled "Nand" circuits. The output of this flip-flop circuit 527 controls the energization of a free running multivibrator 528 which produces the fast search T pulses. The free running multivibrator 528 includes the three "Nand" gates 529, 531 and 532, a capacitor 533 and a frequency control resistor 534. The multivibrator 528 basically is a modified monostable retriggering its own input. When the monostable output at the output of the "Nand" gate 532, which is a negative-going pulse of approximately 3.7 milliseconds, returns to its quiescent level it causes retriggering of the multivibrator input via the "Nand" gate 529. However, the capacitor of the RC timing section 533, 534 has to discharge before the input triggering has an effect on "Nand" gate 531. The capacitor 533 will discharge across an internal diode of the "Nand" gate 531 between the expander node and the input and after a very short delay causes the monostable 528 to trigger on again. This results in a positive, short-duration pulse appearing at the multivibrator output of the "Nand" gate 532 which is coupled through a sterring diode 536 to an output "Nand" gate 537 which is enabled by the output of the second flip-flop 527. This enabling is delayed by the capacitor 538 so that the first output pulse after switching does not occur until about the time interval between fast search T pulses. A negative output pulse appears at the output of the output "Nand" gate 537 and is fed through an inverter 539 to a differentiator 541, the negative-going portion of the differentiated pulse triggering a monostable circuit 542 composed of two "Nand" gates and a capacitor. Negative-going output pulses of approximately 600 microseconds appear at the output of the monostable circuit 542 for every fast search T trigger pulse. Fast search T trigger pulses occur approximately every 3.7 milliseconds, which is at a rate of 4.5-times the rate of normal T pulses. The monostable circuit output pulses are the fast search $T_s$ pulses, and are routed via the "Nand" gate 514, the buffer 516, and the "Nand" gate buffer 517 to the output $T_s$. Generation of fast search $T_s$ pulses continues until the $\alpha$ signal of the input of "Nand" gate 524 changes from a binary 0 to a binary 1 (i.e. from fast search to normal or slow motion).

Now considering the fast search to normal transfer, the circuit is arranged so that transfer from fast search to normal motion may not take place during the presence of a $T_s$ pulse, nor may it take place during the presence of a normal T pulse. The $\alpha$ signal is routed through the inverter 525 and on to the reset input of the multivibrator on/off flip-flop 527, thereby causing the flip-flop to reset and preventing retriggering of the fast search trigger pulse generator 528. No further trigger pulses can reach the $T_s$ monostable circuit 542, as the output gate 537 of the multivibrator 528 is now inhibited by the flip-flop output from the flip-flop 527. The $\alpha$ signal is also applied to a "Nand" gate 543 and an input "Nand" gate 544 for a flip-flop circuit 546. The $\alpha$ signal enables the input gate 544 thereby triggering the monostable circuit 541 composed of a pair of "Nand" gates and a capacitor. The output of this monostable 546 is an 8-millisecond, negative-going pulse which is used to delay the enabling of the normal T pulse for 8-milliseconds after the fast search pulses are inhibited. When the monostable 544 returns to its quiescent state, the "Nand" gate 543 passes the $\alpha$ signal which resets the monostable 546. The $\alpha$ signal is passed through an inverter 547 to a "Nand" gate 548. There the $\alpha$ signal awaits the next gating wave form from the monostable 523 to gate $\alpha$ into the reset of the flip-flop circuit 526 which enables gate 513 to pass the T pulse. Since the monostable 523 produces a pulse 100 microseconds after a normal T pulse, it prevents enabling of the normal T pulse at T time, which could result in gating of a partial T pulse with resultant errors in stepping.

The $\alpha$ signal previously described established whether the system should be in fast search or not represents a binary 1 for normal, and a binary 0 for fast search. As shown in FIG. 30b, four input signals are used to derive $\alpha$. These are the signals $F_r$, $F_f$, $X_{aa}$, and $Y_{aa}$. The $F_f$ and $F_r$ signals originate from the search and frame advance control means 159 (FIG. 17). The signal $F_f$ is equal to a binary 0 when the fast forward button is pressed and similarly $F_r$ is equal to a binary 0 when the fast reverse button is pressed. The carriages can not negotiate their end-stop switches at the fast search stepping speed and and therefore slowed to normal stepping speed in the vicinity of the end-stops. The prewarning photocells $X_{aa}$ or $Y_{aa}$ is actuated whenever carriage is within six tracks of the photocells $X_a$ or $Y_a$. $X_{aa}$ equals binary 1 for outer limit prewarning and $Y_{aa}$ equals binary 1 for inner limit prewarning. If $X_{aa}$ or $Y_{aa}$ becomes equal binary 1 and the system is in a fast search mode it causes a transfer to the normal stepping speed for the time duration that the carriage is in the prewarning zone. Therefore $\alpha$ equals binary 0 only if both $X_{aa}$ and $Y_{aa}$ equal binary 0, and if $F_f$ or $F_r$ equals binary 0. The boolean equation for $\alpha$ is: $\alpha = (X_{aa} + Y_{aa}) + \overline{F}_f \overline{F}_r$.

The $X_{aa}$ signal and the $Y_{aa}$ signal are applied through respective inverters 549 and 551 to the inputs of a "Nand" gate 552. The output of the "Nand" gate 552 is applied through an inverter 553 to one input of a second "Nand" gate 554. The other input of this "Nand" gate 554 is the $\overline{F}_r + \overline{F}_f$ signal at the output of the "Nand" gate 502, the output of the "Nand" gate 554 being the signal $\alpha$.

The field identification pulses F are inhibited during fast search modes since the fast search speed has no direct relationship with the incoming sync. $F = F_s$ when the machine is not in a fast search mode, but $F_s$ is to be equal binary 0 when in a fast search. The Boolean equation therefore is: $F_s = F \cdot \overline{F}_f \overline{F}_r$. A "Nand" gate 556 receives the F pulses from the sync separator 121 (FIG. 27) and the $F_f F_r$ signal from the inverter 503. The output from the "Nand" gate is inverted by an inverter 557, and the output of the inverter is the signal $F_s$.

A circuit which can be used for the clock generator 132 is shown in FIG. 31. This circuit receives the $T_s$ and $F_s$ signals from the fast search logic circuit 131 (FIG. 30) and produces the three basic timing pulses which are used to synchronize the switching of the system logic. These timing pulses are the pre-clock pulse G, the clock pulse C and the timing pulse $B_g$ (see FIG. 12a). More particularly, the $T_s$ pulse from the fast search logic circuit 137 is applied through an inverter 558 and through a differentiating circuit 559 to a monostable circuit 561 comprising two "Nand" gates and a capacitor. Thus, the monostable circuit 561 provides an output at the leading edge of each pulse $T_s$. The output pulse is a 20 microsecond pulse which is applied through an inverter 562 to a $\overline{G}$ output signal and through a second inverter 563 to the output G. The logic circuits in the system are preset by the G prepulse, which occurs prior to the clock pulse C, to assure that switching transients subside before the system switching takes place and also to allow for the transfer delays of the logic elements.

The system clock pulse C is derived for the trailing edge of the $T_s$ pulse. This pulse C is employed to time switching pulses which are used in the switching from head to head and from carriage to carriage. More particularly, the signal $\overline{T}_s$ from the first inverter 558 is applied through a second inverter 564 and a differentiating circuit 566 to a monostable circuit 567 which includes a pair of "Nand" gates and a capacitor. Since the input signal is the differentiated $T_s$ signal, the monostable 567 produces a 20 microsecond pulse at the trailing edge of $T_s$ pulse. This 20 microsecond pulse is applied through an inverter 568 to the output $\overline{C}$ and through two inverters 569 and 571 to the outputs C.

The $B_g$ pulse is a divided by two version of the pre-clock pulse G and is phased by the field identification pulse $F_s$ from the fast search logic circuit 131. Phasing of the wave form $B_g$ with $F_s$ causes even fields to be recorded by heads a and c and odd fields to be recorded by heads b and d. More particularly to form the wave form $B_g$, the prepulse G from the inverter 563 is applied to the clock input of a JK binary element 572 connected as a JK flip-flop. The $P_k$ input of the flip-flop 572 is the $F_s$ signal from the fast search logic circuit 131 which is received via a pair of inverters 573 and 574. Thus, the $F_s$ signal pre-sets the flip-flop 572 and the trailing edge of the prepulse G causes the flip-flop to be set if the $F_s$ pulse was equal to 1 at any time since the prior G pulse or to be reset if the $F_s$ pulse was equal to 0 at all times since the last prepulse G. The complementary output of the flip-flop is coupled to the output $\overline{B}_g$ and its principal output is applied to the output $B_g$. Since an $F_s$ is present for each even field, $B_g$ will be 1 for an even field and 0 for an odd field.

A logic circuit which may be employed for the slow motion logic circuit 133 is shown in FIG. 32. This circuit provides the fundamental motion waveform $D_g$ and the carriage clock pulse $J_c$. The slow motion control signal $W_s$ which is received from the fast search logic 131 (FIG. 30) is applied through an integrating circuit 576 and through an inverter 575 to the $P_k$ input of the J-K binary element 577 which is connected as a J-K flip flop. The signal $\overline{W}_s$ applied to the $P_k$ input is also applied through an inverter 578 to the $P_j$ input. The clock signal for the J-K binary element is received from the prepulse $\overline{G}$ from the clock generator 132 (FIG. 31). Thus if there is a change in slow motion control signal $W_s$, the flip flop 577 does not change until the next prepulse $\overline{G}$ so as to prevent a change during a clock pulse which might result in system errors.

The principal and complementary outputs of the flip flop 577 are connected to an exclusive "Or" circuit 579 which includes a pair of "Nand" gates 581 and 582, the outputs of which are connected to a "Nor" gate 583. The principal output of the flip flop 577 are coupled to the lower "Nand" gate 282 with the $Z_g$ signal from the slow motion quantizer (FIG. 29). The complementary output of the flip flop 577 is coupled to the upper "Nand" gate 581 with the signal $B_g$ from the clock generator 132.

The output of the exclusive "Or" circuit, which is either $B_g$ or $Z_g$ depending upon the signal $W_s$, is applied to the $P_k$ input of a second binary element 584, which is also connected as a J-K flip flop, and is connected through an inverter 586 to the $P_j$ input. The clock pulse of the second flip flop 584 is the clock pulse $\overline{C}$ received from the clock generator 132. Thus, the second flip flop 584 is switched by the clock pulse thereby retiming $B_g$ or $Z_g$ as the case may be (i.e., $B_g$ if $W_s$ is equal to 0, or $Z_g$ if $W_s$ is equal to 1). This prevents switching transients from causing logic errors. The principal output of the second flip flop 584 is connected to the $P_j$ input of a third J-K binary element 587 connected as a J-K flip flop, and the complementary output of the second flip flop 584 is connected to the $P_k$ input of the third flip flop 587. This third flip flop is switched by the prepulse $\overline{G}$ applied to its clock input. Thus, this third flip flop re-times the signal $Z_g$ or $B_g$ in accordance with the prepulse G so that it may be employed on the head logic. The principal output of the third flip flop 587 is applied through an inverter 588 to the output $D_g$. The complementary output of the third flip flop 587 is connected through an inverter 589 to the output $\overline{D}_g$. The signal $D_g$ corresponds with the signal $B_g$ in a normal or fast search modes and with the signal $Z_g$ in the slow motion mode or alternate field mode.

The carriage clock pulse J is generated by coupling the signal $D_g$ and the signal $\overline{D}_g$ through respective differentiating circuits 591 and 592 to a monostable circuit 593 including a pair of "Nand" gates and a capacitor. Thus, this monostable 593 provides a pulse, for example, a 100 microsecond pulse, at the beginning and end of each pulse $D_g$. The output of this monostable circuit 593 is "Nand" with the clock pulse C from the clock generator 132 in a "Nand" gate 594, and the output is applied through a differentiating circuit 596 to a second monostable circuit 597 which includes a pair of "Nand" gates and a capacitor which provides a 100 microsecond pulse at its output. Thus, a 100 microsecond pulse is provided for each zero crossing of the signal $B_g$ or $Z_g$, and this pulse is timed by the clock pulse C. The 100 microsecond pulse which is applied through an inverter 598 to the output $\bar{J}_c$. Thus, carriage clock pulse $J_c$ is equal to the clock pulse, C, if $D_g$ is equal to $B_g$, but if $D_g$ is equal to $Z_g$, the $J_c$ pulse occurs at the next clock pulse C following a zero crossing of $Z_g$. (See FIG. 14).

A switch which may be employed for the alternate field switch 153 is shown in FIG. 33. This switch which is employed to place the apparatus in its alternate field record mode of operation, is a manually operated three pole-double throw switch. In its normal position the output K' is connected to the signal K from the reverse motion logic circuit 138 (FIG. 22). $R'+B_g$ output is connected to the signal R' from the half-line delay logic circuit 158 (FIG. 35) and the output $A_f$ is grounded. In the alternate field mode position the output K' is grounded, the output $R'+B_g$ is connected to the signal $B_g$ from the clock generator 132, and the output $\bar{A}_f$ is connected to a binary 1 value.

FIG. 34 shows a logic circuit which may be employed for the alternate field logic circuit 156. This circuit exchanges the waveform $B_g$ for the slow motion wave form A when the apparatus is in the alternate field mode of operation and provides a signal B' which corresponds to $B_g$ in the alternate field mode of operation and is equal to 1 in the normal mode of operation.

In the circuit shown in FIG. 34, the slow motion control waveform A from the control logic circuit 128 (FIG. 19) is applied to one input of a "Nand" circuit 599, the other input being signal $\bar{P}_3$ received via an inverter 501 from the $P_3$ input, provided by the control logic circuit 128 (FIG. 19). The output of the "Nand" gate 599 is connected to $\bar{A}_a$, thus $\bar{A}_a$ is equal to A when $P_3$ is equal to 0. The waveform $B_g$ from the clock generator 132 (FIG. 31) is connected through two inverters 602 and 603 to one input of a "Nand" gate 604, the other input to the "Nand" gate being the signal $P_3$. The output of the "Nand" gate 604 is applied to $A_a$ output, whereby when $P_3$ is equal to 1 (i.e., the apparatus is in the alternate field mode), the signal $A_a$ is equal to $B_g$.

The signal B' is formed by coupling the $B_g$ signal at the output of the inverter 603 to one input of a "Nand" gate 606. The other input to the "Nand" gate 606 is received through a pair of inverters 607 and 608 from the signal $P_3$. The output of the "Nand" gate is applied to the output $\bar{B}'$. Thus, the signal B' is equal to 1 when $P_3$ is equal to 0, and is equal to $B_g$ when $P_3$ is equal to 1 (the apparatus is in the alternate field mode).

The signal R employed to control the half-line delay 149 is formed by applying the signal $T_s$ from the clock generator 132 to one input of a "Nand" gate 609. The $F_fF_r$ signal from the fast search logic is applied to the second input, the $P_4$ signal from the control logic circuit 128 is applied through an inverter 611 to a third input, and the $R'+B_g$ signal from the alternate field switch 153 (FIG. 33) is applied to the fourth input. The output of the "Nand" gate 607 is applied to the R output. Thus, the signal R is equal to 1 when $T_s$ is equal to 1 (i.e., during equalization) or is equal to 1 when the apparatus is in the fast search mode of operation ($F_FF_R=0$) or is equal to 1 if the apparatus is in the record mode ($P_4=1$). During normal replay, except during equalization, the signal R is equal to R' and it is equal to $B_g$ if the alternate field switch 153 is in its alternate field position.

FIG. 35 shows the circuit which may be employed for the half-line delay logic circuit 149. This circuit compares the states of the $D_G$ and $B_G$ waveforms to determine if the half-line delay is required. When the $B_G$ waveform is equal to a binary 1, the output video should be an even field, and inversely when the $B_G$ waveform is equal to a binary 0, the output video should be an odd field. During normal record $D_G=B_G$ and even fields are recorded on surface a and c, while odd fields are recorded on surfaces b and d. In normal reproduce $D_G$ either equals $B_G$ or $\bar{B}_G$. If $D_G=B_G$ then the half-line delay is not required, but if $D_G=\bar{B}_G$, the half-line delay is required for all of the video. However, in slow motion reproduce $D_G=Z_G$ and $D_G$ usually has a period longer than $B_G$. The circuit shown in FIG. 35, which is an exclusive OR-gate, is used to compare the logic states of $B_G$, $\bar{B}_G$, $D_G$, and $\bar{D}_G$. The conditions on this comparison are: (1) if $D_G=B_G$ or if $\bar{D}_G=\bar{B}_G$, then the video coming from the disc is of the correct field required at the output and the half-line delay is inhibited; (2) if $D_G=\bar{B}_G$ or if $\bar{D}_G=B_G$, then the video from the disc is of the incorrect field and the half-line delay is required to produce the correct field of the output.

The circuit illustrated "Nands" the $D_g$ signal from the slow motion logic circuit 133 with the $B_g$ signal from the clock generator 132 in a "Nand" gate 612, the output of the "Nand" gate being connected to "Nor" gate 613. The $\bar{D}_g$ signal from the slow motion logic circuit 133 is "Nand" with the $\bar{B}_g$ signal from the clock generator 132 in a second "Nand" gate 614 and the output of this "Nand" gate is connected to the "Nor" gate 613. The output of the "Nor" gate 613 is signal R', the logic function of which is: $R'=B_g \cdot D_g + \bar{B}_g \cdot \bar{D}_g$.

FIG. 36 shows a logic circuit which may be employed for the head logic circuit 734. The purpose of the head logic circuit is to produce the individual head pulses $E_{ag}$, $E_{bg}$, $E_{cg}$, and $E_{dg}$ (See FIG. 12b). These head pulses are positive return-to-zero waveforms with a binary 1 to binary 0 ratio of one to three for normal record or reproduce, and a binary 1 to binary 0 ratio of one to seven for alternate field record. Two waveforms are utilized in the generation of the head pulses, and these are the signal $D_g$ from the slow motion logic circuit 133 (FIG. 32) and the signal $\bar{B}'$ from the alternate field logic circuit 156 (FIG. 34). The signal $D_g$ is equal to the signal $B_g$ for normal motion, but the signal $D_g$ is equal to the signal $Z_g$ for slow motion. Signal $\bar{B}'$ equals binary 1 during normal record and normal reproduce; but $\bar{B}'$ equals $B_g$ during alternate field record.

As shown in FIG. 36, four "Nand" gates 616, 617, 618 and 619 are provided. The $\bar{D}_g$ signal from the slow motion logic circuit 133 is applied to the second and fourth "Nand" gates 617 and 619. The $D_g$ signal from the slow motion logic circuit 133 is applied to the first 616 and third "Nand" gates 616 and 618. The $\bar{B}'$ signal from the alternate field logic circuit 156 (FIG. 34) is applied to the input of all of the "Nand" gates 616, 617, 618 and 619. The $\bar{D}_g$ signal is also applied to the clock input of a J-K binary element 621 connected as a RS flip-flop which acts as a binary divider (i.e., switches only on negative zero crossing of $\bar{D}_g$). The principal output L of this flip-flop 621 is connected to the third and fourth "Nand" gates 618 and 619 and the complementary $\bar{L}$ output is connected to the first and second "Nand" gates 616 and 617. The output of the first "Nand" gate is connected to the $\bar{E}_{ag}$ output. Thus, $E_{ag}$ has a logic function equal to $\overline{E}_{ag}=\overline{D_g \cdot L \cdot B'}$. The output of the second "Nand" gate 617 is applied to the output $\overline{E}_{bg}$. Thus, the logic function for $E_{bg}$ is: $\overline{E}_{bg}=\overline{D_g \cdot L \cdot B'}$. The output from the third "Nand" gate 618 is applied to the output $\overline{E}_{cg}$ and its logic function is: $\overline{E}_{cg}=\overline{D_g \cdot L \cdot B'}$. The output from the fourth "Nand" gate 619 is applied to the output $\overline{E}_{dg}$ and its output logic function is: $\overline{E}_{dg}=\overline{D_g \cdot L \cdot B'}$.

FIG. 37 shows a circuit which may be employed for the chroma inverter logic circuit 152. This circuit determines when the chroma inverter circuit 151 is coupled in series with the output video to correct the phase of the chroma information. As previously explained, the chroma inverter should change the phase 180° each time a new field is played ($J_c=1$) in reverse motion ($K'=0$); and the chroma inverter in the slow motion mode should be switched each time the half-line delay is inserted ($R'=1$).

In the circuit shown in FIG. 37, the $C_h$ signal which causes the chroma inverter to be switched is generated each time a new field is replayed in the reverse mode by coupling the $J_c$ from slow motion logic circuit 133 (FIG. 32) through an inverter 622 to one input of a "Nand" gate 623. The other input to the "Nand" gate 623 is a $K'$ signal from the alternate field switch 153 (FIG. 33) which is applied through an inverter 624 to the input. The output of "Nand" gate 623 which is $J_c+K'$, is applied to one input of a second "Nand" gate 626. The other input to this second "Nand" gate 626 is for the reverse mode of operation, as is described hereinafter, and hence a pulse is provided at its output for each $J_c$ pulse when the $K'$ signal is equal to 1 (i.e., reverse mode). This output pulse from the "Nand" gate 626 is coupled to the clock input of a J-L binary element 627 connected as an RS flip flop. Thus, the flip flop 627 switches states for each $J_c$ pulse, thereby changing the value of its principal output $C_H$ from 0 to 1 for each new field employed. Thus, the chroma inverter is switched in state for each new field replayed in reverse motion.

In forward motion, the signal $K'$ is equal to 1, and therefore the signal $J_c+K'$ is always equal to 1 and the switching flip flop is controlled by a second J-K binary element 628 connected as a J-K flip flop. The principal output of the flip flop 628 is applied through inverter 629 and a differentiating circuit 631 to the input of the "Nand" gate 626. The $R'+B_g$ signal from the alternate field logic circuit 153 (FIG. 33) is applied to the $P_j$ input of the flip flop 627 and through an inverter 632 to the $P_k$ input. The clock pulses for the flip flop 628 are the clock signals C received via an inverter 633 from the clock generator 132 (FIG. 31). Thus, the flip flop 628 changes states each time $R'$ or $B_g$ changes from 1 to 0 or vice versa, the switching being timed by the clock pulse C. The switching of this flip flop 627 causes the first flip flop to switch states thereby changing the binary value of $C_H$ which, in turn changes the state of the chroma inverter 151.

A logic circuit which may be employed for the head retiming logic circuit 136 is shown in FIG. 38. This circuit which retimes the head switching signals $E_{ag}$, $E_{bg}$, $E_{cg}$ and $E_{dg}$ with the clock pulse C, includes four J-L binary elements 634, 636, 637, and 638 connected as J-K flip flops. The $\overline{E}_{dg}$ signal from the head logic circuit 134 (FIG. 36) is applied to the $P_j$ input of the fourth flip flop 638 and through an inverter 637 to the $P_k$ input. The $E_{ak}$ signal from the reverse motion logic circuit 138 (FIG. 22) is applied to the $P_k$ input of the first flip flop 634 and through an inverter 641 to the $P_j$ input. The $E_{ck}$ signal from the reverse motion logic circuit is applied to the $P_k$ input of the third flip flop 637 and through an inverter 642 to the $P_j$ input. The $\overline{E}_{bg}$ signal from the head logic circuit 134 (FIG. 36) is applied to the $P_j$ input of the second flip flop 636 and through an inverter 643 to the $P_k$ input. The flip flop 634, 636, 637 and 638 are timed by the clock pulses C received from the clock generator 132 (FIG. 31). The complementary outputs of these binary elements are respectively applied to the $E_{ac}$, $E_{bc}$, $E_{cc}$ and $E_{dc}$ outputs, which outputs are employed to switch the heads. The $E_{dg}$ signal at the output of the inverter 639 is also applied through another inverter 644 to the $E_{dg}$ output which is employed to control the speed of the clock motor.

As can be seen from the above, a method and apparatus is provided for replaying video signals both monochrome and color at any speed of slow motion desired from normal to freeze. Also, the apparatus may be operated to provide reverse motion or faster than normal motion.

Various changes and modifications may be made in the apparatus without deviating from the spirit and scope of the invention. Various features of the invention are set forth in the accompanying claims.

I claim:

1. A method of magnetically recording broad band signals and reproducing the signals with an altered time base effect, said method comprising recording sequentially occurring, equal time periods of the broad band signals in sequence on at least two magnetic mediums with respective periods being recorded at a predetermined head-to-magnetic medium writing speed, the first occurring time period being recorded on one of said mediums and the next time period being recorded on the second of said mediums, reproducing the respective recorded periods with the same predetermined head-to-medium speed as during recording with at least certain of the periods being repeated a predetermined number of times, and forming a continuous output signal from the reproduced periods.

2. A method in accordance with claim 1 in which the signal is a television signal and the equal time periods are fields of a television signal.

3. A method in accordance with claim 1 in which four magnetic recording mediums in the form of rotating disc surfaces are provided, in which a recording head is associated with each disc surface, and the heads are moved in sequence radially on the associated disc surfaces and during said movement each head is operated in a repetitive series of four operations comprising, during a record mode, a first operation where said head is caused to dwell during a first time period and the head is energized to erase a complete circular track on said surface, a second operation where said head is caused to dwell during a second time period and the head is energized to record the signal received during that time period on the complete circular track, and a third and fourth operation where the head is stepped once each for a third and fourth time periods, the series of operations of said heads being 90° out of phase with respect to each other.

4. A method in accordance with claim 3 in which the signal is a television signal and the signal time periods are fields of the television signal.

5. A method in accordance with claim 4 in which the heads during the replay mode follow the same series of four operations as during recording except that the heads do not erase during the first operation, and during the second operation they replay instead of recording.

6. A method in accordance with claim 5 in which at least one of said heads in the replay mode is caused to replay, during the second operation, one field at least twice.

7. A method in accordance with claim 5 in which the heads are reversed in their radial movement from that employed in recording to thereby provide reverse motion.

8. A method in accordance with claim 7 in which at least one of said heads in the replay mode is caused to replay, during the second operation, one field at least twice.

9. An apparatus for magnetically recording broad band signals, and reproducing the signals with an altered time base effect, said apparatus comprising at least two magnetic recording mediums, a recording head associated with each medium, means for moving said head and said magnetic medium relative to each other so as to provide a predetermined head to magnetic medium writing speed for equal time periods of the broad band signal, a recording circuit for receiving the broad band signal during a record mode of operation, means for coupling the output of said recording circuit to the recording heads in sequence for sequentially occurring, equal time periods of the broad band signal, one of said recording heads being coupled to said output during the first occurring time period and the second of said recording heads being coupled to said output during the next time period, means for causing said heads to reproduce in a reproducing mode of operation recorded periods with the same predetermined head to medium writing speed as during recording, certain of the recorded period being replayed at least twice, reproducing circuit, and means for connecting said heads to reproducing circuit during the reproducing mode of operation.

10. Apparatus in accordance with claim 9 in which the signal is a television signal and the equal time periods are fields of the television signal.

11. Apparatus in accordance with claim 9 in which four magnetic recording mediums in the form of rotating disc surfaces are provided, a recording head is associated with each disc surface, stepping means is provided for each head for stepping the head radially on the disc surface, control means is provided for causing each head to be operated in a series of four operations comprising, a first operation where said head is caused to dwell during a first of the time periods, a second operation where said head is caused to dwell for a second of said time periods and a third and a fourth operation where the stepping means is actuated once for each of a third and fourth of said time periods, an erase means is associated with each head, and a record signal means causes said erase means to be energized in each first operation in a record mode and causes said record circuit to be coupled to said head in each second operation in a record mode, the series of operations of said heads being 90° out of phase with respect to each other.

12. Apparatus in accordance with claim 11 in which said signal is a television signal and the time periods are fields of the television signal.

13. Apparatus in accordance with claim 12 in which replay signal means are provided which, during the replay mode, couples the head to the reproducing circuit during the second operation, causes the head to remain in said second operation for at least a second of said periods, and causes the other in phase second and third operations of the other heads to be inhibited.

14. Apparatus in accordance with claim 13 in which means are provided for causing the head to move in a reverse radial movement from that employed in recording to thereby provide reverse motion.

15. Apparatus in accordance with claim 9 in which each magnetic recording medium is a flat surface of a disc, two of said discs being coaxially mounted and axially spaced to provide said magnetic recording mediums, and four slide arms are provided, each mounted to span a portion of one of said disc surfaces along a radius thereof, and means are provided for mounting said head for sliding movement along one of said slide arms for said dwelling and stepping operations.

16. Apparatus in accordance with claim 15 in which the broad band signal is a television signal and the time periods are fields of the television signal, stepping means is associated with each of said heads for causing said head to follow repetitive sequences along said slide arms, each consisting of four successive operations designated first dwell, second dwell, move and move in that order, means is provided for causing said sequences of heads to be 90 degrees out of phase with respect to each other, erase means associated with each head, record signal means is provided for causing during a record mode each of said operations to correspond in time with one field period of said television signal, for actuating said erase means during each first dwell in the record mode, and for coupling said record circuit to said head during each second dwell in the record mode, whereby a field is recorded in a continuous circular track, the head skips a track and then the head records the next field applied thereto in a continuous circular track, replay signal means is provided for coupling said reproducing circuit to the heads in the replay mode during the second dwell, and means is coupled to the stepping means during replay for causing each of said operations to extend over a time period corresponding with at least a plurality of field periods, whereby each field is reproduced a plurality of times to thereby produce a slow motion effect.

17. A magnetic recording and reproducing system comprising a plurality of magnetic recording and reproducing heads, a magnetic medium including a recording surface in recordable relationship with each of said heads, means for rotating said magnetic medium at a predetermined rate of revolution, means for generating synchronizing signals which are in synchronism with the rotation of said magnetic medium, means responsive to said synchronizing signals for generating gate signals for each of said magnetic heads, said gate signals being in synchronism with said synchronizing signals, means responsive to each of said gate signals for switching the signals which are to be recorded, means including each of said magnetic heads for recording each of said switched signals on said magnetic medium, a device for moving said magnetic heads alternately and intermittently, means for generating signals for controlling said device for moving the magnetic heads alternately and intermittently, said control signals being synchronous with said synchronizing signals, and means for applying said control signals to said device for moving the magnetic heads alternately and intermittently, whereby the magnetic heads can be moved intermittently and alternately with respect to each other at regular time intervals to form a plurality of recording tracks in the form of circles.

18. The magnetic recording and reproducing system as claimed in claim 17 in which said recording surface is in the form of a disc.

19. The magnetic recording and reproducing system as claimed in claim 17 in which signals recorded on and reproduced from said magnetic medium are video signals, and said means for rotating said magnetic medium is driven to rotate at a number of revolutions equal to the frequency of $1/n \times$ field per second (n-1, 2, 3 ... ).

20. A magnetic recording and reproducing system comprising a plurality of magnetic heads, a magnetic recording medium including a recording surface of a discal shape in recordable relationship with each of said heads and adapted to rotate in a synchronous relation with the vertical synchronizing signal in a continuous video signal, each of said heads being arranged for making an intermittent movement independently of the other head over said magnetic recording medium while engaging therewith and in a certain relation with said vertical synchronizing signal, at least one of said magnetic heads being held in its stationary state while another said magnetic head is making its shifting movement, and means for applying to said stationary magnetic head a series of signal portions which are derived from said continuous video signal and are each n times (n is an integer) the length of one field of said continuous video signal for thereby recording the derived signal portions successively and each as a circular track on said magnetic recording medium.

21. A magnetic recording and reproducing system comprising a plurality of magnetic heads, a magnetic medium of a discal shape in recordable relationship with each of said heads and adapted to rotate in a synchronous relation with the vertical synchronizing signal in a continuous video signal, means for moving said magnetic heads over said magnetic medium, the moving of said heads being intermittent and alternate with respect to each other and in a timed relation with said vertical synchronizing signal, a first of said magnetic heads being held in its stationary state while a second of said magnetic heads is making its shifting movement, means for applying to said first magnetic head a signal portion derived from said continuous video signal, and means thereafter applying a successive signal portion to said second magnetic head when it reaches its stationary state while said first magnetic head is making its shifting movement for thereby recording the derived signal portions successively and each as a circular track on said magnetic recording medium.

* * * * *